United States Patent
Tanaka et al.

(10) Patent No.: US 10,007,881 B2
(45) Date of Patent: Jun. 26, 2018

(54) INFORMATION PROCESSING SYSTEM, INFORMATION PROCESSING METHOD, INFORMATION PROCESSING APPARATUS, AND CONTROL METHOD AND CONTROL PROGRAM THEREOF

(71) Applicant: NEC Corporation, Tokyo (JP)

(72) Inventors: Rie Tanaka, Tokyo (JP); Taku Konishi, Tokyo (JP); Shinichi Doi, Tokyo (JP); Satoko Itaya, Tokyo (JP)

(73) Assignee: NEC Corporation, Tokyo (JP)

( * ) Notice: Subject to any disclaimer, the term of this patent is extended or adjusted under 35 U.S.C. 154(b) by 565 days.

(21) Appl. No.: 14/426,481

(22) PCT Filed: Jun. 19, 2013

(86) PCT No.: PCT/JP2013/066821
§ 371 (c)(1),
(2) Date: Mar. 6, 2015

(87) PCT Pub. No.: WO2014/038264
PCT Pub. Date: Mar. 13, 2014

(65) Prior Publication Data
US 2015/0220840 A1    Aug. 6, 2015

(30) Foreign Application Priority Data
Sep. 10, 2012 (JP) .................. 2012-198774

(51) Int. Cl.
*G06F 15/16* (2006.01)
*G06N 5/04* (2006.01)
(Continued)

(52) U.S. Cl.
CPC ........... *G06N 5/04* (2013.01); *G06F 17/3087* (2013.01); *G06Q 30/02* (2013.01); *G06Q 30/06* (2013.01);
(Continued)

(58) Field of Classification Search
CPC . H04L 41/0893; H04L 43/08; H04L 41/5051; H04L 47/20; H04L 43/10;
(Continued)

(56) References Cited

U.S. PATENT DOCUMENTS

| 8,103,388 B2 * | 1/2012 | Goodnow | G06F 1/305 307/52 |
| 8,116,748 B2 * | 2/2012 | Aaron | H04M 3/4228 370/230.1 |

(Continued)

FOREIGN PATENT DOCUMENTS

| JP | 2002-279285 | 9/2002 |
| JP | 2004-86762 | 3/2004 |

(Continued)

OTHER PUBLICATIONS

R. Kyoyu, "Cool Share", The Mainichi Newspapers Co., Ltd., p. 1, Aug. 2012.

(Continued)

*Primary Examiner* — Djenane Bayard
(74) *Attorney, Agent, or Firm* — Finnegan, Henderson, Farabow, Garrett & Dunner, L.L.P.

(57) ABSTRACT

An apparatus of this invention is directed to an information processing apparatus that proposes an action to reduce an energy consumption amount by users of a system when an acceptance user proposes a place for accepting users. The information processing apparatus includes an acceptance information acquiring unit that acquires a proposal of an acceptance place accepting a plurality of users, a user position collector that collects the current positions of the plurality of users from communication terminals of the plurality of users, and a guidance information notification unit that selects the acceptance place as a place for gathering the plurality of users, and notifies the communication ter- (Continued)

minal of a user absent in the selected place of guidance information to the selected place.

13 Claims, 58 Drawing Sheets

(51) Int. Cl.
    *G06Q 30/02*    (2012.01)
    *G06Q 30/06*    (2012.01)
    *G06F 17/30*    (2006.01)
    *H04L 29/08*    (2006.01)
    *H04L 29/06*    (2006.01)
    *H04W 4/02*    (2018.01)

(52) U.S. Cl.
    CPC .............. *H04L 67/10* (2013.01); *H04L 67/22* (2013.01); *H04L 67/42* (2013.01); *H04W 4/02* (2013.01); *Y02D 10/45* (2018.01); *Y02D 70/164* (2018.01)

(58) Field of Classification Search
    CPC ...... G06F 1/32; G06F 17/3087; G06F 1/3215; G06F 1/3293; G06F 1/263; G06F 1/30; G06F 17/30902; G06F 19/3418; G06F 1/3203; G06F 1/3231
    See application file for complete search history.

(56) References Cited

U.S. PATENT DOCUMENTS

| | | | |
|---|---|---|---|
| 2013/0029696 A1* | 1/2013 | Ellanti | H04M 1/72572 455/457 |
| 2014/0217823 A1* | 8/2014 | Baba | H02J 3/14 307/35 |
| 2017/0017996 A1* | 1/2017 | Watfa | G06Q 30/02 |

FOREIGN PATENT DOCUMENTS

| | | |
|---|---|---|
| JP | 2011-27305 | 2/2011 |
| JP | 2012-26608 | 2/2012 |
| JP | 2012-73737 | 4/2012 |

OTHER PUBLICATIONS

"Atsui Hi", Inshokuten de Ryo o, Nihon Keizai Shimbun, Chiho Keizaimen Saitama, Nihon Keizai Shimbun, Inc., p. 40, Jun. 2012.
International Search Report dated Sep. 3, 2013 in corresponding PCT International Application.

\* cited by examiner

| USER ID 811 | USER AUTHENTICATION INFORMATION 812 | ... | USER TERMINAL ID 813 | TERMINAL AUTHENTICATION INFORMATION 814 | ... | CURRENT ADDRESS 815 | WORKPLACE (SCHOOL) 816 | WORKPLACE/ SCHOOL COMMUTE ROUTE 817 | OTHER RELATED POSITION INFORMATION 818 |
|---|---|---|---|---|---|---|---|---|---|
| U0001 | abcdefg | | UT0001 | 192,109,0,152 | | | | | |
| U0002 | hijklmn | | UT0002 | 192,109,0,153 | | | | | |
| ... | | | | | | | | | |

504

F I G. 8A

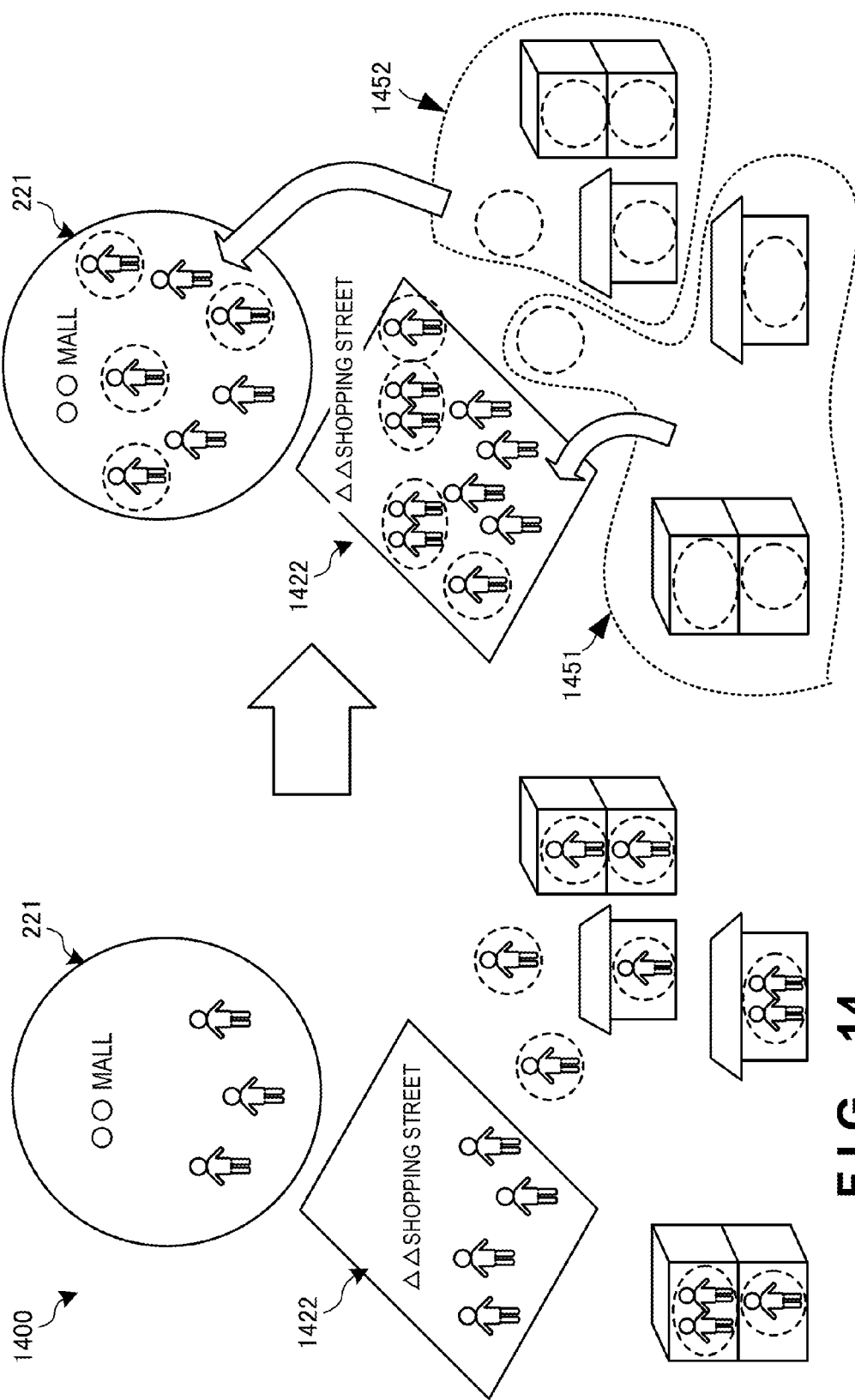
F I G. 14

FIG. 19

| USER ID | USER TERMINAL ID | GUIDANCE TO FIRST EVENT | ... | GUIDANCE TO nTH EVENT | ... |
|---|---|---|---|---|---|
| | | × | | ○ | |
| | | ○ | | × | |
| | | ○ | | △ | |
| ... | | | | | |

| CLIENT ID | EVENT DATE & TIME | EVENT CONTENTS | EVENT CONDITION (USER ATTRIBUTE) | POSITION | NUMBER OF PERSONS TO BE ACCOMMODATED | POWER CONSUMPTION AMOUNT |
|---|---|---|---|---|---|---|
| 901 | 902 | 903 | 2407 | 904 | 905 | 906 |
| | | | CHILDREN | | | |
| | ... | | FEMALE IN 30' | | | |
| | ... | | STUDENT | | | |
| ... | | | | | | |

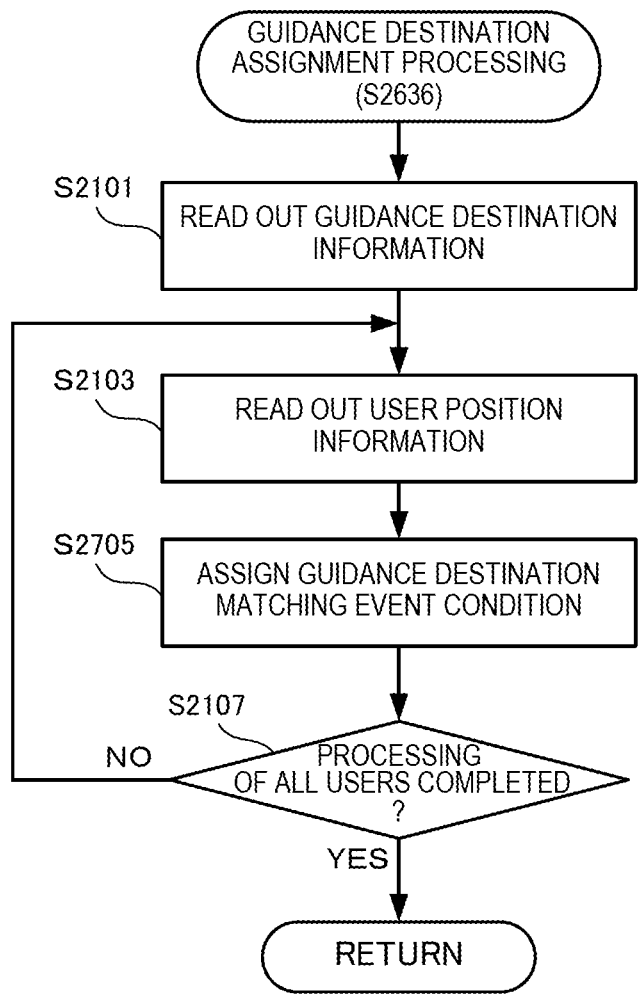
F I G. 27

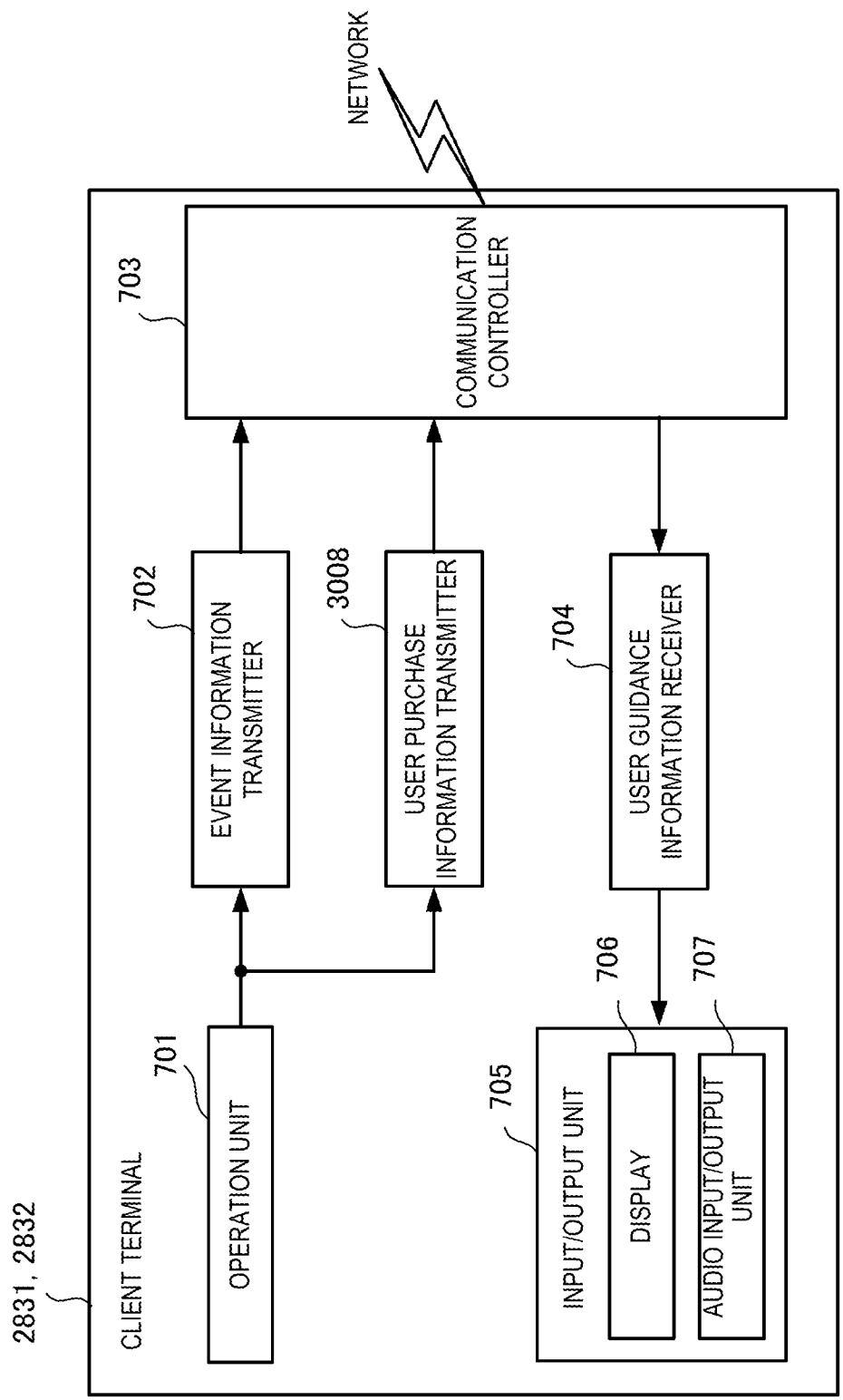
F I G. 30

| 3201 | 3202 | 3203 | 3204 |
|---|---|---|---|
| CLIENT ID | USER ID | USER PURCHASE HISTORY | USER PREFERENCE EVALUATION |
|  |  |  |  |
|  | ... |  |  |
|  |  |  |  |
|  | ... |  |  |
| ... |  |  |  |

2817

F I G. 32

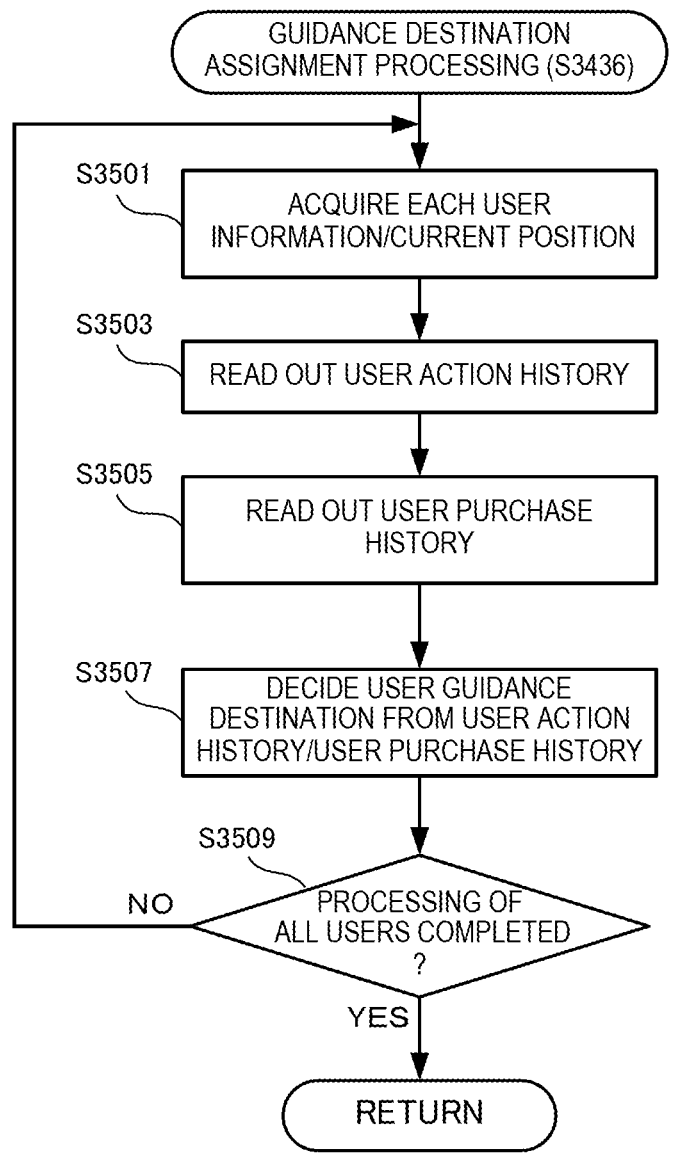
F I G. 35

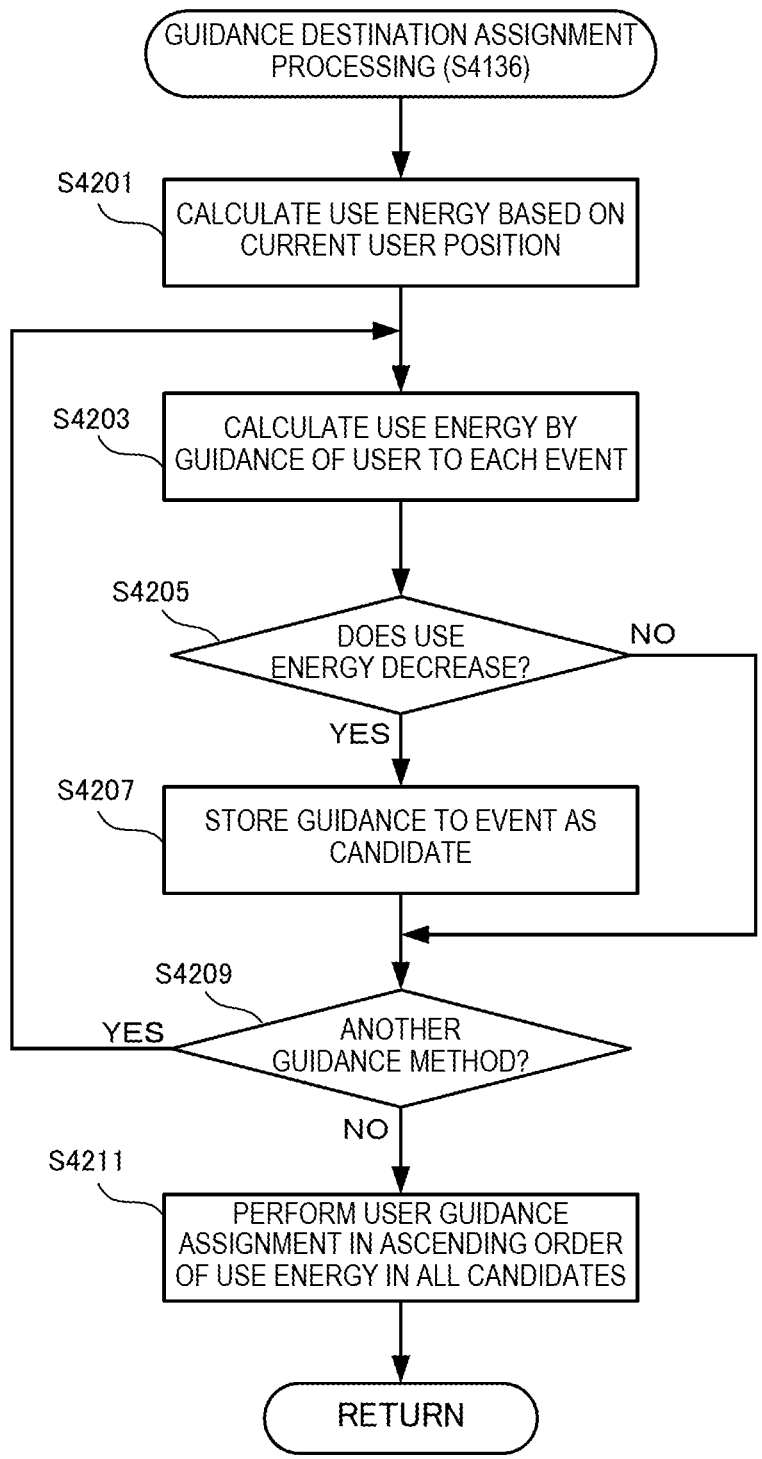
F I G. 42

FIG. 45

| USER ID | GUIDANCE DESTINATION CLIENT ID | MOVEMENT TRANSPORT FACILITY | MOVEMENT ENERGY | ... |
|---|---|---|---|---|
| | | | | |
| | | ... | | |
| | | ... | | |
| | ... | | | |
| ... | | | | |

4501 — USER ID
4502 — GUIDANCE DESTINATION CLIENT ID
4503 — MOVEMENT TRANSPORT FACILITY
4504 — MOVEMENT ENERGY
4318

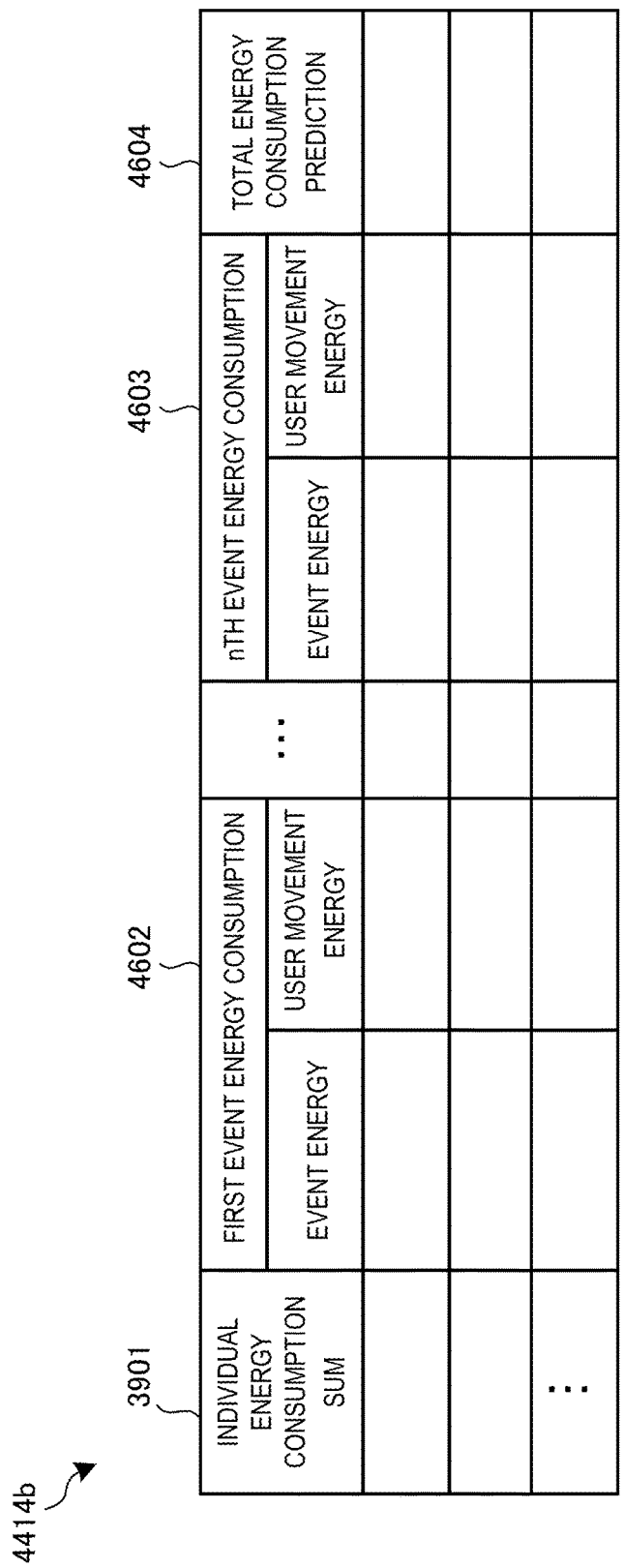
F I G. 46

FIG. 47

| Total energy consumption prediction order (small → large) | Guidance to first event | | | ... | Guidance to nth event | | |
|---|---|---|---|---|---|---|---|
| | User area | Number of persons | Transport facility | | User area | Number of persons | Transport facility |
| 1 | | | | | | | |
| 2 | | | | | | | |
| 3 | | | | | | | |
| ... | | | | | | | |

4414a

4701: Total energy consumption prediction order (small → large)
4702: Guidance to first event
4703: Guidance to nth event

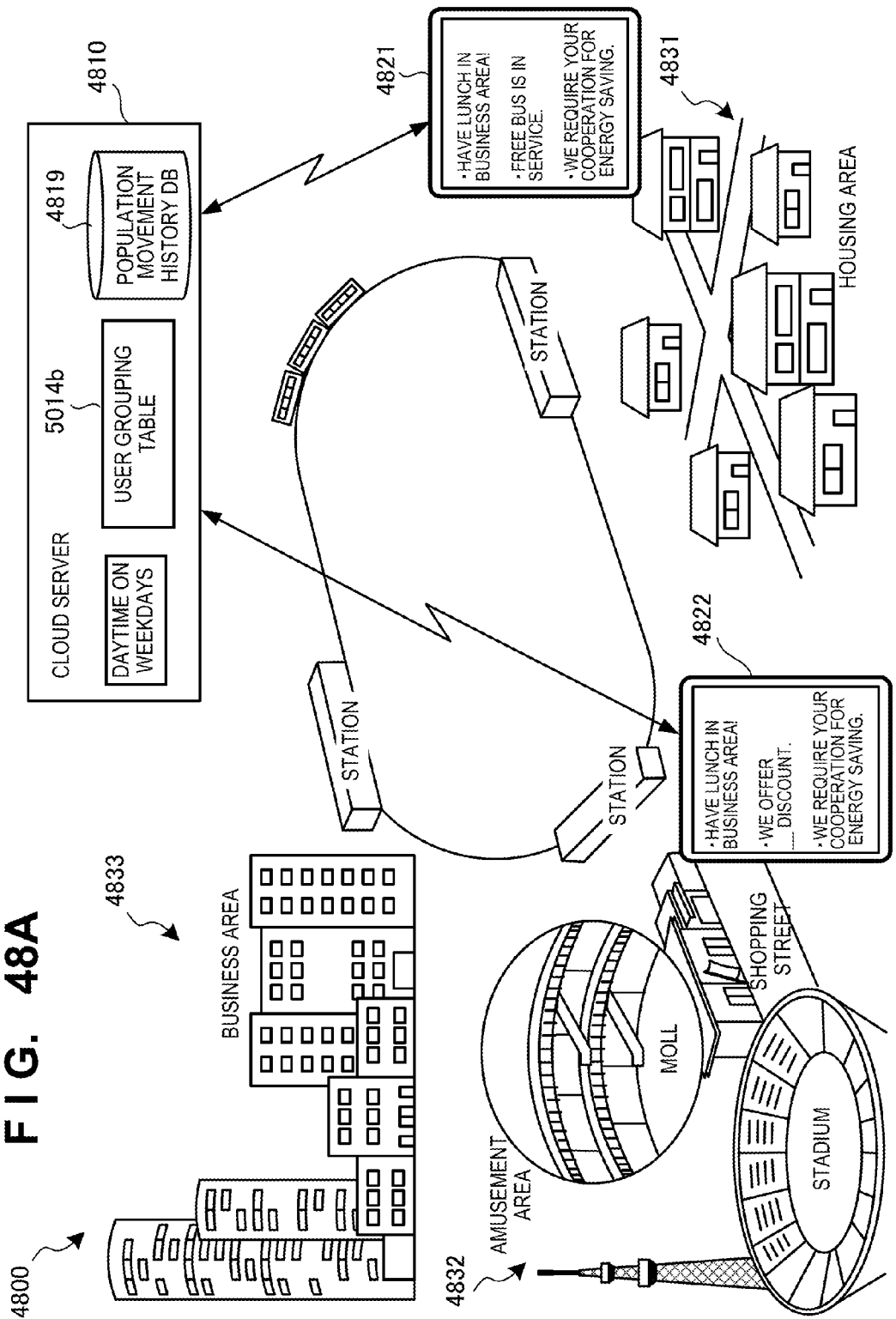

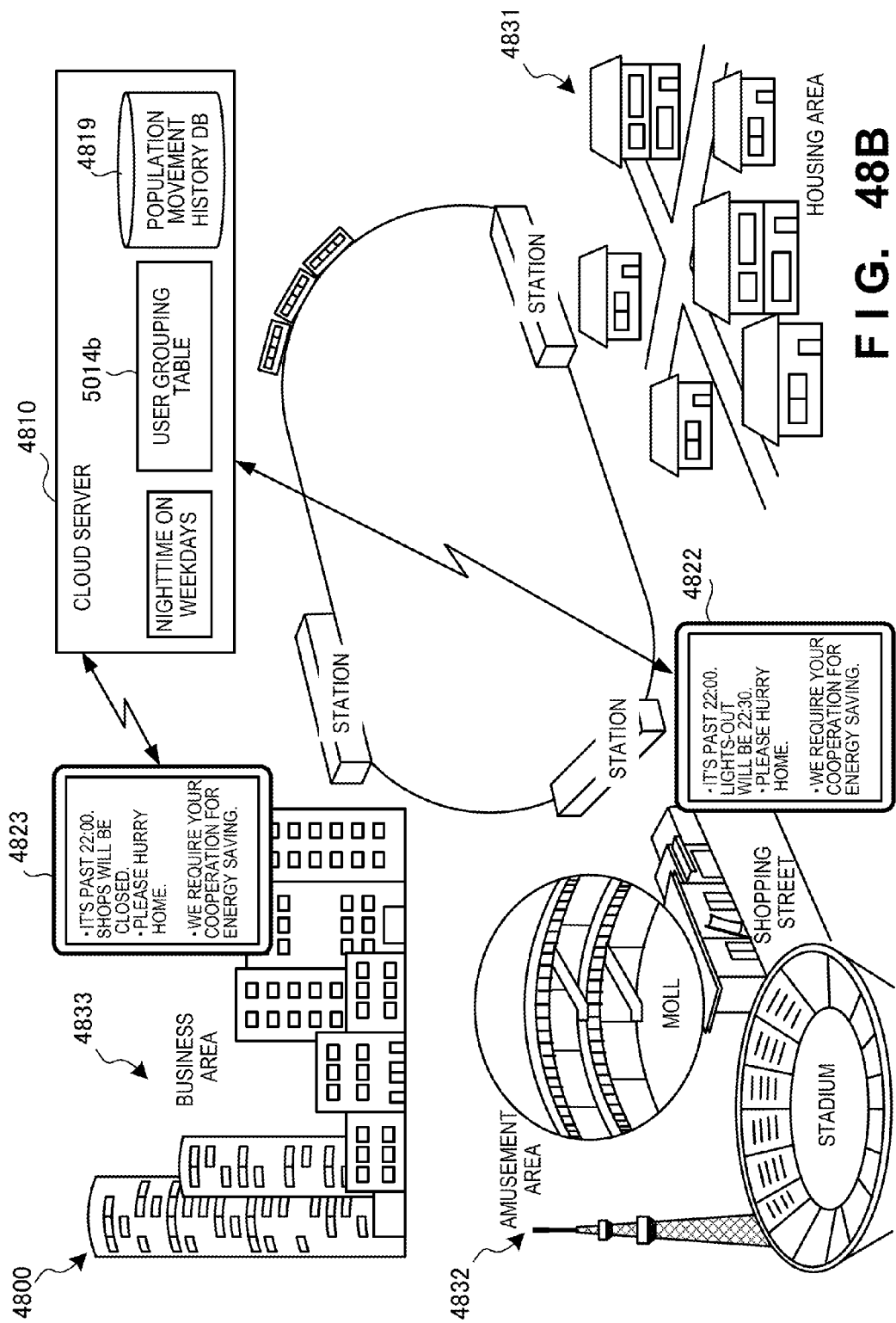

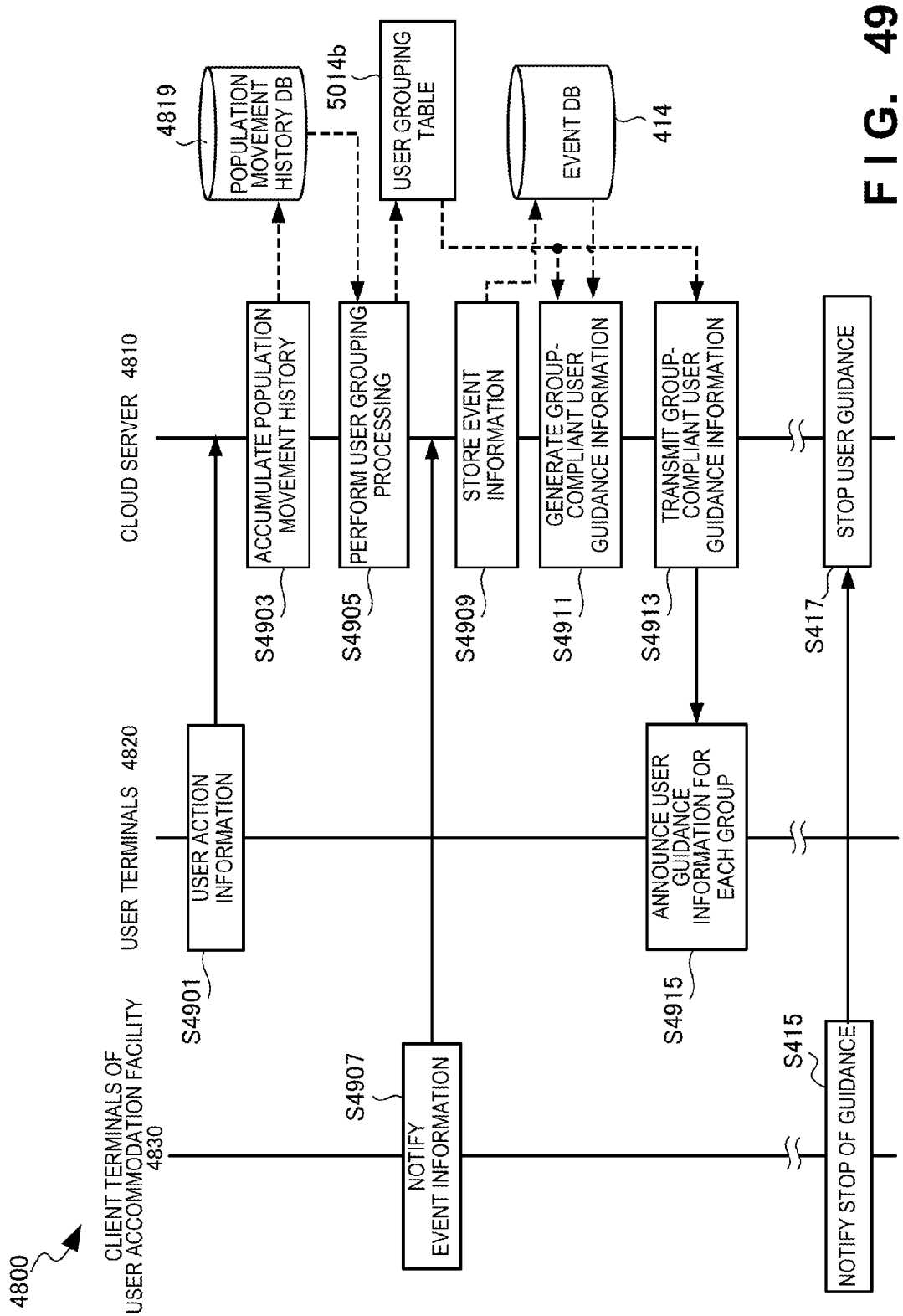
F I G. 49

| 5111 | | 5112 | 5113 | 5114 |
|---|---|---|---|---|
| TIME PERIOD | | POPULATION IN FIRST REGION | POPULATION IN nTH REGION | TOTAL POPULATION |
| YEAR, MONTH, DAY | DAY OF WEEK (HOLIDAY) | TIME | | |
| ... | | | ... | |

5110

| 5121 | | 5122 | 5123 | 5124 | 5125 |
|---|---|---|---|---|---|
| TIME PERIOD | | AVERAGE POPULATION IN FIRST REGION | AVERAGE POPULATION IN nTH REGION | MOVEMENT GUIDANCE | GROUP NUMBER |
| WEEKDAY/HOLIDAY | MORNING/AFTERNOON/NIGHT | | | | |
| ... | | | ... | | |

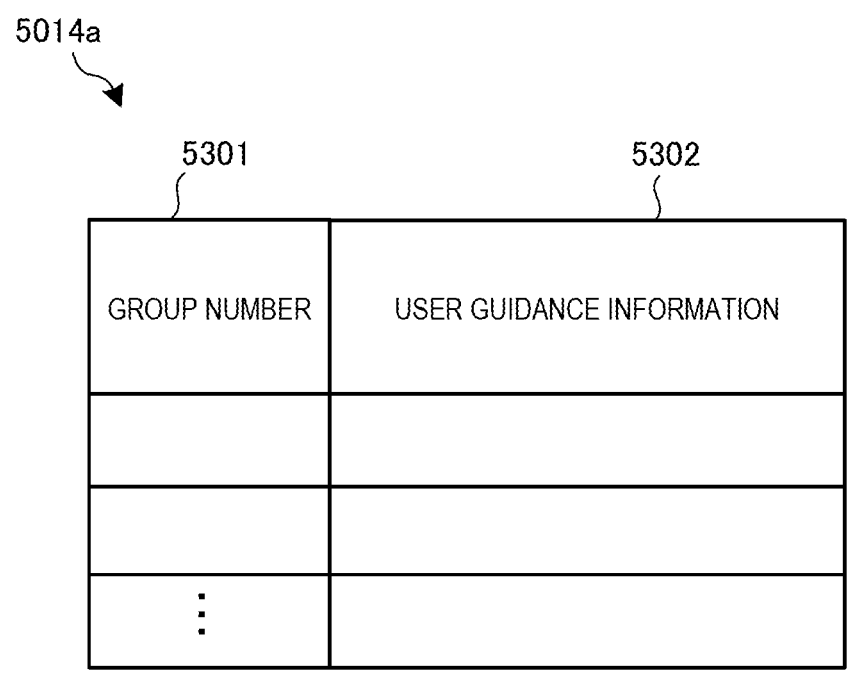
F I G. 53

ION PROCESSING SYSTEM, INFORMATION PROCESSING METHOD, INFORMATION PROCESSING APPARATUS, AND CONTROL METHOD AND CONTROL PROGRAM THEREOF

CROSS-REFERENCE TO RELATED PATENT APPLICATIONS

This application is a National Stage Entry of International Application No. PCT/JP2013/066821, filed Jun. 19, 2013, which claims priority from Japanese Patent Application No. 2012-198774, filed Sep. 10, 2012. The entire contents of the above-referenced applications are expressly incorporated herein by reference.

TECHNICAL FIELD

The present invention relates to a technique of guiding persons in order to reduce the energy consumption amount.

BACKGROUND ART

In the above technical field, patent literature 1 discloses a technique of advising, as a gathering advice, that users should gather in one room. Patent literature 2 discloses a technique of advising that users should gather in an energy-efficient room.

CITATION LIST

Patent Literature

Patent literature 1: Japanese Patent Laid-Open No. 2011-027305
Patent literature 2: Japanese Patent Laid-Open No. 2012-026608

SUMMARY OF THE INVENTION

Technical Problem

In the techniques described in the above literatures, however, a system decides a place for gathering users. The desire of a system user such as a user or an acceptance user serving as a facility that accepts users cannot be taken into account.

The present invention enables to provide a technique of solving the above-described problem.

Solution to Problem

One aspect of the present invention provides an information processing apparatus comprising:
an acceptance information acquiring unit that acquires a proposal of an acceptance place accepting a plurality of users;
a user position collector that collects current positions of the plurality of users from communication terminals of the plurality of users; and
a guidance information notification unit that selects the acceptance place as a place for gathering the plurality of users, and notifies the communication terminal of a user absent in the selected place of guidance information to the selected place.

Another aspect of the present invention provides a control method of an information processing apparatus, comprising:
acquiring a proposal of an acceptance place accepting a plurality of users;
collecting current positions of the plurality of users from communication terminals of the plurality of users; and
selecting the acceptance place as a place for gathering the plurality of users, and notifying the communication terminal of a user absent in the selected place of guidance information to the selected place.

Still other aspect of the present invention provides a control program of an information processing apparatus for causing a computer to execute a method, comprising:
acquiring a proposal of an acceptance place accepting a plurality of users;
collecting current positions of the plurality of users from communication terminals of the plurality of users; and
selecting the acceptance place as a place for gathering the plurality of users, and notifying the communication terminal of a user absent in the selected place of guidance information to the selected place.

Still other aspect of the present invention provides an information processing system comprising a plurality of communication terminals of a plurality of users, and an information processing apparatus that controls the plurality of communication terminals,
the information processing apparatus comprising:
an acceptance information acquiring unit that acquires a proposal of an acceptance place accepting a plurality of users;
a user position collector that collects current positions of the plurality of users from the communication terminals of the plurality of users; and
a guidance information notification unit that selects the acceptance place as a place for gathering the plurality of users, and notifies the communication terminal of a user absent in the selected place of guidance information to the selected place, and
the plurality of communication terminals comprising:
a user position transmitter that detects the current positions of the plurality of communication terminals and transmits the current positions to the information processing apparatus; and
a guidance information receiver that receives, from the information processing apparatus, the guidance information to the selected place.

Still other aspect of the present invention provides an information processing method using an information processing system including a plurality of communication terminals of a plurality of users, and an information processing apparatus that controls the plurality of communication terminals, comprising:
detecting, at the respective communication terminals, current positions and transmitting the current positions from the respective communication terminals to the information processing apparatus;
collecting, at the information processing apparatus, the current positions of the plurality of users by receiving the current positions from the plurality of communication terminals;
acquiring, at the information processing apparatus, a proposal of an acceptance place accepting the plurality of users;
selecting, at the information processing apparatus, the acceptance place as a place for gathering the plurality of users, and notifying from the information processing apparatus to the communication terminal of a user absent in the selected place, of guidance information to the selected place; and receiving, at the communication terminal of the user absent in the selected place, the guidance information to the selected place from the information processing apparatus.

Advantageous Effects of Invention

According to the present invention, the desire of a system user can be taken into account by proposing a place for accepting users.

BRIEF DESCRIPTION OF DRAWINGS

FIG. 8A is a table showing the structure of a user registration DB according to the second embodiment of the present invention;

FIG. 14 is a view for explaining the operation concept of an information processing system according to the third embodiment of the present invention;

FIG. 19 is a table showing the structure of a user guidance information transmission table according to the third embodiment of the present invention;

FIG. 24 is a table showing the structure of an event information DB according to the fourth embodiment of the present invention;

FIG. 27 is a flowchart showing the procedures of guidance destination assignment processing according to the fourth embodiment of the present invention;

FIG. 30 is a block diagram showing the functional arrangement of a client terminal according to the fifth embodiment of the present invention;

FIG. 32 is a table showing the structure of a user purchase history DB according to the fifth embodiment of the present invention;

FIG. 35 is a flowchart showing the procedures of guidance destination assignment processing according to the fifth embodiment of the present invention;

FIG. 42 is a flowchart showing the procedures of guidance destination assignment processing according to the sixth embodiment of the present invention;

FIG. 45 is a table showing the structure of a movement energy DB according to the seventh embodiment of the present invention;

FIG. 46 is a table showing the structure of an energy consumption amount calculation table according to the seventh embodiment of the present invention;

FIG. 47 is a table showing the structure of a guidance destination assignment table according to the seventh embodiment of the present invention;

FIG. 48A is a view for explaining an operation concept of an information processing system during the daytime on weekdays according to the eighth embodiment of the present invention;

FIG. 48B is a view for explaining an operation concept of the information processing system during the nighttime on weekdays according to the eighth embodiment of the present invention;

FIG. 49 is a sequence chart showing the operation procedures of the information processing system according to the eighth embodiment of the present invention;

FIG. 51 is a table showing the structure of a population movement history DB according to the eighth embodiment of the present invention;

FIG. 53 is a table showing the structure of a user guidance information generation table according to the eighth embodiment of the present invention;

DESCRIPTION OF THE EMBODIMENTS

Preferred embodiments of the present invention will now be described in detail with reference to the drawings. It should be noted that the building components set forth in these embodiments are merely examples and are not intended to limit the scope of the present invention.

First Embodiment

An information processing apparatus 100 according to the first embodiment of the present invention will be described with reference to FIG. 1. The information processing apparatus 100 is an apparatus that guides users via communication terminals.

Figure 1:
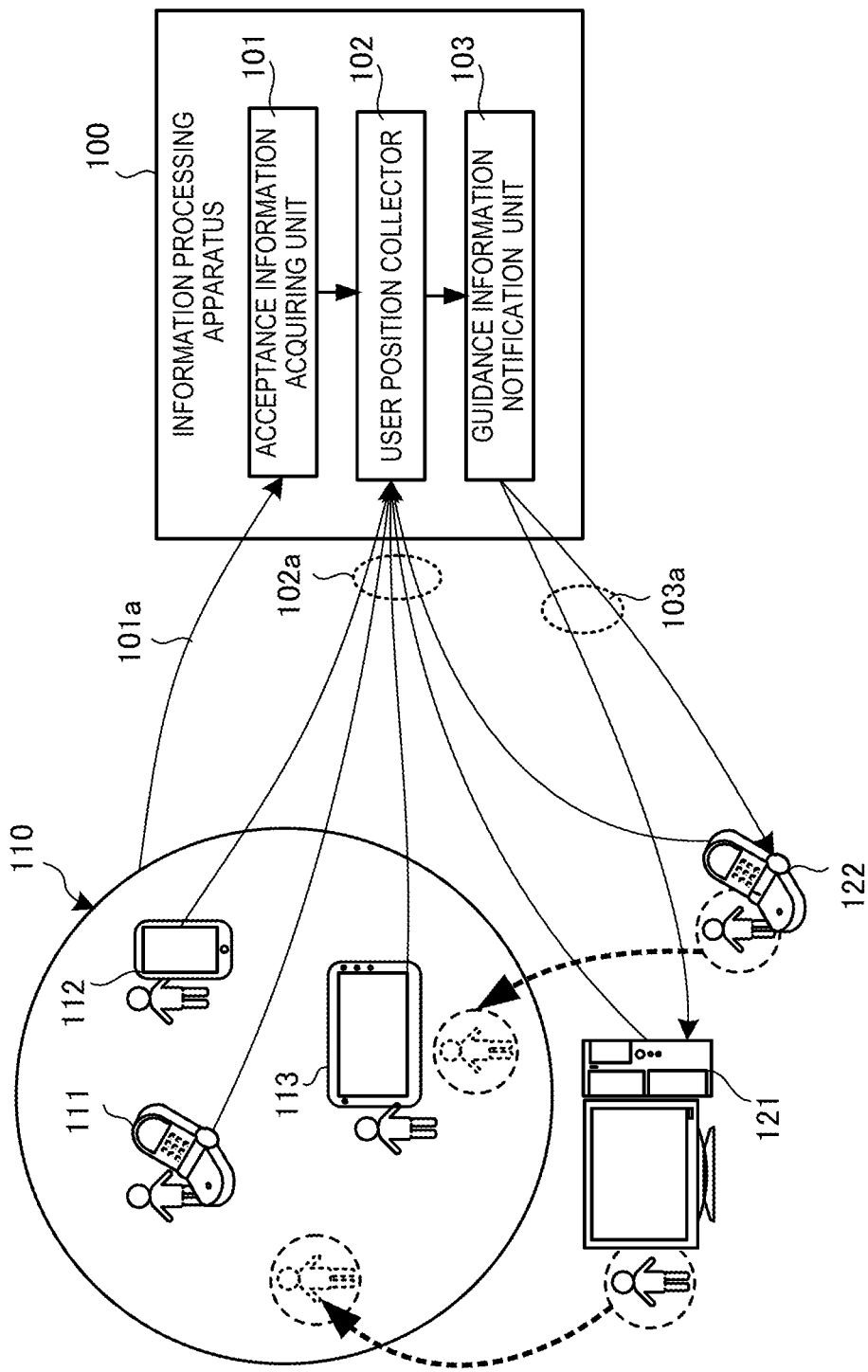
FIG. 1 is a block diagram showing the arrangement of an information processing apparatus according to the first embodiment of the present invention.

As shown in FIG. 1, the information processing apparatus 100 includes an acceptance information acquiring unit 101, a user position collector 102, and a guidance information notification unit 103. The acceptance information acquiring unit 101 acquires a proposal 101a of an acceptance place 110 that accepts a plurality of users. The user position collector 102 collects current positions 102a of a plurality of users from communication terminals 111 to 113, 121, and 122 of the plurality of users. The guidance information notification unit 103 selects the acceptance place 110 as a place for gathering a plurality of users, and notifies the communication terminals 121 and 122 of users absent in the selected place of guidance information to the selected place.

According to this embodiment, the desire of a system user can be taken into account by proposing a place for accepting users.

Second Embodiment

An information processing system according to the second embodiment of the present invention will be described. According to this embodiment, a cloud server serving as an information processing apparatus collects the current positions of users from user terminals, and guides users absent in an acceptance place that proposes acceptance of users, to the acceptance place via the user terminal.

According to this embodiment, the energy consumption amount can be reduced by guiding users to an acceptance place that proposes acceptance of users, and gathering them there.

Note that the server will be explained as a cloud server in this embodiment, but may be another apparatus having the same function. In this embodiment, a term "user" is a person to be guided, and a term "client" is a facility or the like that proposes an acceptance place, in order to discriminate them. However, when viewed from the server, "client" is "acceptance user", and "user" and "client" are server users.

<<Information Processing System>>

An information processing system 200 according to this embodiment will be described with reference to FIGS. 2 to 4.

(Operation Concept)

Figure 2:
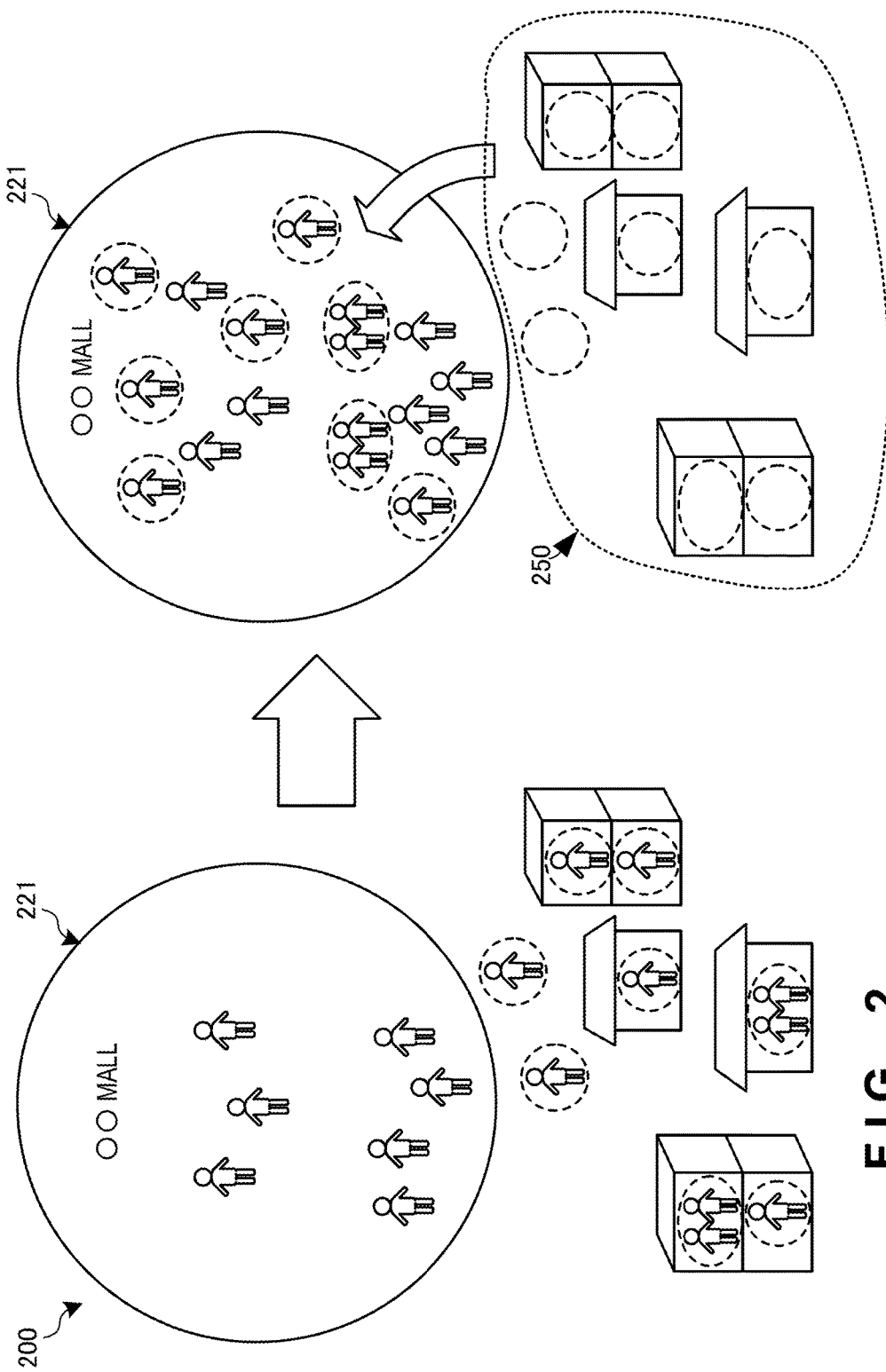
FIG. 2 is a view for explaining the operation concept of an information processing system according to the second embodiment of the present invention.

FIG. 2 is a view for explaining the operation concept of the information processing system 200 according to this embodiment.

In the information processing system 200 of FIG. 2, a ◯◯ mall 221 announces itself as a user acceptance place in order to reduce the energy consumption amount. In the left drawing of FIG. 2, users are scattered in houses and towns, energy consumption is diffused or redundant, and the energy consumption amount is not satisfactorily reduced. In the right drawing of FIG. 2, users 250 scattered in houses and towns move to the ◯◯ mall 221, and the users concentrate in the ◯◯ mall 221. As a result, energy consumption can be concentrated to increase the use efficiency and satisfactorily reduce the energy consumption amount.

(System Arrangement)

Figure 3:
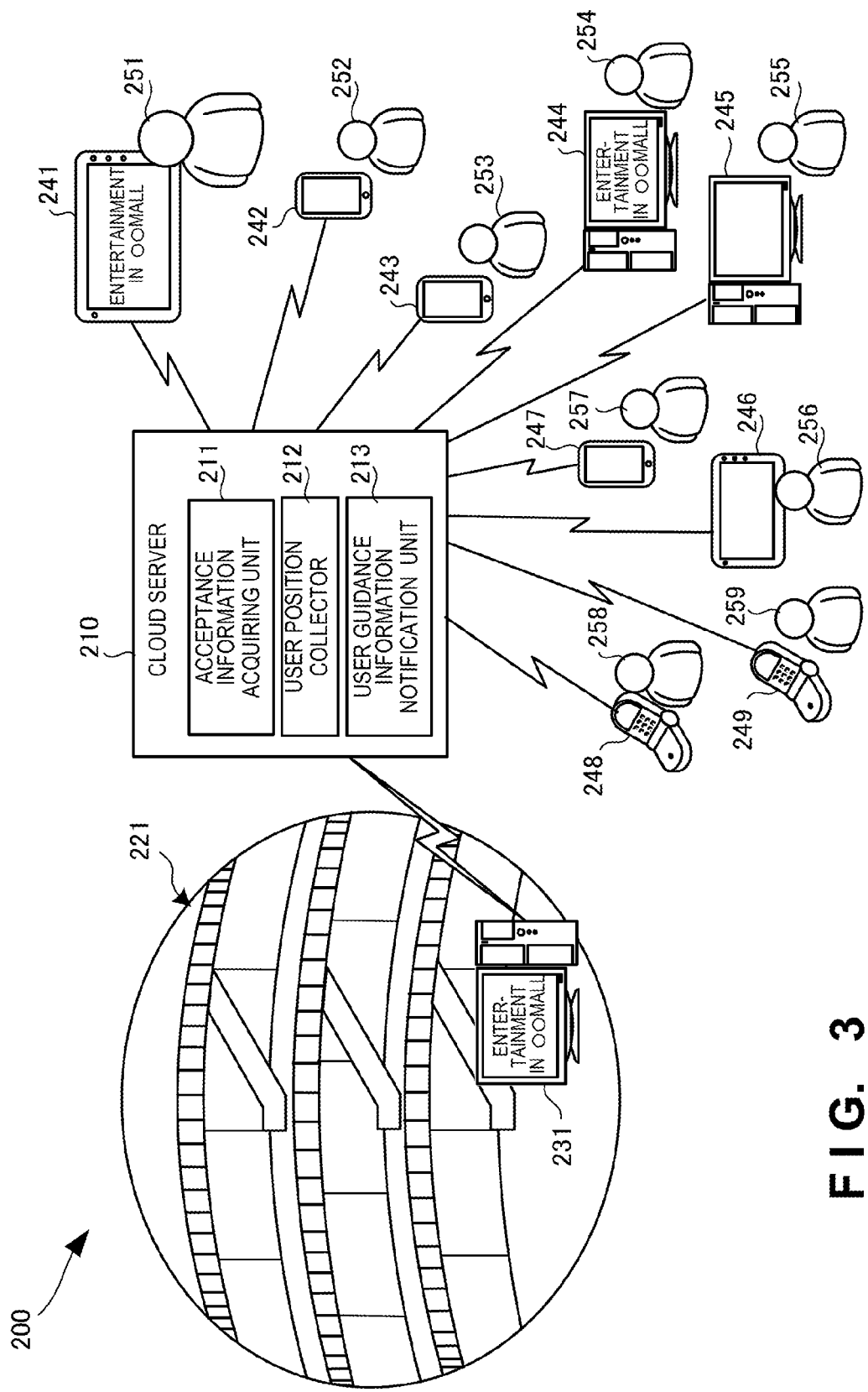
FIG. 3 is a block diagram showing the arrangement of the information processing system according to the second embodiment of the present invention.

FIG. 3 is a block diagram showing the arrangement of the information processing system 200 according to this embodiment.

The information processing system 200 includes a cloud server 210, a client terminal 231 installed in the ◯◯ mall 221 serving as a user acceptance place, and user terminals 241 to 249 of users 251 to 259.

An acceptance information acquiring unit 211 of the cloud server 210 acquires user acceptance information from the client terminal 231 of the ◯◯ mall 221. The acceptance information desirably includes, for example, event information such as an entertainment or a bargain sale in the ◯◯ mall 221, as information for guiding users. A user position collector 212 of the cloud server 210 collects the current positions of users from, for example, the GPS (Global Positioning System) position generators of the user terminals 241 to 249 of the respective users 251 to 259. A user guidance information notification unit 213 of the cloud server 210 notifies the user terminals 241 to 249 of the users 251 to 259 of guidance information that motivates users to gather in the ◯◯ mall 221. Here, the guidance information includes the reduction amount of the energy consumption amount, ongoing event information, bargain sale information, and reward point information.

(Operation Procedures)

Figure 4:
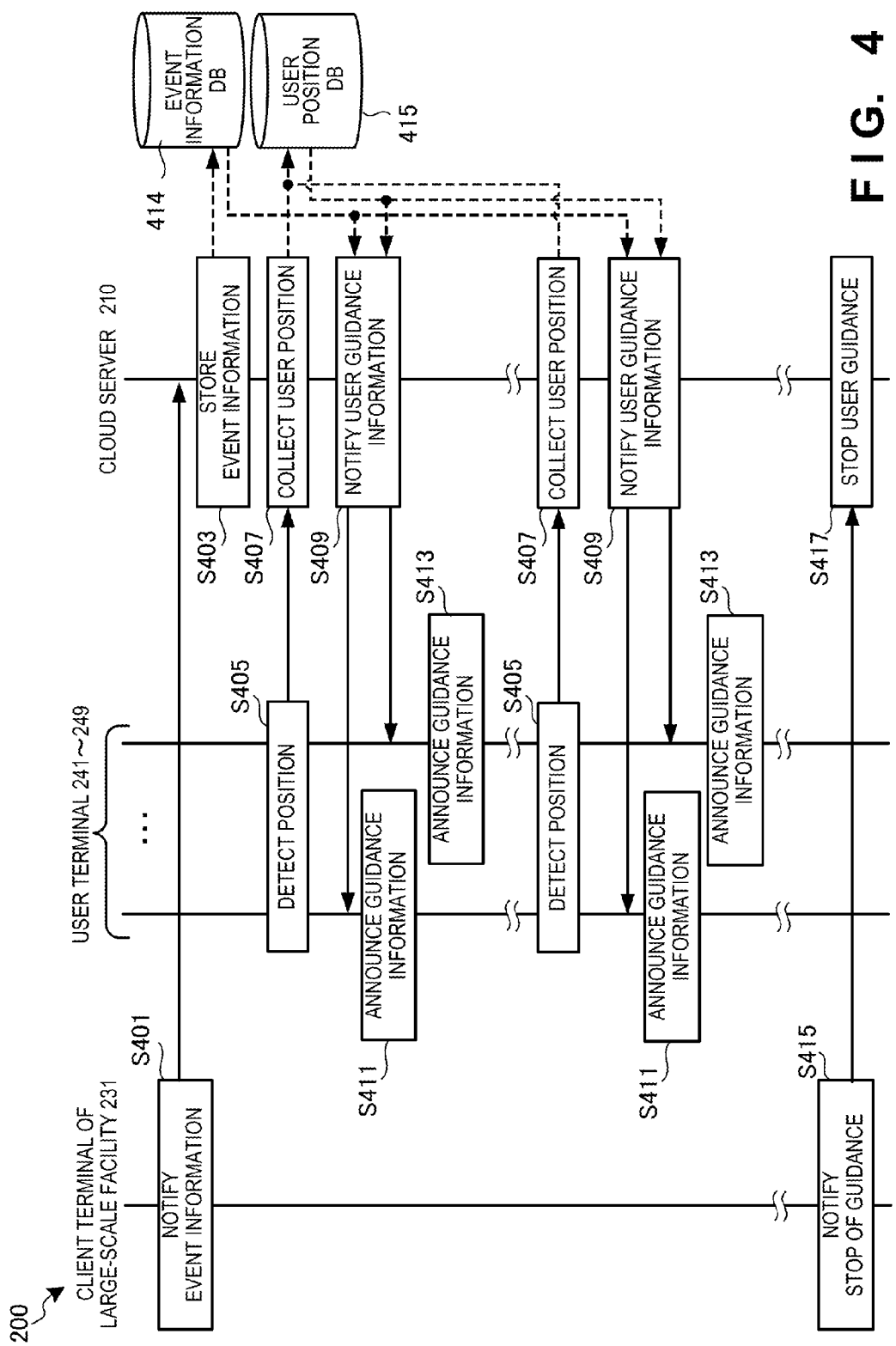
FIG. 4 is a sequence chart showing the operation procedures of the information processing system according to the second embodiment of the present invention.

FIG. 4 is a sequence chart showing the operation procedures of the information processing system 200 according to this embodiment.

In step S401, the client terminal 231 of the ◯◯ mall 221 serving as a large-scale facility notifies the cloud server 210 of event information. In step S403, the cloud server 210 stores the acquired event information in an event information DB 414 (see FIG. 10).

In step S405, the user terminals 241 to 249 detect positions and transmit the current positions of the users to the cloud server 210. The cloud server 210 collects the user positions and accumulates them in a user position DB 415 (see FIG. 10).

In step S409, the cloud server 210 refers to the event information DB 414 and the user position DB 415, and notifies the user terminals of users absent in the ◯◯ mall 221 of user guidance information. In step S411 or S413, the user terminals of the users absent in the ◯◯ mall 221 receive the guidance information and announce the guidance information to the user.

After that, the processes in steps S405 to S413 are repeated to collect user positions from the user terminals by the cloud server 210, and announce the guidance information to the user terminals of users absent in the ◯◯ mall 221.

If the number of persons for an event or the number of persons to be accommodated in an event place is satisfied, the client terminal 231 notifies the cloud server 210 to stop the user guidance in step S415. Upon receiving the notification from the client terminal 231, the cloud server 210 stops the user guidance in step S417. Note that the cloud server 210 can also limit the notification of user guidance information not to exceed the number of persons to be accommodated in an acceptance place.

<<Functional Arrangement of Cloud Server>>

Figure 5:
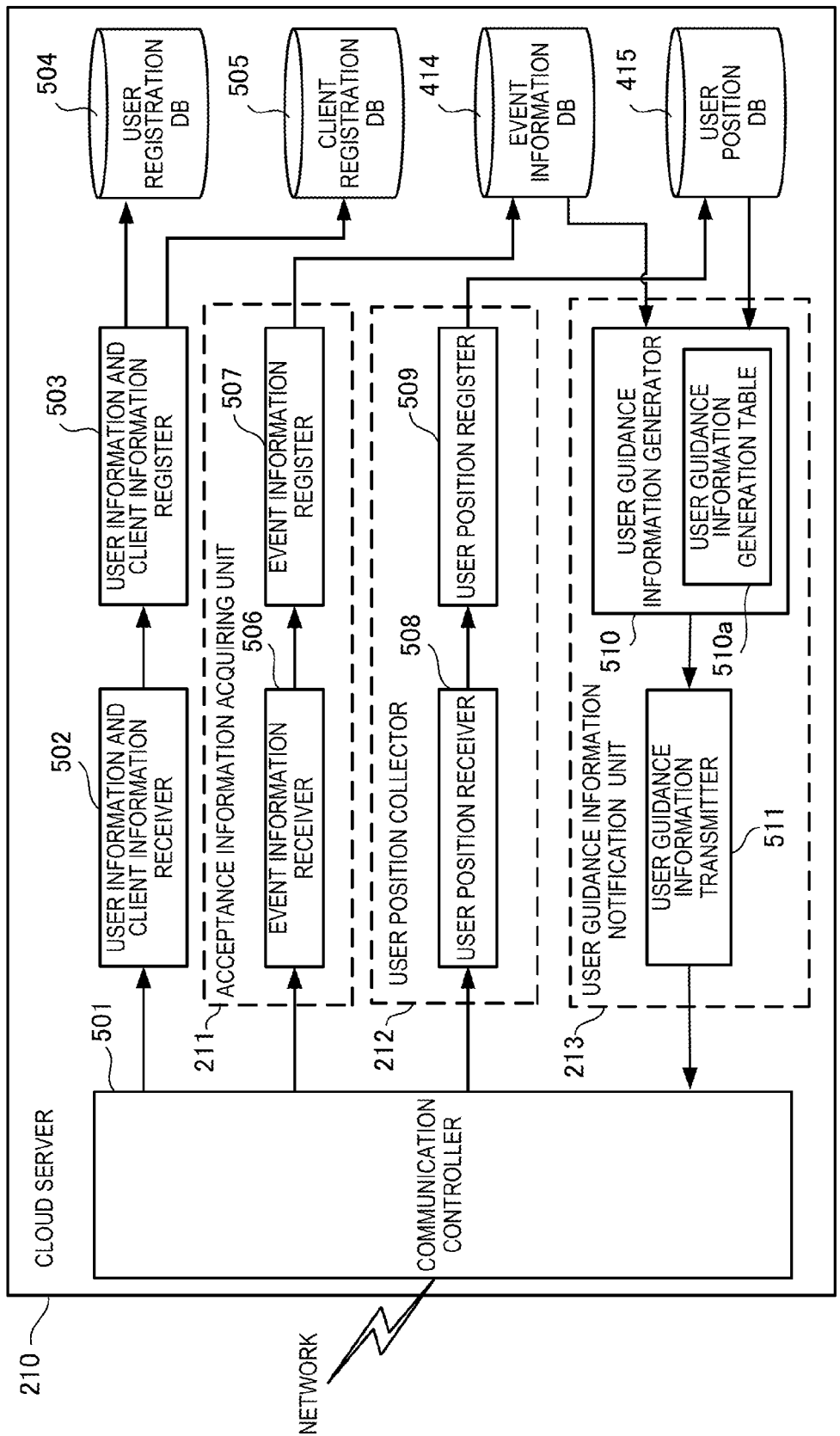
FIG. 5 is a block diagram showing the functional arrangement of a cloud server according to the second embodiment of the present invention.

FIG. 5 is a block diagram showing the functional arrangement of the cloud server 210 according to the second embodiment of the present invention.

The cloud server 210 includes a communication controller 501 that communicates with the user terminals 241 to 249 and the client terminal 231. A user information and client information receiver 502 receives, from the user terminals 241 to 249 via the communication controller 501, pieces of user information such as user IDs and authentication information, and pieces of user terminal information such as user terminal IDs and authentication information. Also, the user information and client information receiver 502 receives, from the client terminal 231 via the communication controller 501, client information such as a client ID and authentication information, and client terminal information such as a client terminal ID and authentication information. A user information and client information register 503 registers a user in a user registration DB 504 based on user information and user terminal information (see FIG. 8A). Also, the user information and client information register 503 registers a client in a client registration DB 505 based on client information and client terminal information (see FIG. 8B).

The acceptance information acquiring unit 211 includes an event information receiver 506 and an event information register 507. The event information receiver 506 receives event information from the client terminal 231 of the client (acceptance place). The event information register 507 registers the received event information in the event information DB 414 in association with the client (acceptance place).

The user position collector 212 includes a user position receiver 508 and a user position register 509. The user position receiver 508 receives user current positions from the user terminals 241 to 249. The user position register 509 registers the received user current positions in the user position DB 415 in association with the users.

The user guidance information notification unit 213 includes a user guidance information generator 510 and a user guidance information transmitter 511. The user guidance information generator 510 includes a user guidance information generation table 510a (see FIG. 12), and generates user guidance information to the user terminals 241 to 249. The user guidance information transmitter 511 transmits the generated user guidance information to users absent in the client (acceptance place).

<<Functional Arrangement of User Terminal>>

Figure 6:
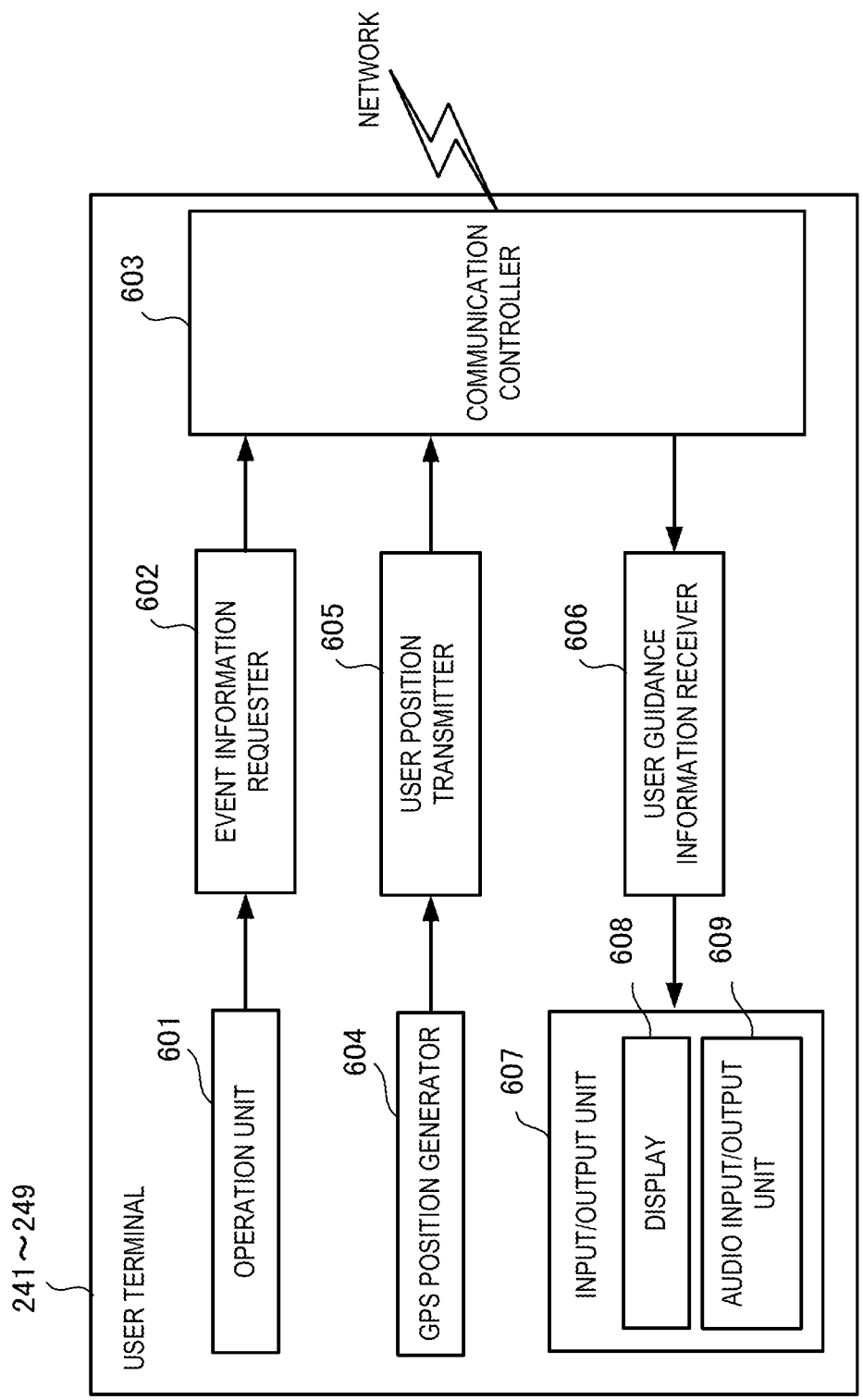
FIG. 6 is a block diagram showing the functional arrangement of a user terminal according to the second embodiment of the present invention.

FIG. 6 is a block diagram showing the functional arrangement of the user terminals 241 to 249 according to this embodiment. Note that the user terminals 241 to 249 can have various functions. FIG. 6 shows typical functions in this embodiment, but the arrangement of the user terminals 241 to 249 is not limited to them. That is, the user terminals 241 to 249 may include functions not shown in FIG. 6.

An operation unit 601 accepts operations to the user terminals 241 to 249 by the users. An event information requester 602 transmits, to the cloud server 210 via a communication controller 603, an event information request among operations input to the operation unit 601. The event information requester 602 is an option, and the user terminals 241 to 249 only wait for user guidance information from the cloud server 210 in this embodiment.

A GPS position generator 604 generates the current positions of the user terminals 241 to 249 as the current positions of the users. A user position transmitter 605 transmits, to the cloud server 210, the current positions of the users generated by the GPS position generator 604.

A user guidance information receiver 606 receives guidance information from the cloud server 210 to the users via the communication controller 603. An input/output unit 607 includes a display 608 and an audio input/output unit 609, and the display 608 displays guidance information to the users. The audio input/output unit 609 may output audio guidance information to the users.

<<Functional Arrangement of Client Terminal>>

Figure 7:
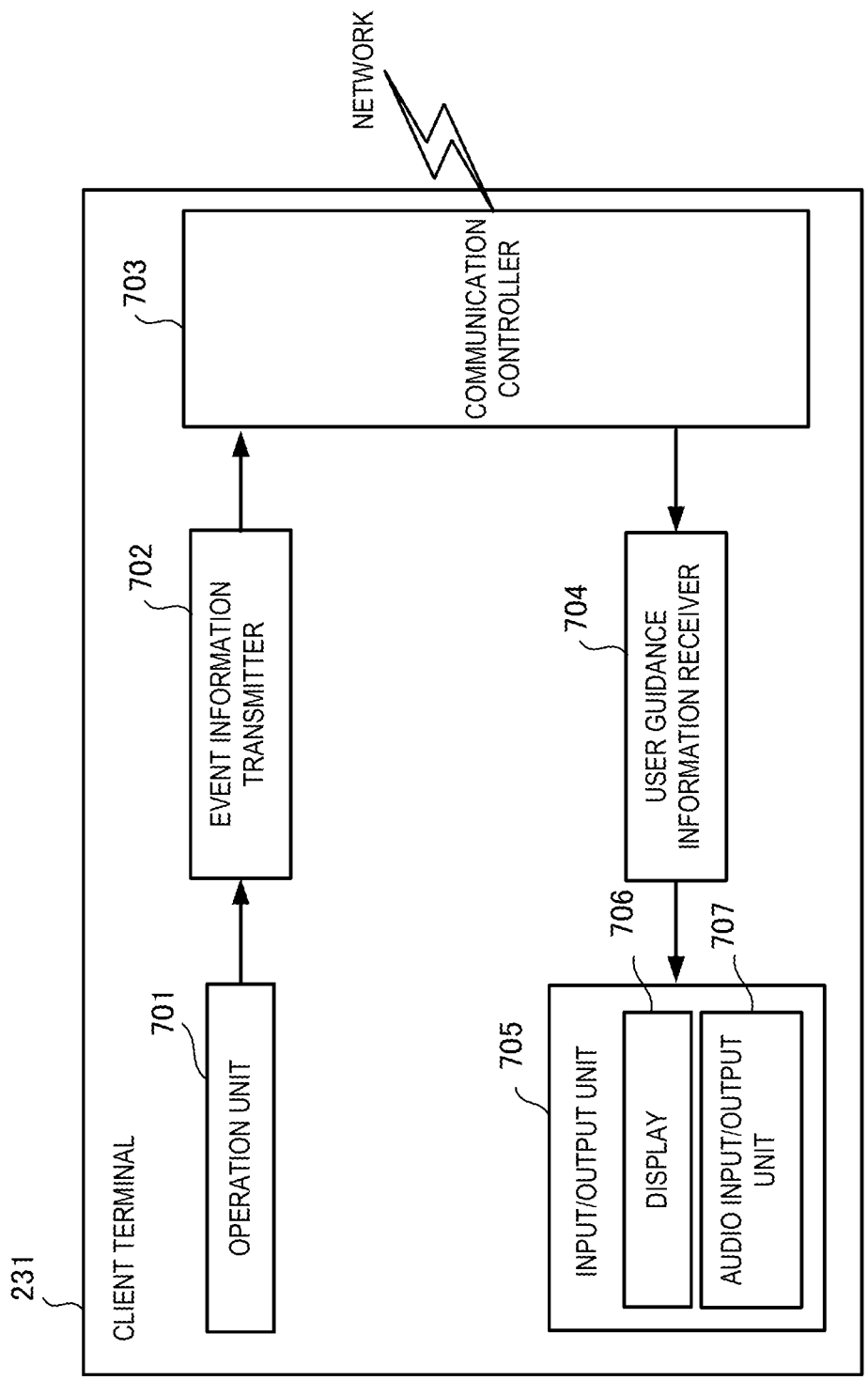
FIG. 7 is a block diagram showing the functional arrangement of a client terminal according to the second embodiment of the present invention.

FIG. 7 is a block diagram showing the functional arrangement of the client terminal 231 according to this embodiment. Note that the client terminal 231 can have various functions. FIG. 7 shows typical functions in the present invention, but the arrangement of the client terminal 231 is not limited to them. That is, the client terminal 231 may include functions not shown in FIG. 7.

An operation unit 701 accepts operations to the client terminal 231 by the client. An event information transmitter 702 transmits, to the cloud server 210 via a communication controller 703, event information in the client (acceptance place) among operations input to the operation unit 701.

A user guidance information receiver 704 receives user guidance information transmitted from the cloud server 210 to the users via the communication controller 703. An input/output unit 705 includes a display 706 and an audio input/output unit 707, and the display 706 displays received user guidance information. The audio input/output unit 707 may output audio user guidance information. By receiving and outputting this user guidance information, the final preparation of user acceptance is performed. Therefore, information transmitted from the cloud server 210 to the client terminal 231 suffices to be information capable of anticipating that users will move to the acceptance place.

Note that the user guidance information is desirably information considering a user guidance method, guidance route, and the like, or information to which the user guidance method, guidance route, and the like are added. The user guidance method, guidance route, and the like are generated by using information registered in the user registration DB 504 in FIG. 8A.

(User Registration DB)

FIG. 8A is a table showing the structure of the user registration DB 504 according to this embodiment. The user registration DB 504 registers a user who is guided to move in order to reduce the energy consumption amount in this embodiment. Note that the structure of the user registration DB 504 is not limited to that in FIG. 8A.

The user registration DB 504 stores user information such as user authentication information 812 in association with a user ID 811. The user registration DB 504 also stores user terminal information such as a user terminal ID 813 and terminal authentication information 814. The user registration DB 504 further stores a current address 815 of a user, a workplace/school 816 to which the user commutes, a workplace/school commute route 817, other related position information 818 used for user movement guidance, and the like.

(Client Registration DB)

Figure 8B:
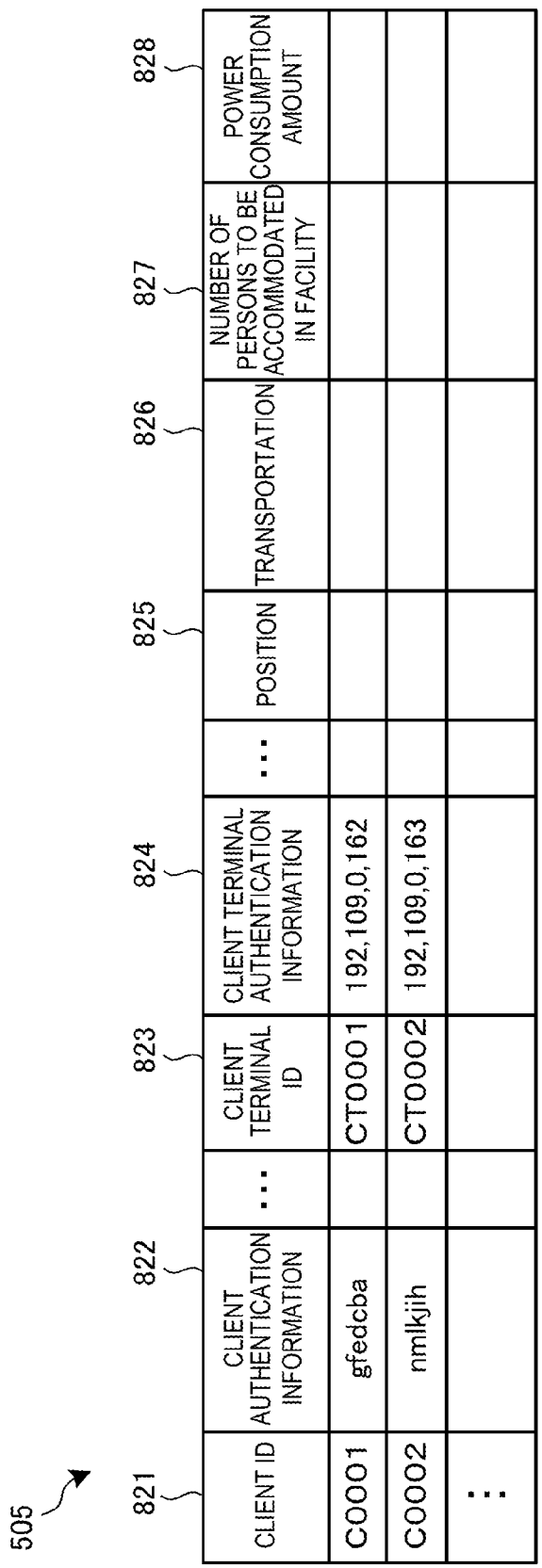
FIG. 8B is a table showing the structure of a client registration DB according to the second embodiment of the present invention.

FIG. 8B is a table showing the structure of the client registration DB 505 according to this embodiment. The client registration DB 505 registers a client who proposes an acceptance place for guiding users to move, in order to reduce the energy consumption amount in this embodiment. Note that the structure of the client registration DB 505 is not limited to that in FIG. 8B.

The client registration DB 505 stores user information such as client authentication information 822 in association with a client ID 821. The client registration DB 505 also stores client terminal information such as a client terminal ID 823 and terminal authentication information 824. The client registration DB 505 further stores a position 825 of the client acceptance place, a transportation 826 for moving users to the acceptance place, the number 827 of persons to be accommodated in the acceptance place facility, a power consumption amount 828 of the acceptance place facility, and the like.

Note that the user registration DB 504 and the client registration DB 505 may be stored as one database.

(Event Information DB)

Figure 9:
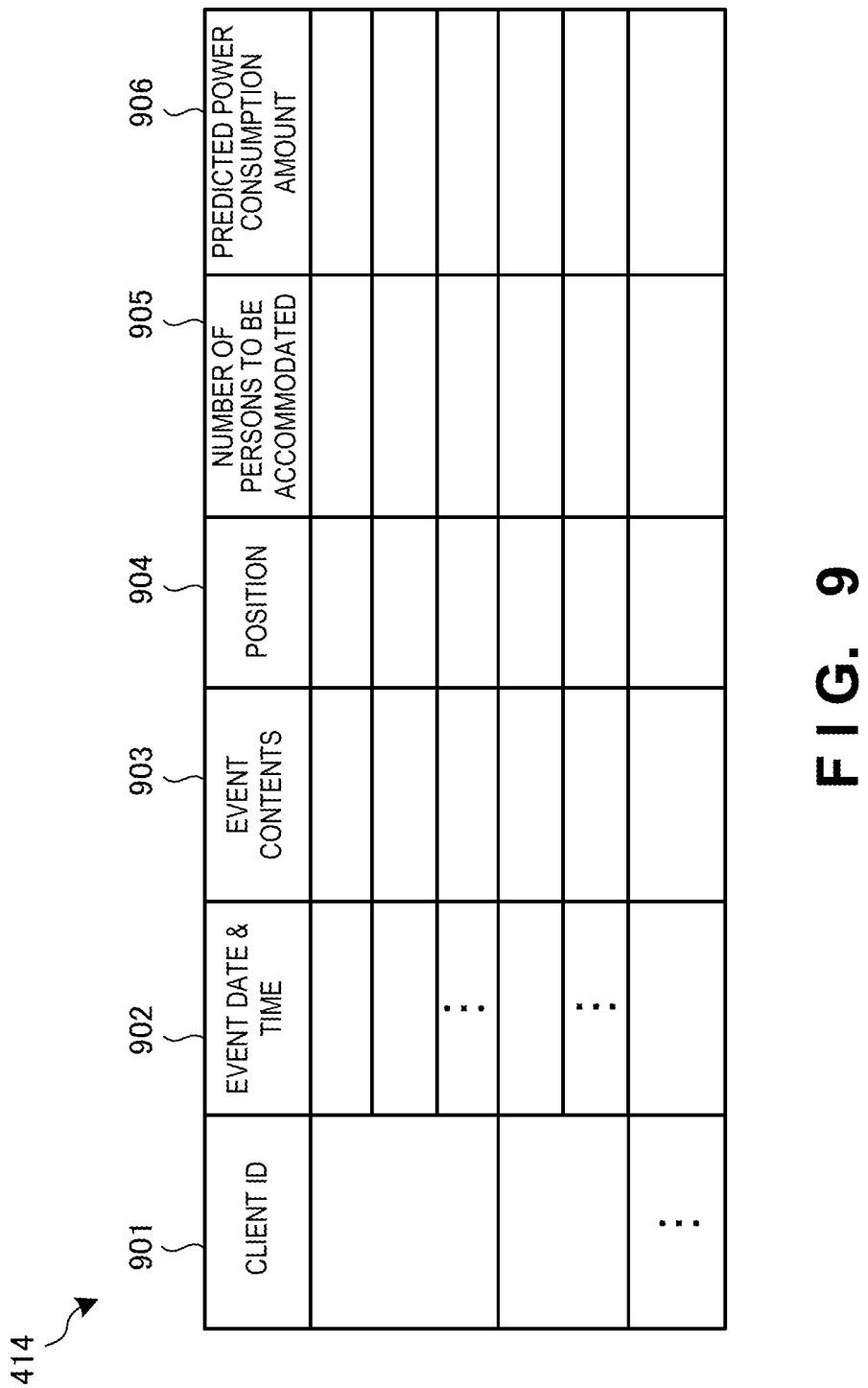
FIG. 9 is a table showing the structure of an event information DB according to the second embodiment of the present invention.

FIG. 9 is a table showing the structure of the event information DB 414 according to this embodiment. The event information DB 414 registers information about an event to be held in a client (acceptance place) to which users are guided to move, in order to reduce the energy consumption amount in this embodiment. Note that the structure of the event information DB 414 is not limited to that in FIG. 9.

For an event to be held, the event information DB 414 stores, in association with a client ID 901, an event date & time 902, event contents 903, a position 904 of the acceptance place, the number 905 of persons to be accommodated in the acceptance place, a predicted power consumption amount 906, and the like.

(User Position DB)

Figure 10:
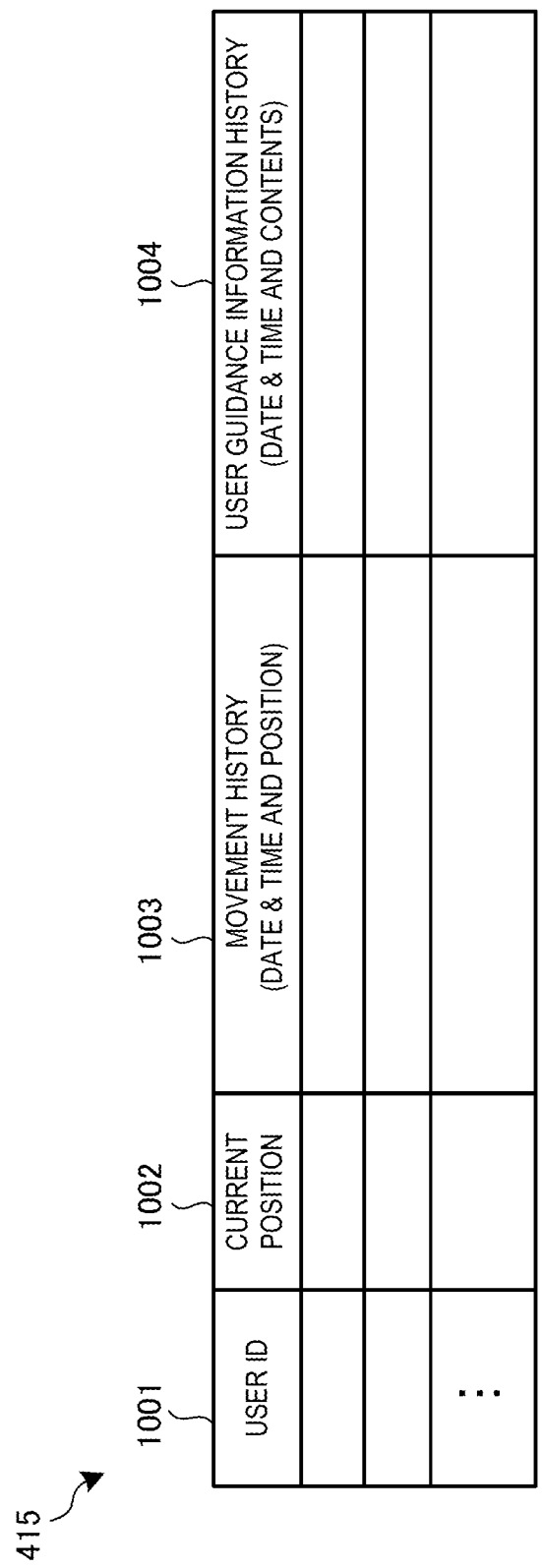
FIG. 10 is a table showing the structure of a user position DB according to the second embodiment of the present invention.

FIG. 10 is a table showing the structure of the user position DB 415 according to this embodiment. The user position DB 415 registers the movement history and current position of a user who is guided to move, in order to reduce the energy consumption amount in this embodiment. Note that the structure of the user position DB 415 is not limited to that in FIG. 10.

The user position DB 415 stores, in association with a user ID 1001, a received current position 1002, a past movement history 1003 represented by a set of the date & time and the position, and a user guidance information history 1004 transmitted to a user represented by a set of the date & time and the contents. By accumulating the movement history 1003 and the user guidance information history 1004, the influence and effect of notification of user guidance information can be grasped, and the contents and notification method of the user guidance information can be improved.

<<Hardware Arrangement of Cloud Server>>

Figure 11:
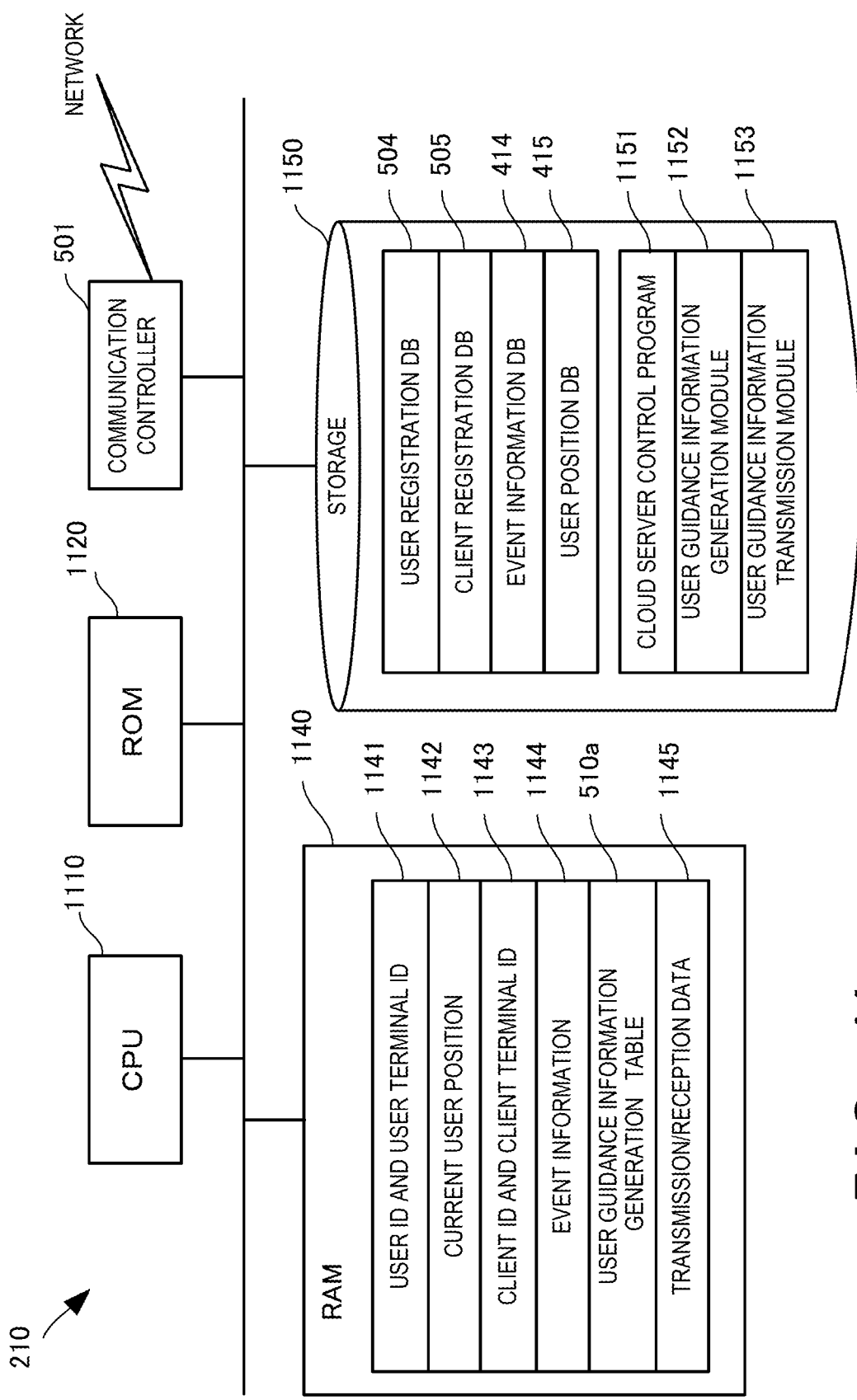
FIG. 11 is a block diagram showing the hardware arrangement of the cloud server according to the second embodiment of the present invention.

FIG. 11 is a block diagram showing the hardware arrangement of the cloud server 210 according to this embodiment.

In FIG. 11, a CPU 1110 is a processor for arithmetic control, and implements each functional component of the cloud server 210 in FIG. 5 by executing a program. A ROM 1120 stores permanent data and programs such as initial data and programs. The communication controller 501 communicates with the user terminals 241 to 249 and the client terminal 231 via a network. Note that the CPU 1110 is not limited to one, and may include a plurality of CPUs or include a GPU (Graphics Processing Unit) for image processing.

A RAM (Random Access Memory) 1140 is used as a temporary storage work area by the CPU 1110. An area for storing data necessary to implement this embodiment is ensured in the RAM 1140. A user ID and user terminal ID 1141 represents the identifier of a user who is guided to move to an acceptance place, and the identifier of a user terminal. A current user position 1142 is the current position of a user (user terminal) acquired from each user terminal. A client ID and client terminal ID 1143 represents the identifier of a client (acceptance place) to which users are guided to move, and the identifier of a client terminal. Event information 1144 is event information representing an event to be held in the acceptance place by the client in order to guide users. The user guidance information generation table 510a is a table for generating user guidance information to guide users to the client (acceptance place) (see FIG. 12). Transmission/reception data 1145 is data to be transmitted/received to/from a user terminal and a client terminal via the communication controller 501.

A storage 1150 stores databases, various parameters, or data or programs necessary to implement this embodiment. The user registration DB 504 is the database shown in FIG. 8A. The client registration DB 505 is the database shown in FIG. 8B. The event information DB 414 is the database shown in FIG. 9. The user position DB 415 is the database shown in FIG. 10 in which the current positions of users are collected.

The storage 1150 stores the following programs. A cloud server control program 1151 is a program for controlling the overall cloud server 210. A user guidance information generation module 1152 is a module for generating user guidance information to be transmitted to users absent in the client (acceptance place) in the cloud server control program 1151. A user guidance information transmission module 1153 is a module for transmitting user guidance information generated for users absent in the client (acceptance place) based on collected current user positions in the cloud server control program 1151.

Note that programs and data associated with the general-purpose functions of the cloud server 210 and other implementable functions are not shown in the RAM 1140 and the storage 1150 in FIG. 11.

(User Guidance Information Generation Table)

Figure 12:
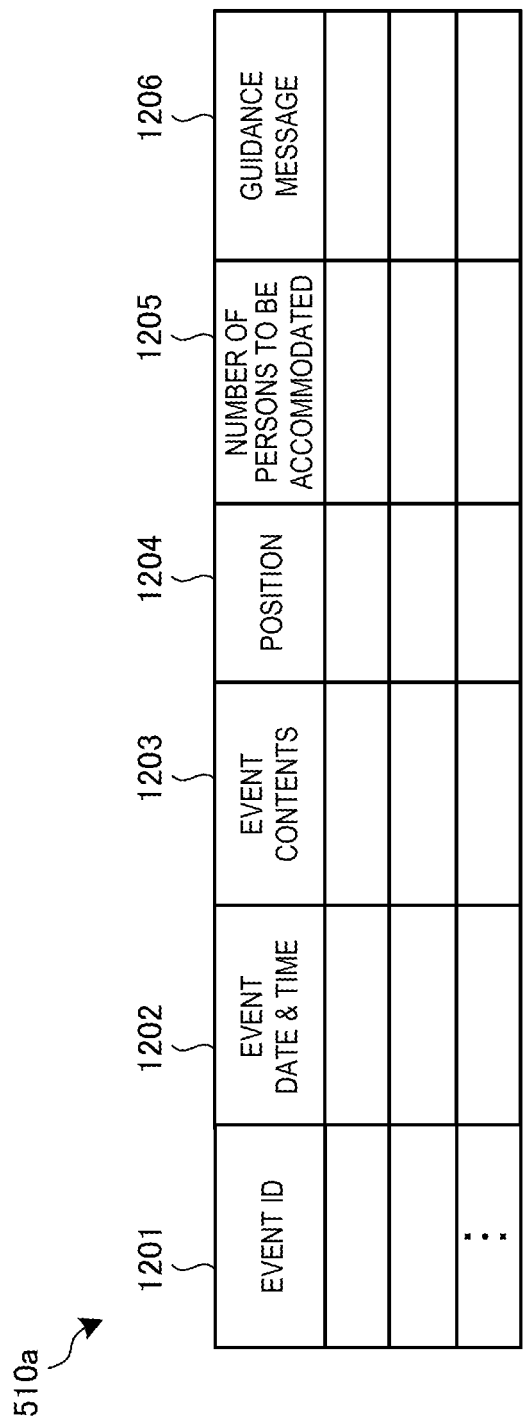
FIG. 12 is a table showing the structure of a user guidance information generation table according to the second embodiment of the present invention.

FIG. 12 is a table showing the structure of the user guidance information generation table 510a according to this embodiment. The user guidance information generation table 510a is a table for generating user guidance information for guiding users to the client (acceptance place).

The user guidance information generation table 510a stores, in association with an ID 1201 of an event proposed by a client (acceptance place), an event date & time 1202, event contents 1203, a position 1204 of the client (acceptance place), the number 1205 of persons to be accommodated in the client (acceptance place), and a guidance message 1206 to users.

<<Processing Procedures of Cloud Server>>

Figure 13:
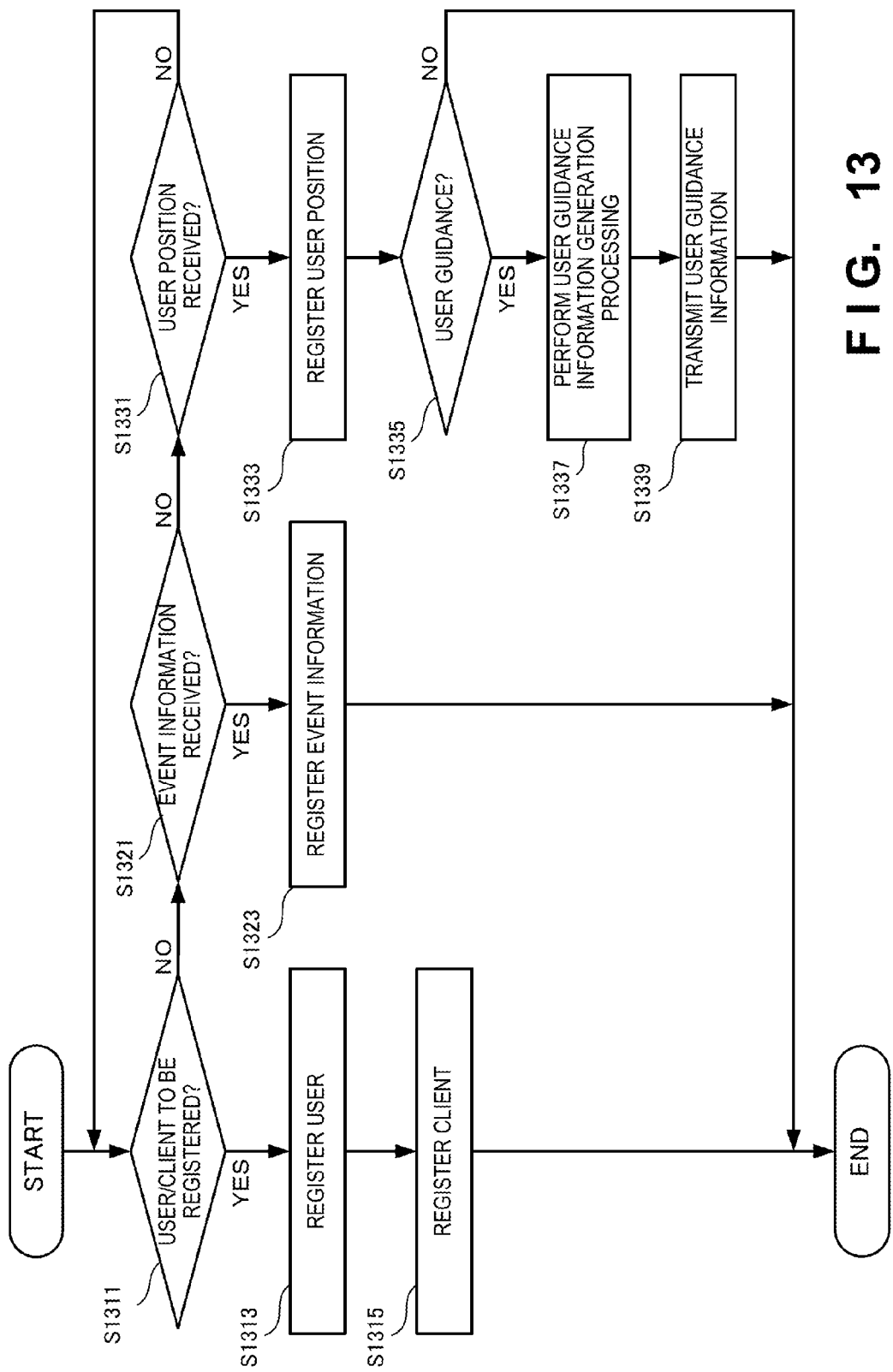
FIG. 13 is a flowchart showing the processing procedures of the cloud server according to the second embodiment of the present invention.

FIG. 13 is a flowchart showing the processing procedures of the cloud server 210 according to this embodiment. This flowchart is executed by the CPU 1110 in FIG. 11 using the RAM 1140, thereby implementing the functional components in FIG. 5.

In step S1311, the cloud server 210 determines whether registration of a user or client has been received. If registration of a user or client has not been received, the cloud server 210 determines in step S1321 whether event information from a client has been received. If neither registration of a user or client nor event information from a client has been received, the cloud server 210 determines in step S1331 whether a user position from a user terminal has been received.

If registration of a user or client has been received, the cloud server 210 advances to step S1313, and registers the user in the user registration DB 504 in step S1313 in the case of user registration. In the case of client registration, the cloud server 210 registers the client in the client registration DB 505 in step S1315.

If event information from a client has been received, the cloud server 210 advances to step S1323, and stores the event information in the event information DB 414 in association with the client (acceptance place).

If current position information from a user terminal has been received, the cloud server 210 advances to step S1333, and stores the user position in the user position DB 415 in association with the user. In step S1335, the cloud server 210 determines whether the timing to guide users to the client (acceptance place) has come. Note that the timing to guide users to the client (acceptance place) may be decided in association with the date & time of an event to be held in the client (acceptance place), or based on the rise of the energy consumption amount of the day. If the cloud server 210 determines that the timing to guide users to the client (acceptance place) has come, it generates user guidance information based on the information of the event to be held in the client (acceptance place) in step S1337 so as to, for example, guide users to move. Alternatively, if users are guided based on the rise of the energy consumption amount of the day, the user guidance information may be a message calling for movement to reduce the energy consumption amount. In step S1339, the cloud server 210 transmits the generated user guidance information to the user terminals of users absent in the client (acceptance place).

In the case of the user guidance based on the rise of the energy consumption amount of the day, the cloud server 210 acquires the energy consumption amount of the day in the user guidance timing determination of step S1335, and determines whether the energy consumption amount has risen. Note that the energy consumption amount of the day can be acquired by acquiring power consumption amounts in the respective houses of users by sensors or the like and integrating them by the cloud server 210, by acquiring a power supply amount from a power supplier by the cloud server 210, or by acquiring an alternative value such as the national average power consumption amount. Further, in the user guidance timing determination of step S1335, a case in which power consumption in an acceptance place facility when guiding users (see FIG. 8B) is smaller than the sum of the current power consumptions of individual users is desirably set as the user guidance timing.

Note that the hardware arrangement of the user terminals 241 to 249 and the client terminal 231 is an arrangement in which the CPU executes a program stored in the storage while using the RAM, as in FIG. 11, and the drawing and description thereof will be omitted.

According to this embodiment, the energy consumption amount can be reduced by guiding and gathering users to an acceptance place that proposes acceptance of users.

Third Embodiment

An information processing system according to the third embodiment of the present invention will be described next. The information processing system according to the third embodiment is different from the second embodiment in that the guidance destinations of users are assigned to a plurality of acceptance places. The remaining arrangement and operation are the same as those in the second embodiment, the same reference numerals denote the same arrangement and operation, and a detailed description thereof will not be repeated.

According to this embodiment, the energy consumption amount can be further reduced by assigning and guiding users to a plurality of acceptance places that propose acceptance of users.

Note that this embodiment will explain the current position of a user (related to the distance from an acceptance place) and the attribute of the user representatively as conditions to assign users to a plurality of acceptance places. However, the present invention is not limited to them. For example, when the pieces of information shown in FIGS. 8A and 8B in the second embodiment are used, regions can be assigned in correspondence with the numbers of persons to be accommodated in acceptance places, or users can be assigned to routes familiar to the users.

Figure 18:
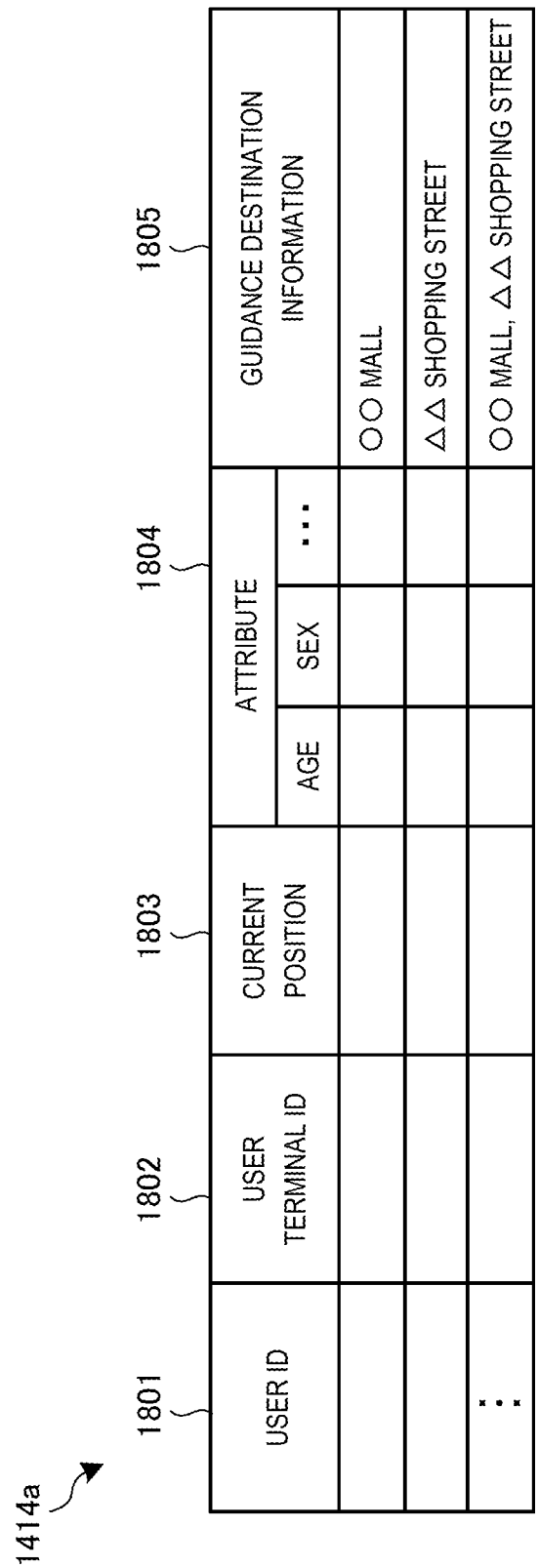
FIG. 18 is a table showing the structure of a guidance destination assignment table according to the third embodiment of the present invention.

Various users can be assigned to a plurality of acceptance places. Further, such assignment is also possible to guide one user to a plurality of acceptance places, as shown in FIG. 18. In this manner, this embodiment includes various user assignment methods in order to reduce energy consumption. Note that characteristic conditions and special conditions of assignment will be described in the following fourth to eighth embodiments.

<<Information Processing System>>

An information processing system 1400 according to this embodiment will be explained with reference to FIGS. 14 to 16.

(Operation Concept)

FIG. 14 is a view for explaining the operation concept of the information processing system 1400 according to this embodiment. In FIG. 14, the same reference numerals as those in FIG. 2 denote the same components.

In the information processing system 1400 of FIG. 14, a ◯◯ mall 221 and △△ shopping street 1422 serving as a plurality of large-scale facilities announce themselves as user acceptance places in order to reduce the energy consumption amount. In the left drawing of FIG. 14, users are scattered in houses and towns, energy consumption is diffused or redundant, and the energy consumption amount is not satisfactorily reduced. In the right drawing of FIG. 14, movement destinations are assigned to the users scattered in the houses and towns, users 1451 move to the △△ shopping street 1422, and users 1452 move to the ◯◯ mall 221. The ◯◯ mall 221 and △△ shopping street 1422 serving as a plurality of large-scale facilities are assigned to the users, and the users concentrate in the respective facilities. Hence, energy consumption can be concentrated in the plurality of large-scale facilities to increase the use efficiency and satisfactorily reduce the energy consumption amount.

Note that the ◯◯ mall 221 and the △△ shopping street 1422 are illustrated as facilities close to each other in FIG. 14, but may be located in distant places.

Figure 15:
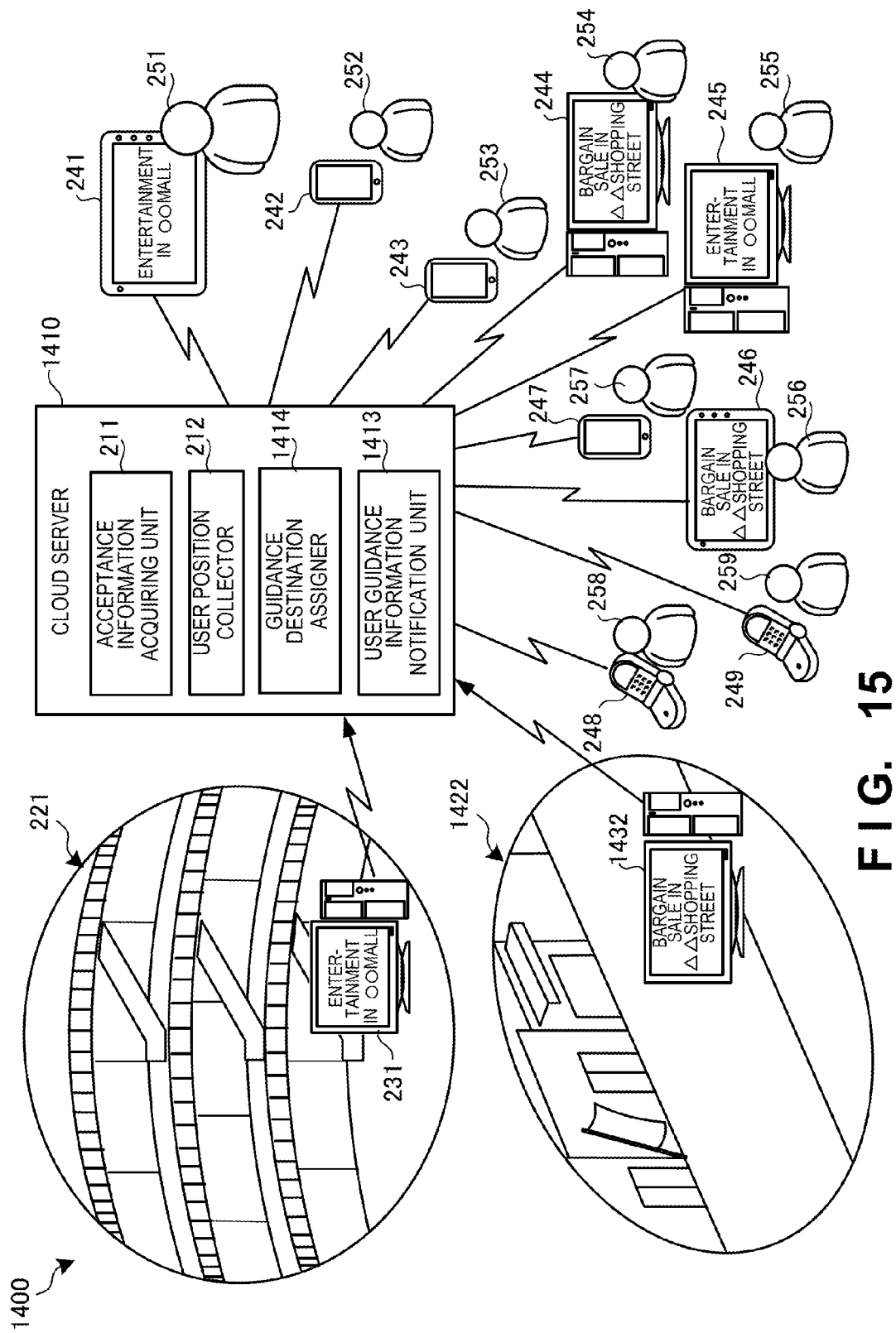
FIG. 15 is a block diagram showing the arrangement of the information processing system according to the third embodiment of the present invention.

(System Arrangement) FIG. 15 is a block diagram showing the arrangement of the information processing system 1400 according to this embodiment. In FIG. 15, the same reference numerals as those in FIG. 3 denote the same components.

The information processing system 1400 includes a cloud server 1410, a client terminal 231 installed in the ◯◯ mall 221 serving as a user acceptance place, a client terminal 1432 installed in the △△ shopping street 1422 serving as a user acceptance place, and user terminals 241 to 249 of users 251 to 259.

An acceptance information acquiring unit 211 of the cloud server 1410 acquires pieces of user acceptance information from the client terminal 231 of the ◯◯ mall 221 and the client terminal 1432 of the △△ shopping street 1422. The acceptance information desirably includes, for example, pieces of event information such as an entertainment in the ◯◯ mall 221 and a bargain sale in the △△ shopping street 1422, as information for guiding users. A user position collector 212 of the cloud server 1410 collects the current positions of users from, for example, the GPS position generators of the user terminals 241 to 249 of the respective users 251 to 259. A guidance destination assigner 1414 of the cloud server 1410 assigns the guidance destinations of users to the ◯◯ mall 221 and △△ shopping street 1422 serving as a plurality of acceptance places. Note that guidance destinations are assigned to enhance the guidance effect based on the positional relationship with the acceptance place of each user, the user attribute, and the like (see FIG. 18). A user guidance information notification unit 1413 of the cloud server 1410 notifies the user terminals 241 to 249 of the users 251 to 259 of guidance information that motivates users to gather in the ◯◯ mall 221, and guidance information that motivates users to gather in the △△ shopping street 1422.

Note that FIG. 15 shows the displays on the user terminals 241 to 249 to guide users to either the ◯◯ mall 221 or the △△ shopping street 1422. However, the user terminals 241 to 249 may be notified of both of the pieces of guidance information while, for example, changing the order or changing the number of times.

(Operation Procedures)

Figure 16:
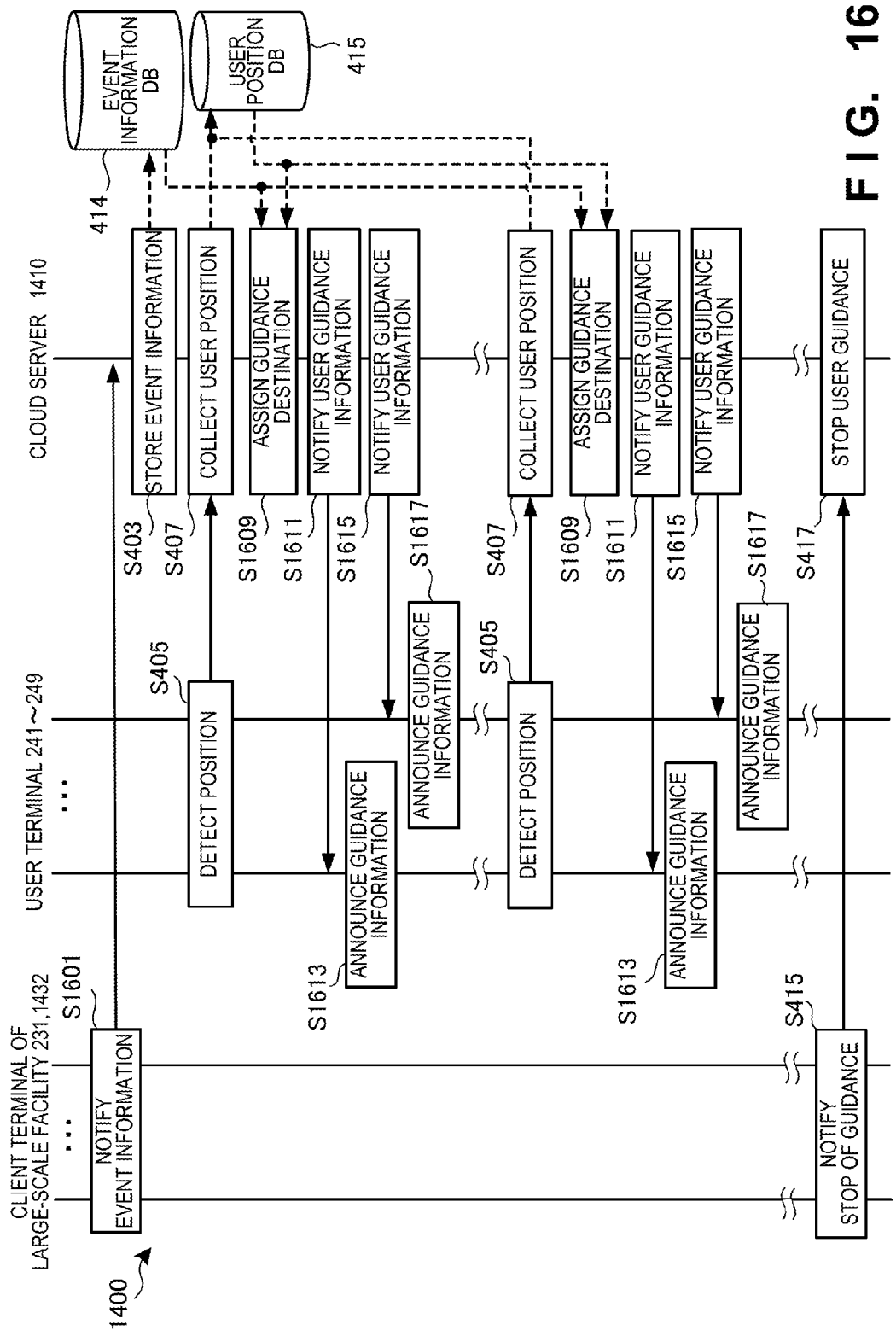
FIG. 16 is a sequence chart showing the operation procedures of the information processing system according to the third embodiment of the present invention.

FIG. 16 is a sequence chart showing the operation procedures of the information processing system 1400 according to this embodiment. In FIG. 16, the same step numbers as those in FIG. 4 of the second embodiment denote the same steps, and a description thereof will not be repeated.

In step S1601, the plurality of client terminals 231 and 1432 of the ◯◯ mall 221 and △△ shopping street 1422 serving as large-scale facilities propose, to the cloud server 1410, user acceptance including pieces of event information. In step S403, the cloud server 1410 stores the pieces of event information from the plurality of client terminals 231 and 1432 in an event information DB 414.

In step S1609, the cloud server 1410 refers to the event information DB 414 and a user position DB 415, and assigns the guidance destinations of users by using a guidance destination assignment table 1414*a* (see FIG. 18). In accordance with the guidance destination assignment, the cloud server 1410 notifies user terminals of user guidance information to one acceptance place in step S1611. Upon receiving the user guidance information to one acceptance place, the user terminals announce the user guidance information to one acceptance place in step S1613. Also, in accordance with the guidance destination assignment, the cloud server 1410 notifies user terminals of user guidance information to the other acceptance place in step S1615. Upon receiving the user guidance information to the other acceptance place, the user terminals announce the user guidance information to the other acceptance place in step S1617. Note that users can also be assigned not to exceed the number of persons to be accommodated.

After that, the cloud server 1410 repeats the processes in steps S405 to S1617 to collect user positions and announce the pieces of guidance information to the user terminals of users absent in the ◯◯ mall 221 and the △△ shopping street 1422. If the numbers of persons for events or the numbers of persons to be accommodated in event places are satisfied, the client terminals 231 and 1432 notify the cloud server 1410 to stop the user guidance in step S415. Upon receiving the stop of the user guidance, the cloud server 1410 stops the user guidance in step S417. When the cloud server 1410 assigns the guidance destinations of users, the assignment can also be limited not to exceed the numbers of persons to be accommodated in respective acceptance places.

<<Functional Arrangement of Cloud Server>>

Figure 17:
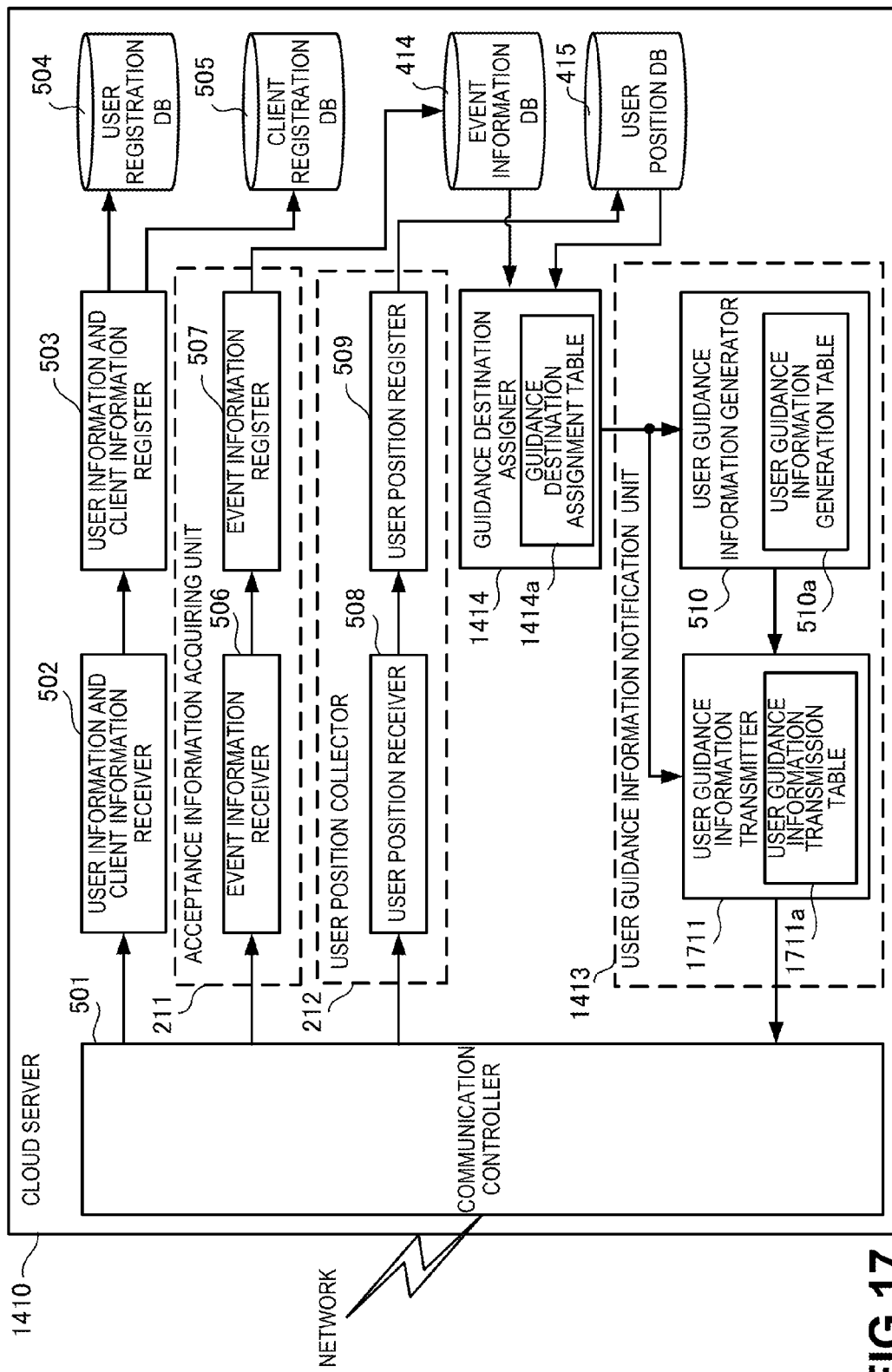
FIG. 17 is a block diagram showing the functional arrangement of a cloud server according to the third embodiment of the present invention.

FIG. 17 is a block diagram showing the functional arrangement of the cloud server 1410 according to this embodiment. In FIG. 17, the same reference numerals as those in FIG. 5 of the second embodiment denote the same functional components, and a description thereof will not be repeated.

The guidance destination assigner 1414 includes the guidance destination assignment table 1414*a*, and assigns the guidance destinations of users to a plurality of acceptance places.

The user guidance information notification unit 1413 includes a user guidance information generator 510 and a user guidance information transmitter 1711. The user guidance information generator 510 includes a user guidance information generation table 510a, and generates pieces of user guidance information corresponding to assignment of guidance destinations to the user terminals 241 to 249. The user guidance information transmitter 1711 includes a user guidance information transmission table 1711a, and transmits generated user guidance information to each user to which a guidance destination is assigned.

(Guidance Destination Assignment Table)

FIG. 18 is a table showing the structure of the guidance destination assignment table 1414a according to this embodiment. The guidance destination assignment table 1414a is used to assign users to a plurality of clients (acceptance places) serving as a plurality of guidance destinations.

The guidance destination assignment table 1414a stores a current position 1803 of a user and an attribute 1804 of the user in association with a user ID 1801 and a user terminal ID 1802. The guidance destination assignment table 1414a stores guidance destination information 1805 assigned from a plurality of guidance destinations based on the current position 1803 of the user and the attribute 1804 of the user. Note that the guidance destination information 1805 may not only assign users to different guidance destinations, but also guide users to a plurality of guidance destinations and guide them to overlapping guidance destinations.

(User Guidance Information Transmission Table)

FIG. 19 is a table showing the structure of the user guidance information transmission table 1711a according to this embodiment. The user guidance information transmission table 1711a stores an acceptance place (=guidance destination) to which each user is guided, and distributes transmission of user guidance information to a user terminal.

The user guidance information transmission table 1711a stores whether to give guidance 1903 to the first event to guidance 1904 to the nth event in association with a user ID 1901 and a user terminal ID 1902. In FIG. 19, ◯ represents a guidance destination to which guidance is given, x represents a guidance destination to which guidance is not given, and Δ represents a next best guidance destination. Note that the user guidance information transmission table 1711a may store the priorities of a plurality of guidance destinations.

<<Processing Procedures of Cloud Server>>

Figure 20:
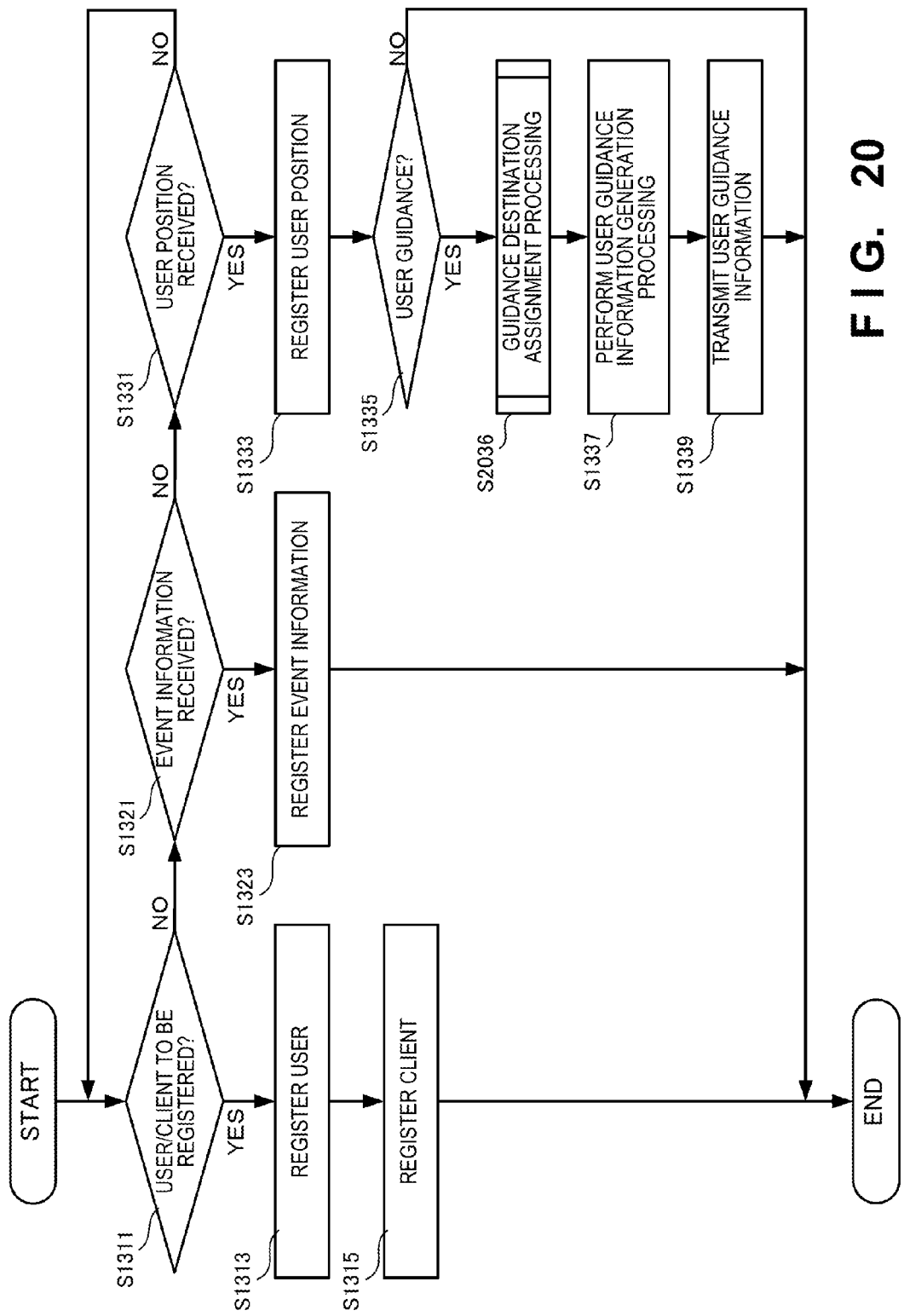
FIG. 20 is a flowchart showing the processing procedures of the cloud server according to the third embodiment of the present invention.

FIG. 20 is a flowchart showing the processing procedures of the cloud server 1410 according to this embodiment. In FIG. 20, the same step numbers as those in FIG. 13 denote the same steps, and a description thereof will not be repeated. This flowchart is executed by a CPU 1110 in FIG. 11 using a RAM 1140, thereby implementing the functional components in FIG. 17.

The difference between FIGS. 20 and 13 is that the cloud server 1410 performs processing of assigning a plurality of acceptance places (guidance destinations) in guidance destination assignment processing (see FIG. 21) in step S2036. In step S1337, the cloud server 1410 generates user guidance information that guides a user to an assigned guidance destination. In step S1339, the cloud server 1410 transmits, to a user terminal, the user guidance information to the assigned guidance destination.

(Guidance Destination Assignment Processing)

Figure 21:
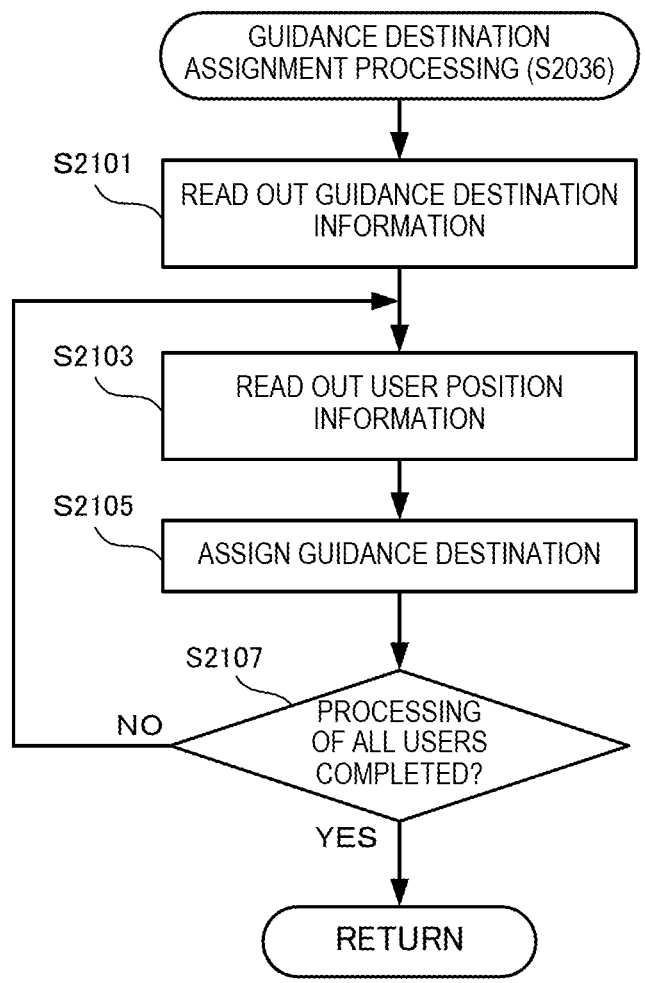
FIG. 21 is a flowchart showing the procedures of guidance destination assignment processing according to the third embodiment of the present invention.

FIG. 21 is a flowchart showing the procedures of the guidance destination assignment processing (S2036) according to this embodiment.

In step S2101, the cloud server 1410 reads out guidance destination information from the event information DB 414. In step S2103, the cloud server 1410 reads out user position information from the user position DB 415. In step S2105, the cloud server 1410 assigns guidance destinations to users in accordance with the guidance destination assignment table 1414a based on the guidance destination information, the user position information, user attribute information, or the like. In step S2107, the cloud server 1410 determines whether the guidance processing of all users has been completed. The cloud server 1410 repeats steps S2103 to S2107 until the guidance processing of all users has been completed. Note that all users here can be selected in correspondence with the purpose of this embodiment, such as all users registered in a user registration DB 504, all users whose current positions can be collected from user terminals, or all users in a predetermined region.

According to this embodiment, the energy consumption amount can be further reduced by assigning and guiding users to a plurality of acceptance places that propose acceptance of users.

Fourth Embodiment

An information processing system according to the fourth embodiment of the present invention will be described next. The information processing system according to the fourth embodiment is different from the second and third embodiments in that users are assigned and guided in accordance with the desire of an acceptance place. The desire of an acceptance place includes user conditions including the attributes (for example, sex and age) of a user to be accepted. The remaining arrangement and operation are the same as those in the second embodiment, the same reference numerals denote the same arrangement and operation, and a detailed description thereof will not be repeated.

According to this embodiment, users are assigned and guided in accordance with the desire of an acceptance place, so users who satisfy the acceptance place can be gathered.

<<Operation Procedures of Information Processing System>>

Figure 22:
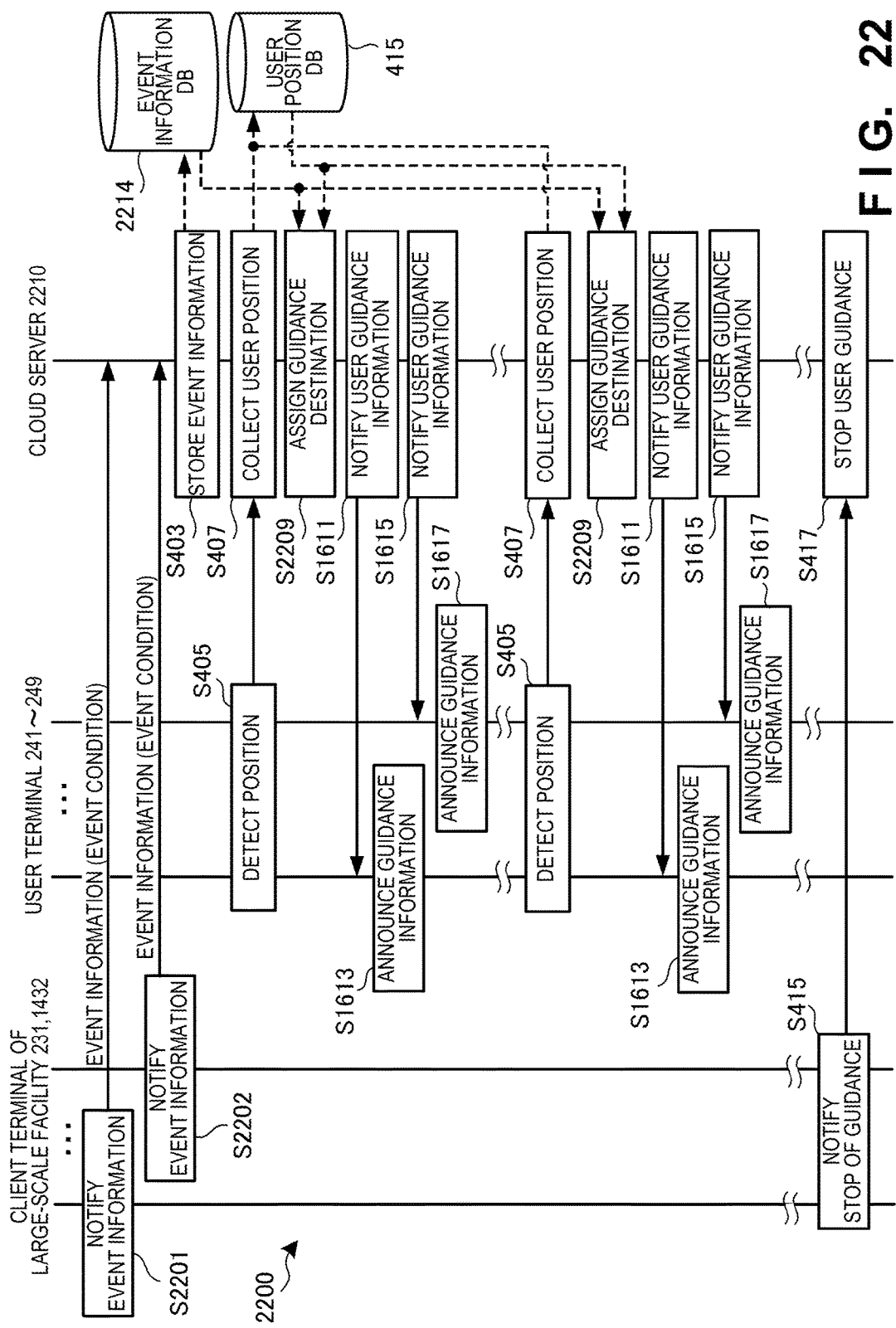
FIG. 22 is a sequence chart showing the operation procedures of an information processing system according to the fourth embodiment of the present invention.

FIG. 22 is a sequence chart showing the operation procedures of an information processing system 2200 according to this embodiment. In FIG. 22, the same step numbers as those in FIG. 4 or 16 denote the same steps, and a description thereof will not be repeated.

In step S2201, a client terminal 231 of a ◯◯ mall 221 transmits, to a cloud server 2210, event information including the conditions of users the ◯◯ mall 221 wants to gather to an event. In step S2202, a client terminal 1432 of a ΔΔ shopping street 1422 transmits, to the cloud server 2210, event information including the conditions of users the ΔΔ shopping street 1422 wants to gather to an event. In step S403, the cloud server 2210 stores, in an event information DB 2214, the pieces of event information including the event conditions from the plurality of client terminals 231 and 1432.

In step S2209, the cloud server 2210 refers to the event information DB 2214 and a user position DB 415, and assigns the guidance destinations of users by using a guidance destination assignment table 2314a (see FIG. 25) in consideration of even the event conditions that are the desires of the acceptance places. In accordance with the guidance destination assignment, the cloud server 2210 announces pieces of user guidance information to the respectively assigned acceptance places in steps S1611 to S1617.

Thereafter, the cloud server 2210 repeats the processes in steps S405 to S1617 to collect user positions and announce pieces of guidance information to the user terminals of users absent in the ◯◯ mall 221 and the ΔΔ shopping street 1422 in accordance with the desires of the acceptance places. If the numbers of persons for events or the numbers of persons to be accommodated in event places are satisfied, the client terminals 231 and 1432 notify the cloud server 2210 to stop the user guidance in step S415. In step S417, the cloud server 2210 stops the user guidance. When the cloud server 2210 assigns the guidance destinations of users, the assignment can also be limited not to exceed the numbers of persons to be accommodated in respective acceptance places.

<<Functional Arrangement of Cloud Server>>

Figure 23:
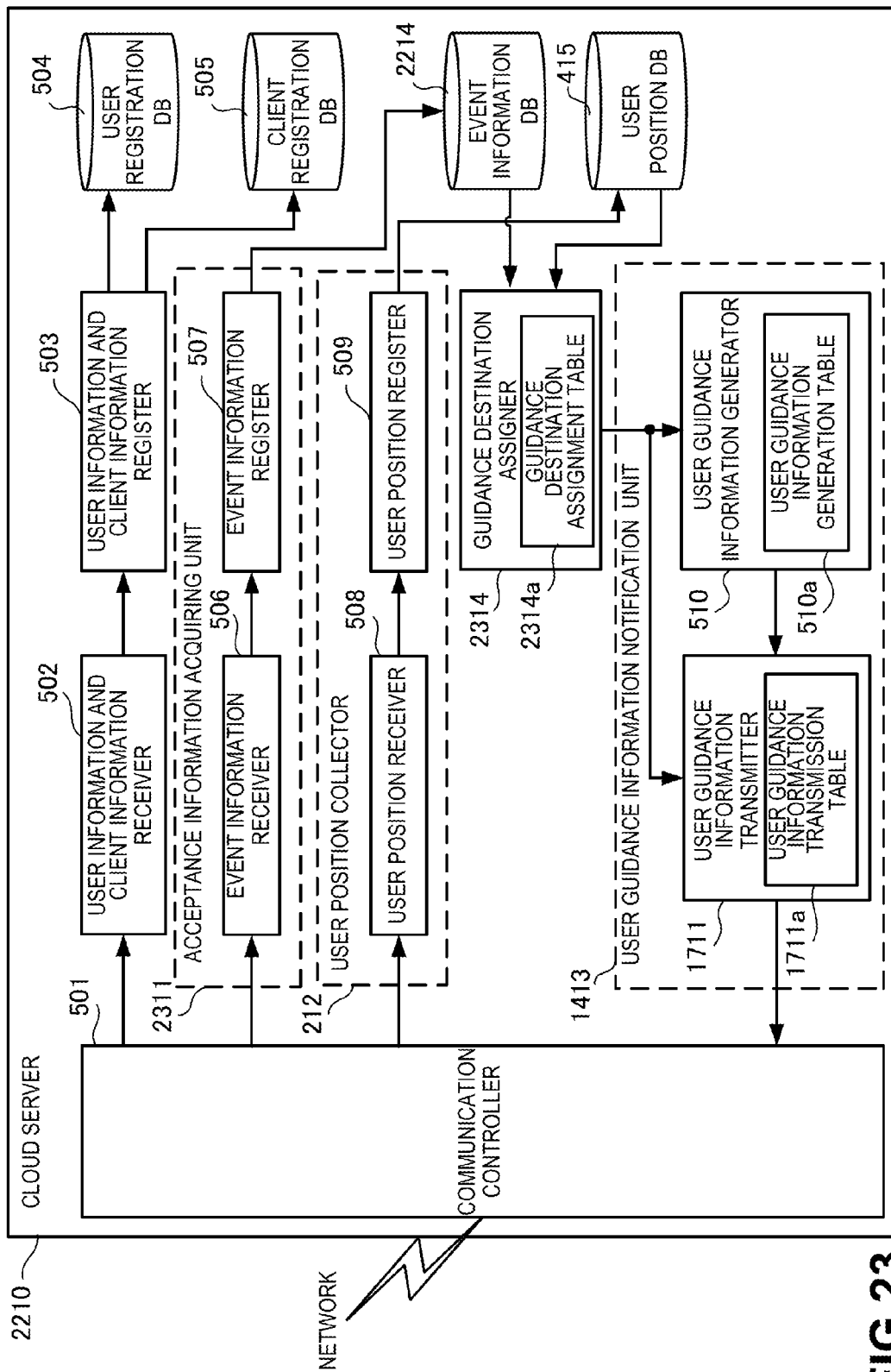
FIG. 23 is a block diagram showing the functional arrangement of a cloud server according to the fourth embodiment of the present invention.

FIG. 23 is a block diagram showing the functional arrangement of the cloud server 2210 according to this embodiment. In FIG. 23, the same reference numerals as those in FIG. 5 or 14 denote the same functional components, and a description thereof will not be repeated.

An acceptance information acquiring unit 2311 includes an event information receiver 2306 and an event information register 2307. The event information receiver 2306 receives, from the client terminals 231 and 1432 of the clients (acceptance places), pieces of event information including event conditions serving as the desires of the acceptance places. The event information register 2307 registers, in the event information DB 2214 in association with the clients (acceptance places), the received pieces of event information including the event conditions serving as the desires of the acceptance places.

A guidance destination assigner 2314 includes the guidance destination assignment table 2314a, and assigns the guidance destinations of users to a plurality of acceptance places in consideration of the event conditions serving as the desires of the acceptance places.

(Event Information DB)

FIG. 24 is a table showing the structure of the event information DB 2214 according to this embodiment. The event information DB 2214 registers information about an event to be held in a client (acceptance place) to which users are guided to move, together with an event condition serving as the desire of the acceptance place, in order to reduce the energy consumption amount in this embodiment. In FIG. 24, the same reference numerals as those in FIG. 9 of the second embodiment denote the same components, and a description thereof will not be repeated. The structure of the event information DB 2214 is not limited to that in FIG. 24.

The event information DB 2214 stores, in association with a client ID 901, an event condition 2407 serving as the desire of the acceptance place. The event condition 2407 may designate information for screening matching users by the cloud server 2210, or designate a concrete user attribute.

(Guidance Destination Assignment Table)

Figure 25:
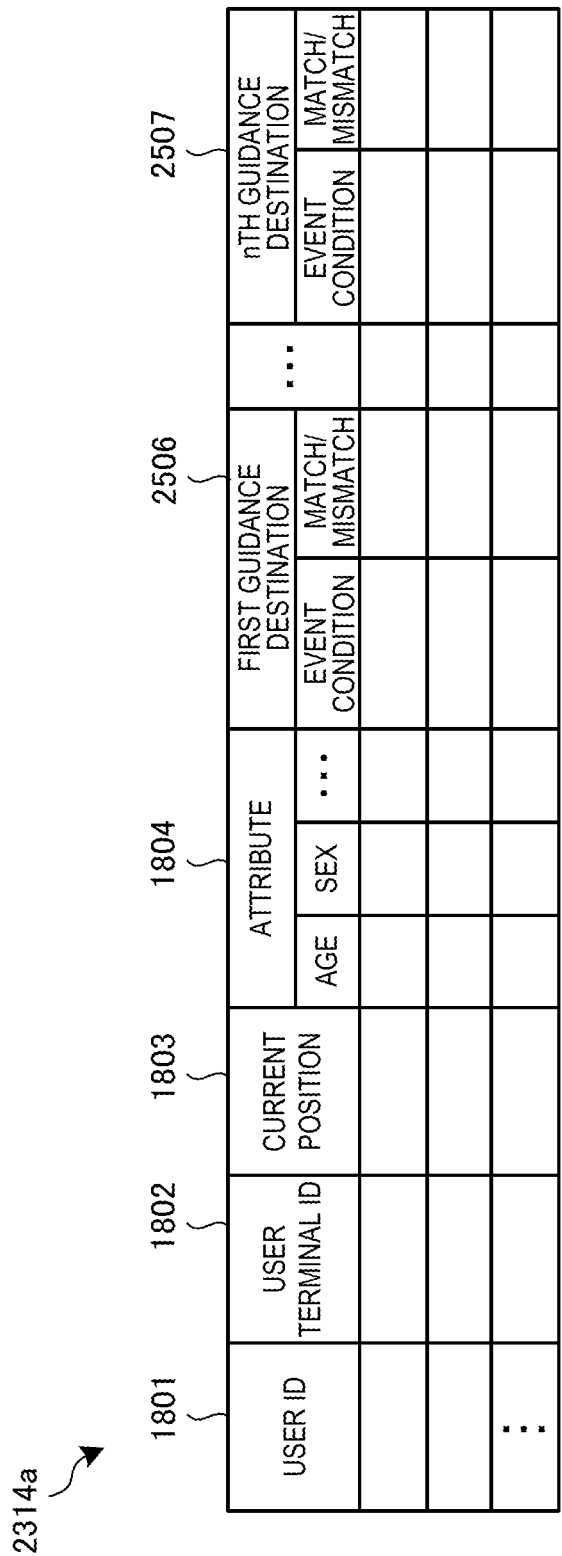
FIG. 25 is a table showing the structure of a guidance destination assignment table according to the fourth embodiment of the present invention.

FIG. 25 is a table showing the structure of the guidance destination assignment table 2314a according to this embodiment. The guidance destination assignment table 2314a is used to assign users to a plurality of clients (acceptance places) serving as a plurality of guidance destinations in consideration of event conditions serving as the desires of the acceptance places. In FIG. 25, the same reference numerals as those in FIG. 18 of the third embodiment denote the same components, and a description thereof will not be repeated.

The guidance destination assignment table 2314a stores a first guidance destination 2506 to an nth guidance destination 2507 in association with a user ID 1801 and a user terminal ID 1802. An event condition and a match/mismatch representing whether a user matches this event condition are stored in each of the first guidance destination 2506 to nth guidance destination 2507.

<<Processing Procedures of Cloud Server>>

Figure 26:
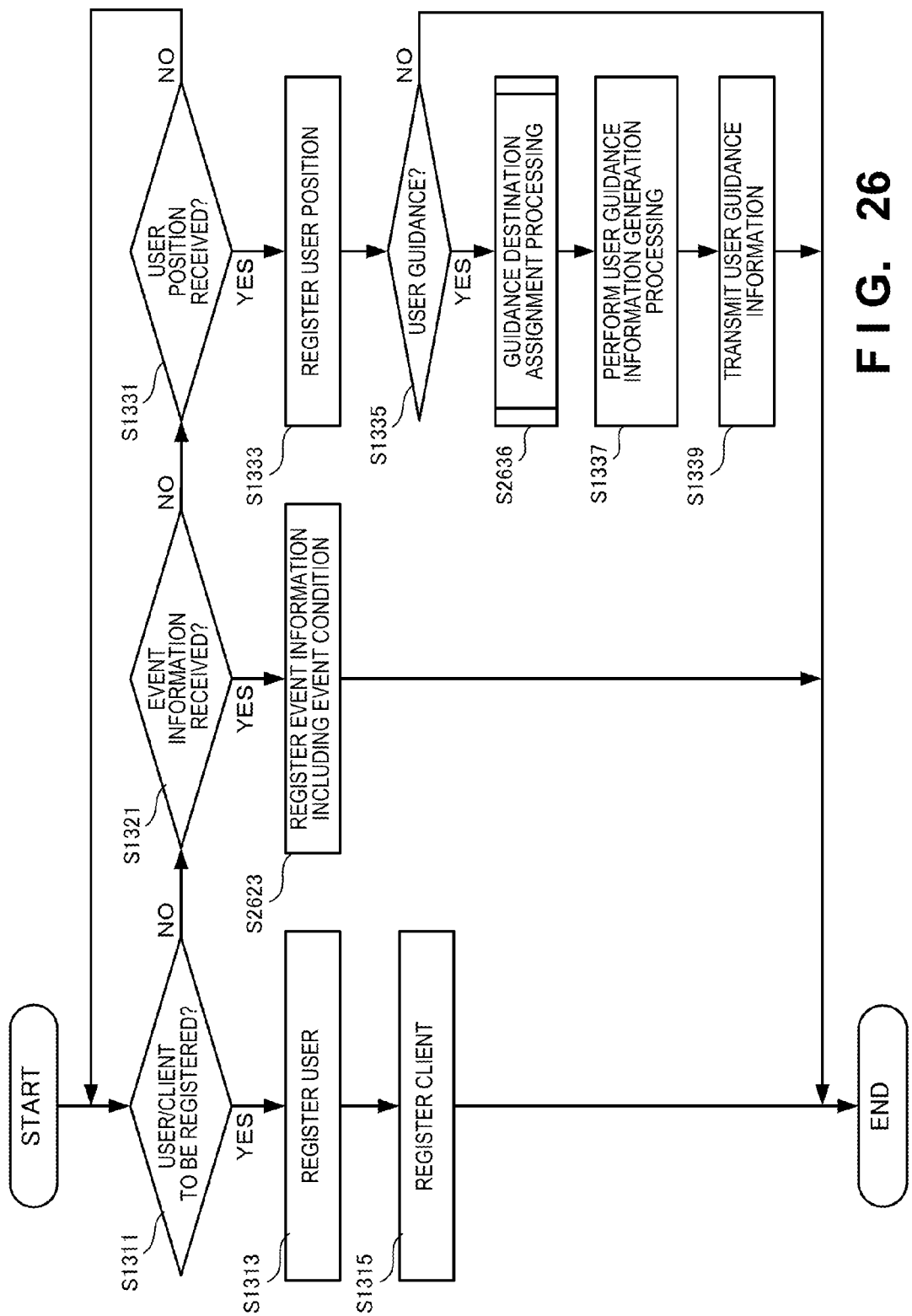
FIG. 26 is a flowchart showing the processing procedures of the cloud server according to the fourth embodiment of the present invention.

FIG. 26 is a flowchart showing the processing procedures of the cloud server 2210 according to this embodiment. In FIG. 26, the same step numbers as those in FIG. 13 denote the same steps, and a description thereof will not be repeated. This flowchart is executed by a CPU 1110 in FIG. 11 using a RAM 1140, thereby implementing the functional components in FIG. 23.

The difference between FIGS. 26 and 13 is that upon receiving event information from a client terminal, the cloud server 2210 registers the event information including an event condition in the event information DB 2214 in step S2623.

Another difference is that the cloud server 2210 performs processing of assigning a plurality of acceptance places (guidance destinations) in consideration of even the event condition in guidance destination assignment processing (see FIG. 27) in step S2636. In step S1337, the cloud server 2210 generates user guidance information that guides a user to an assigned guidance destination. In step S1339, the cloud server 2210 transmits, to a user terminal, the user guidance information to the assigned guidance destination.

(Guidance Destination Assignment Processing)

FIG. 27 is a flowchart showing the procedures of the guidance destination assignment processing (S2636) according to this embodiment. In FIG. 27, the same step numbers as those in FIG. 21 of the third embodiment denote the same steps, and a description thereof will not be repeated.

The difference between FIGS. 27 and 21 is that the cloud server 2210 assigns a guidance destination matching an event condition to each user in step S2705.

According to this embodiment, users are assigned and guided in accordance with the desire of an acceptance place, so users who satisfy the acceptance place can be gathered.

Fifth Embodiment

An information processing system according to the fifth embodiment of the present invention will be described next. The information processing system according to the fifth embodiment is different from the fourth embodiment in that the preference of a user is considered based on the action history and purchase history of the user and the user is guided to a place to which he is easily guided. The action history of a user is a history representing facilities to which the user has gone. The purchase history of a user is a history representing what he bought. The remaining arrangement and operation are the same as those in the second embodiment, the same reference numerals denote the same arrangement and operation, and a detailed description thereof will not be repeated.

According to this embodiment, a user is guided in consideration of the preference of the user based on his action history and purchase history. Thus, the user can be easily guided and can go to a place where he can be satisfied.

This embodiment will describe an example in which a user is guided in consideration of the preference of the user based on his action history and purchase history. However, this embodiment includes even a case in which the preference (interest) of a user is determined from the user profile and the user is guided to a place where he can be satisfied. For example, if data representing that a user likes "gardening" is registered in a user registration DB 504, entertainments and bargain sales regarding "gardening" are selected and introduced. If data representing that a user likes "cycling" is registered in the user registration DB 504, best "cycling" courses at this season are selected and introduced.

The interest of a user may be manually input from a user terminal by the user himself or may be analyzed from the action history and purchase history.

<<Operation Procedures of Information Processing System>>

Figure 28:
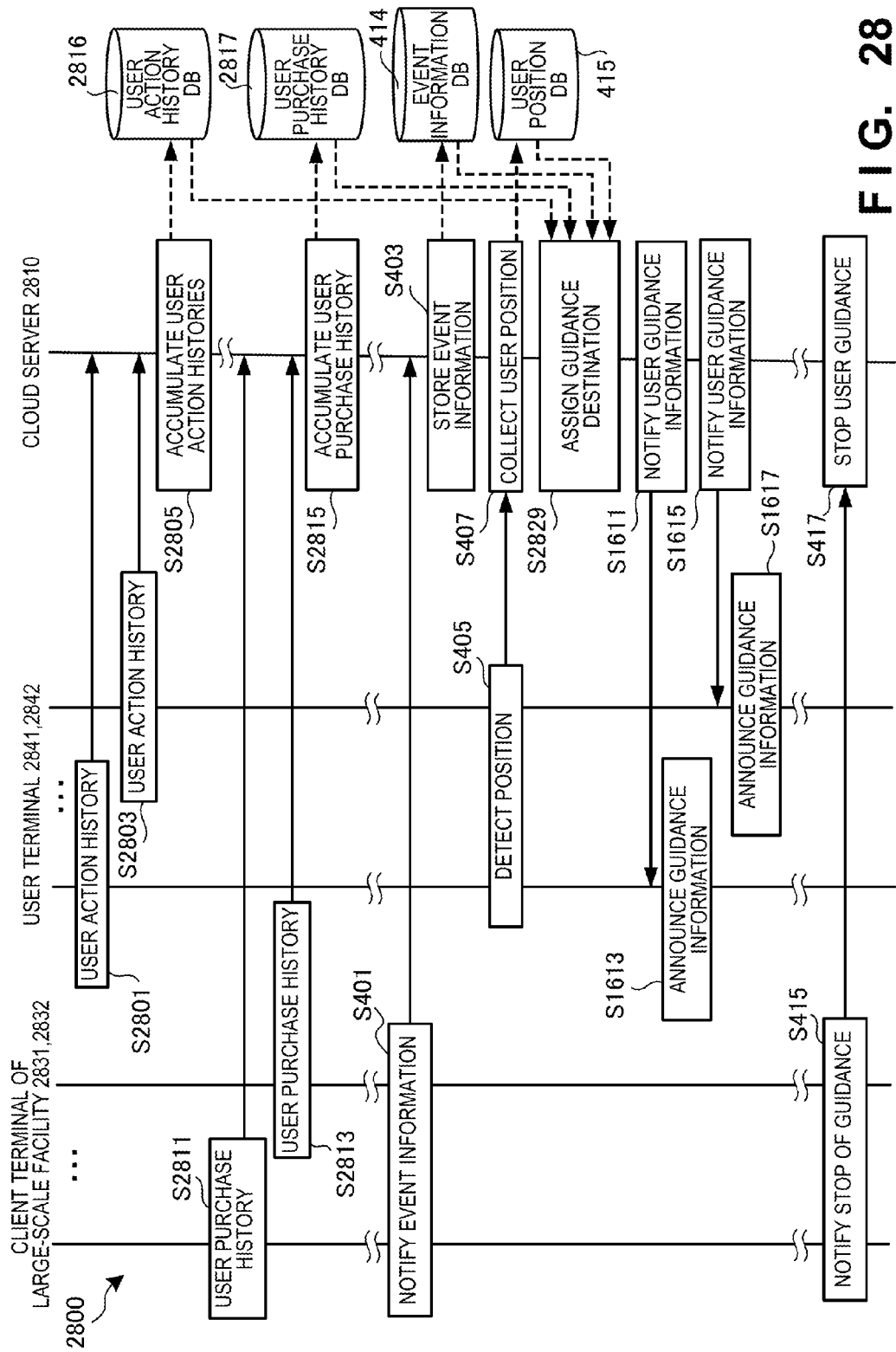
FIG. 28 is a sequence chart showing the operation procedures of an information processing system according to the fifth embodiment of the present invention.

FIG. 28 is a sequence chart showing the operation procedures of an information processing system 2800 according to this embodiment. In FIG. 28, the same step numbers as those in FIG. 4 or 16 denote the same steps, and a description thereof will not be repeated.

In step S2801, a user action history is transmitted from a user terminal to a cloud server 2810. In step S2803, a user action history is transmitted from another user terminal to the cloud server 2810. In step S2805, the cloud server 2810 accumulates the received user action histories in a user action history DB 2816 (see FIG. 31) in association with user IDs. Note that a user action history from a user terminal is merely information of a current user position, and the cloud server 2810 suffices to accumulate the user action history as an action history.

Then, in step S2811, a user purchase history is transmitted from a client terminal to the cloud server 2810. In step S2813, a user purchase history is transmitted from another client terminal to the cloud server 2810. In step S2815, the cloud server 2810 accumulates the received user purchase histories in a user purchase history DB 2817 (see FIG. 32) in association with user IDs.

In step S2829, the cloud server 2810 refers to the user action history DB 2816, the user purchase history DB 2817, an event information DB 414, and a user position DB 415, and assigns guidance destinations matching the preferences of the users based on the user action histories or the user purchase histories.

For example, when assigning a guidance destination based on the user action history, a facility to which the user has been or a facility to which the user has been many times is preferentially assigned. When assigning a guidance destination based on the user purchase history, a facility in which merchandise of a maker the user often buys is kept in stock, or a facility that sells merchandise of a genre the user often buys is preferentially assigned. More specifically, a person who often buys books is preferentially guided to a facility that accommodates a bookstore. When assigning a guidance destination based on the interest of a user, a facility in which an event the user likes is held is preferentially assigned. These are merely examples, and this embodiment includes various examples of assigning a guidance destination based on the user action history, the user purchase history, and/or the interest of a user.

In accordance with the guidance destination assignment, the cloud server 2810 announces pieces of user guidance information to the respectively assigned acceptance places in steps S1611 to S1617. If the numbers of persons for events or the numbers of persons to be accommodated in event places are satisfied, client terminals 2831 and 2832 notify the cloud server 2810 to stop the user guidance in step S415. In step S417, the cloud server 2810 stops the user guidance. When the cloud server 2810 assigns the guidance destinations of users, the assignment can also be limited not to exceed the numbers of persons to be accommodated in respective acceptance places.

<<Functional Arrangement of Cloud Server>>

Figure 29:
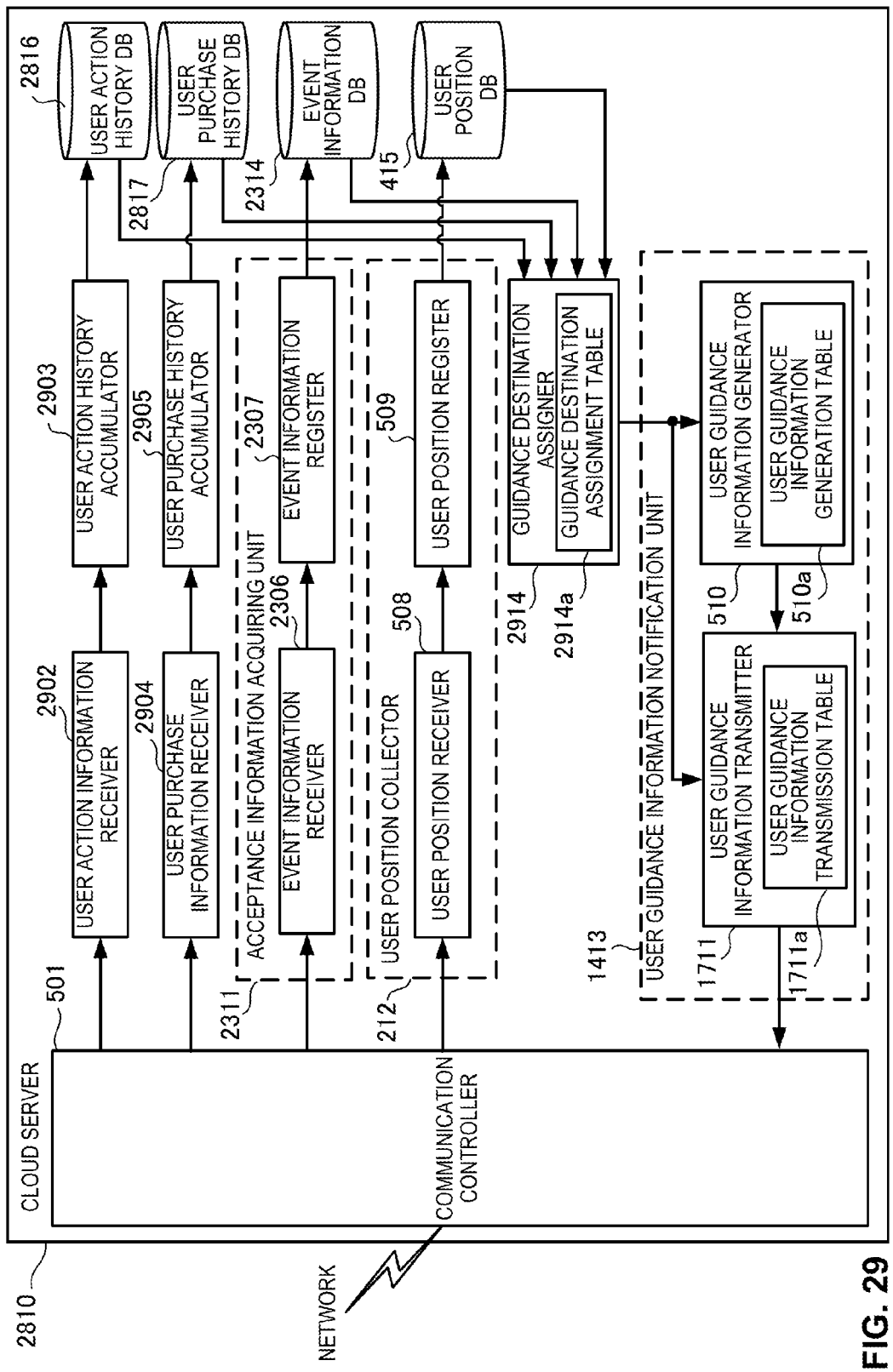
FIG. 29 is a block diagram showing the functional arrangement of a cloud server according to the fifth embodiment of the present invention.

FIG. 29 is a block diagram showing the functional arrangement of the cloud server 2810 according to this embodiment. In FIG. 29, the same reference numerals as those in FIG. 5, 14, or 23 denote the same functional components, and a description thereof will not be repeated.

To simplify the drawing, none of a user information and client information receiver 502, a user information and client information register 503, a user registration DB 504, and a client registration DB 505 is illustrated in FIG. 29.

A user action information receiver 2902 receives user action information from a user terminal. A user action history accumulator 2903 accumulates the received user action information in the user action history DB 2816 (see FIG. 31) in association with a user ID. A user purchase information receiver 2904 receives user purchase information from a client terminal. A user purchase history accumulator 2905 accumulates the received user purchase information in the user purchase history DB 2817 (see FIG. 32) in association with a user ID.

Figure 33:
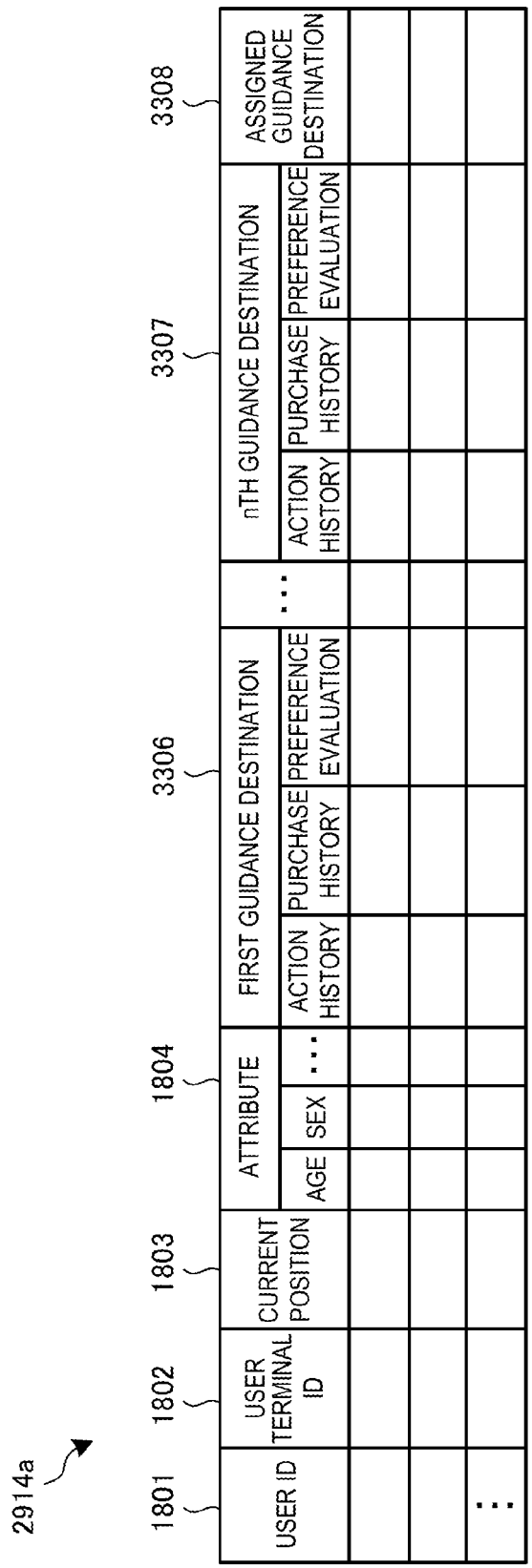
FIG. 33 is a table showing the structure of a guidance destination assignment table according to the fifth embodiment of the present invention.

A guidance destination assigner 2914 includes a guidance destination assignment table 2914a (see FIG. 33). The guidance destination assigner 2914 refers to the user action history DB 2816, the user purchase history DB 2817, the event information DB 414, and the user position DB 415, and assigns a guidance destination matching the preference of a user based on the user action history or the user purchase history.

<<Functional Arrangement of Client Terminal>>

FIG. 30 is a block diagram showing the functional arrangement of the client terminals 2831 and 2832 according to this embodiment. In FIG. 30, the same reference numerals as those in FIG. 7 of the second embodiment denote the same functional components, and a description thereof will not be repeated.

The difference between FIGS. 30 and 7 is that a user purchase information transmitter 3008 is arranged to transmit user purchase information from a client terminal to the cloud server 2810. This user purchase information includes pieces of information necessary to determine a user preference, such as a user ID, a purchased article, the price, the number of purchased articles, and the purchase frequency.

(User Action History DB)

Figure 31:
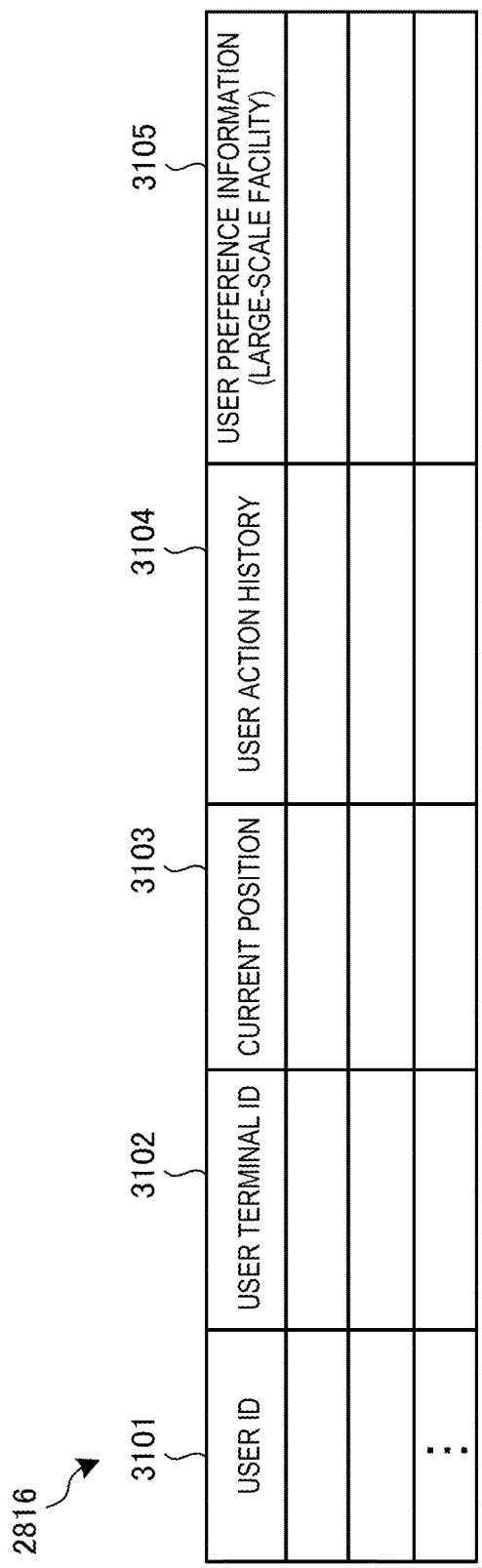
FIG. 31 is a table showing the structure of a user action history DB according to the fifth embodiment of the present invention.

FIG. 31 is a table showing the structure of the user action history DB 2816 according to this embodiment. The user action history DB 2816 accumulates the history of places to which each user moves. Note that the structure of the user action history DB 2816 is not limited to that in FIG. 31.

The user action history DB 2816 stores, in association with a user ID 3101 and a user terminal ID 3102, a current position 3103, and a user action history 3104, which is a series of current positions along with the lapse of time. Further, the user action history DB 2816 stores user preference information 3105 about, for example, a large-scale facility to which the user is willing to go, based on the user action history 3104.

(User Purchase History DB)

FIG. 32 is a table showing the structure of the user purchase history DB 2817 according to this embodiment. The user purchase history DB 2817 accumulates the history of articles each user is willing to buy. Note that the structure of the user purchase history DB 2817 is not limited to that in FIG. 32.

The user purchase history DB 2817 stores a user purchase history 3203 in association with a client ID 3201 and a user ID 3202. Further, the user purchase history DB 2817 stores a user preference evaluation 3204 of, for example, an article the user is willing to purchase, based on the user purchase history 3203.

(Guidance Destination Assignment Table)

FIG. 33 is a table showing the structure of the guidance destination assignment table 2914a according to this embodiment. The guidance destination assignment table 2914a is used to assign users to a plurality of clients (acceptance places) serving as a plurality of guidance destinations in consideration of user preferences based on the action histories and purchase histories of the users. In FIG. 33, the same reference numerals as those in FIG. 18 of the third embodiment denote the same components, and a description thereof will not be repeated.

The guidance destination assignment table 2914a stores a first guidance destination 3306 to an nth guidance destination 3307 in association with a user ID 1801 and a user terminal ID 1802. The action history of a user, the purchase history of the user, and the preference evaluation of the user are stored in each of the first guidance destination 3306 to nth guidance destination 3307. The guidance destination assignment table 2914a also stores an assigned guidance destination 3308 based on the preference evaluation of the user. Note that the assigned guidance destination 3308 is not limited to one, and a plurality of guidance destinations or their priorities may be stored. In this case, pieces of user guidance information are generated.

<<Processing Procedures of Cloud Server>>

Figure 34:
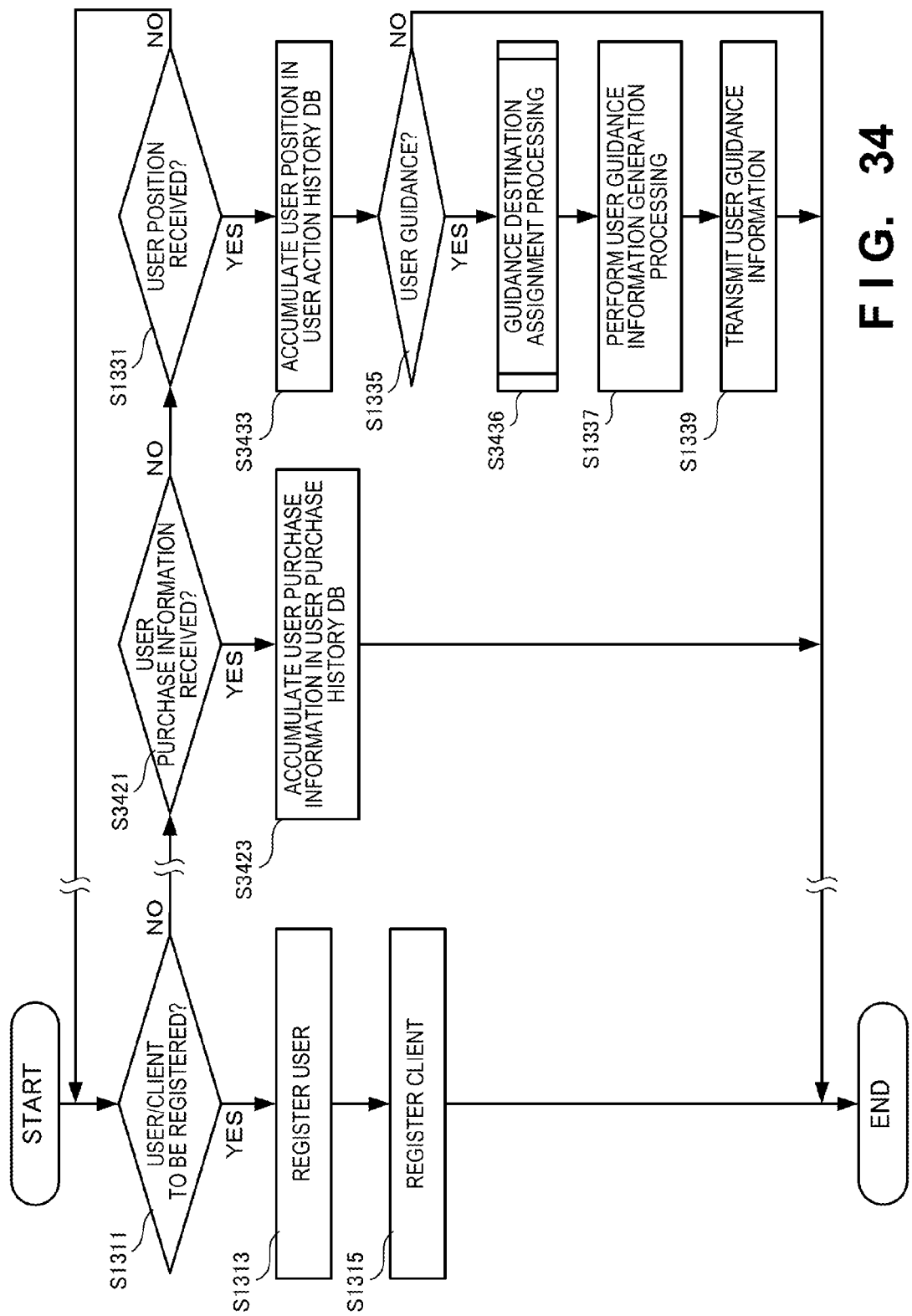
FIG. 34 is a flowchart showing the processing procedures of the cloud server according to the fifth embodiment of the present invention.

FIG. 34 is a flowchart showing the processing procedures of the cloud server 2810 according to this embodiment. In FIG. 34, the same step numbers as those in FIG. 13 denote the same steps, and a description thereof will not be repeated. Also, event information reception steps (S1321 and S1323) in FIG. 13 are not illustrated. This flowchart is executed by a CPU 1110 in FIG. 11 using a RAM 1140, thereby implementing the functional components in FIG. 29.

The difference between FIGS. 34 and 13 is that the cloud server 2810 determines in step S3421 whether user purchase information from a client terminal has been received. If user purchase information from a client terminal has been received, the cloud server 2810 advances to step S3423 and accumulates the received user purchase information in the user purchase history DB 2817.

If the cloud server 2810 receives a current user position from a user terminal, it advances from step S1331 to step S3433. In step S3433, the cloud server 2810 accumulates a user action history from the received current user position in the user purchase history DB 2817. Unlike FIG. 13, the cloud server 2810 performs assignment processing based on a user preference derived from the action history and purchase history of a user in guidance destination assignment processing (see FIG. 35) in step S3436. The cloud server 2810 generates, in step S1337, user guidance information that guides a user to the assigned guidance destination, and transmits, to the user terminal, the user guidance information to the assigned guidance destination in step S1339.

(Guidance Destination Assignment Processing)

FIG. 35 is a flowchart showing the procedures of the guidance destination assignment processing (S3436) according to this embodiment.

In step S3501, the cloud server 2810 acquires each user information and current position. In step S3503, the cloud server 2810 reads out a user action history corresponding to each user from the user action history DB 2816. In step S3505, the cloud server 2810 reads out a user purchase history corresponding to each user from the user purchase history DB 2817. In step S3507, the cloud server 2810 decides the guidance destination of each user based on a user preference derived from the user action history and the user purchase history. In step S3509, the cloud server 2810 determines whether guidance processing of all users has been completed. The cloud server 2810 repeats steps S3501 to S3509 until the guidance processing of all users has been completed.

According to this embodiment, users can be guided in consideration of the preferences of the users based on their action histories and purchase histories. Thus, the users can be easily guided and go to places where they can be satisfied.

Sixth Embodiment

An information processing system according to the sixth embodiment of the present invention will be described next. The information processing system according to the sixth embodiment is different from the second to fifth embodiments in that users are assigned and guided to minimize the total energy consumption amount of an acceptance place. The remaining arrangement and operation are the same as those in the second embodiment, the same reference numerals denote the same arrangement and operation, and a detailed description thereof will not be repeated.

According to this embodiment, users are assigned and guided to minimize the total energy consumption amount of an acceptance place. Thus, the energy consumption amount can be reduced more effectively.

<<Operation Procedures of Information Processing System>>

Figure 36:
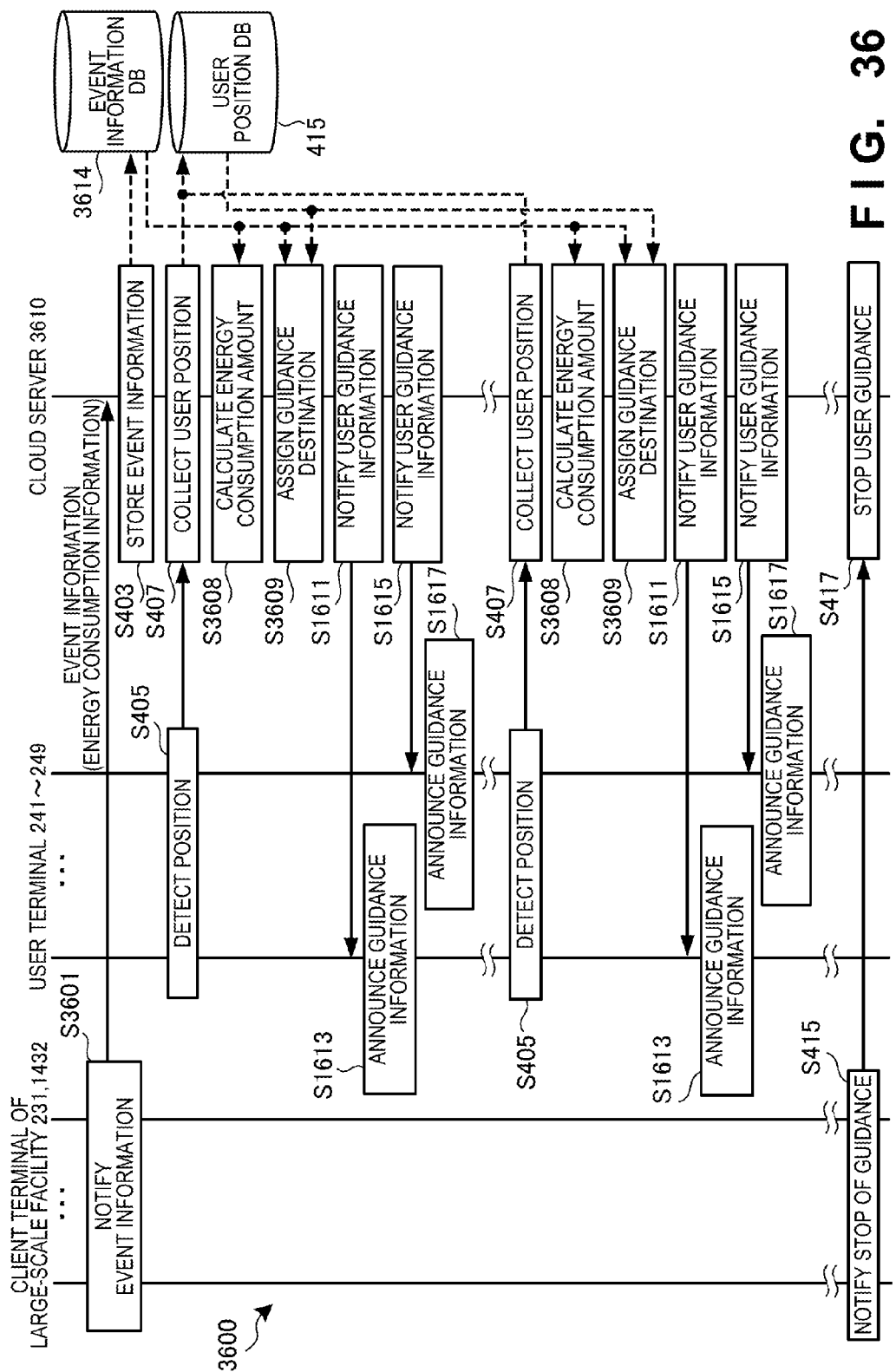
FIG. 36 is a sequence chart showing the operation procedures of an information processing system according to the sixth embodiment of the present invention.

FIG. 36 is a sequence chart showing the operation procedures of an information processing system 3600 according to this embodiment. In FIG. 36, the same step numbers as those in FIG. 4 or 16 denote the same steps, and a description thereof will not be repeated.

In step S3601, client terminals 231 and 1432 of a plurality of acceptance places notify a cloud server 3610 of pieces of event information each including energy consumption information. In step S403, the cloud server 3610 stores, in an event information DB 3614 (see FIG. 38), the pieces of event information including pieces of energy consumption information from the plurality of client terminals 231 and 1432.

Figure 39:
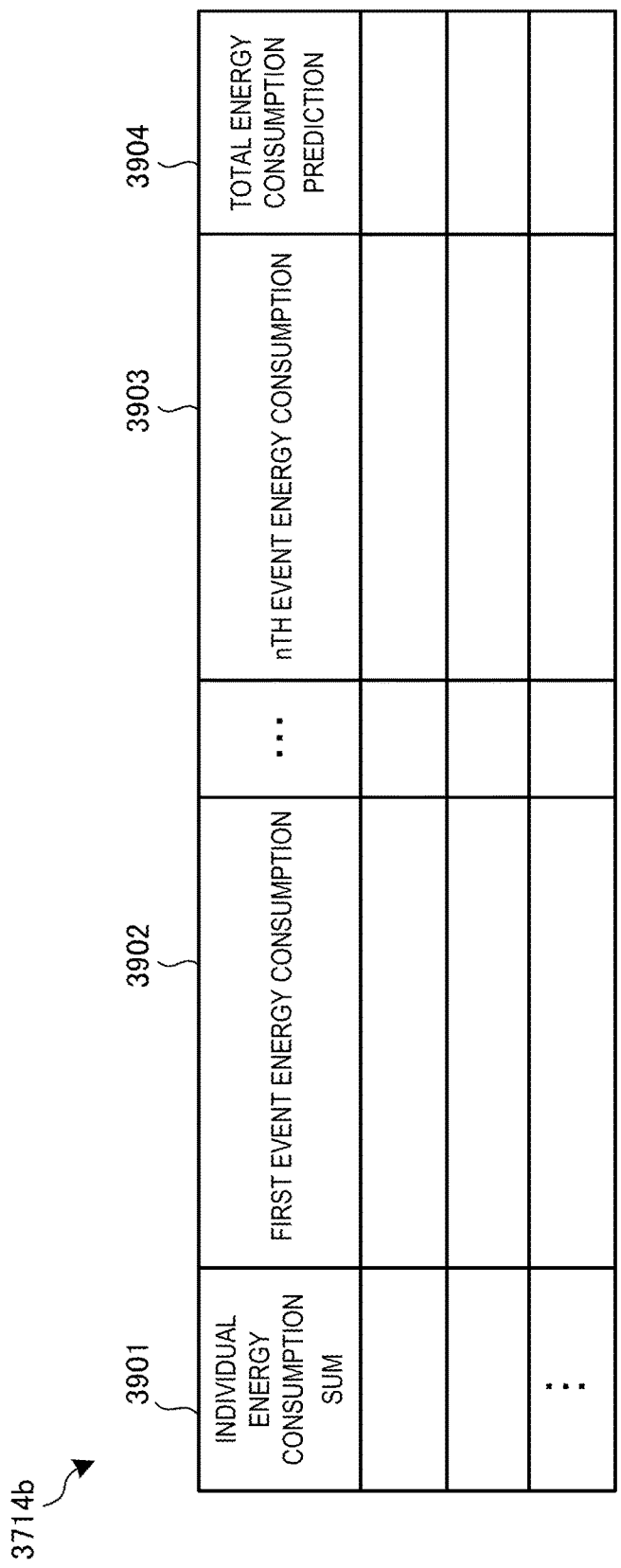
FIG. 39 is a table showing the structure of an energy consumption amount calculation table according to the sixth embodiment of the present invention.

In step S3608, the cloud server 3610 refers to the event information DB 3614, and calculates the predicted amounts of energy consumption amounts arising from guidance of users to a plurality of events by using an energy consumption amount calculation table 3714b (see FIG. 39). In step S3609, the cloud server 3610 refers to an event information DB 3614 and a user position DB 415, and assigns the guidance destinations of users by using a guidance destination assignment table 3714a (see FIG. 40) in consideration of even the total energy consumption amount. In accordance with the guidance destination assignment, the cloud server 3610 announces pieces of user guidance information to the respectively assigned acceptance places in steps S1611 to S1617.

Thereafter, the cloud server 3610 repeats the processes in steps S405 to S1617 to collect user positions and announce pieces of guidance information to the user terminals of users absent in a ○○ mall 221 and a △△ shopping street 1422 in accordance with the total energy consumption amount. If the numbers of persons for events or the numbers of persons to be accommodated in event places are satisfied, the client terminals 231 and 1432 notify the cloud server 3610 to stop the user guidance in step S415. In step S417, the cloud server 3610 stops the user guidance. When the cloud server 3610 assigns the guidance destinations of users, the assignment can also be limited not to exceed the numbers of persons to be accommodated in respective acceptance places.

<<Functional Arrangement of Cloud Server>>

Figure 37:
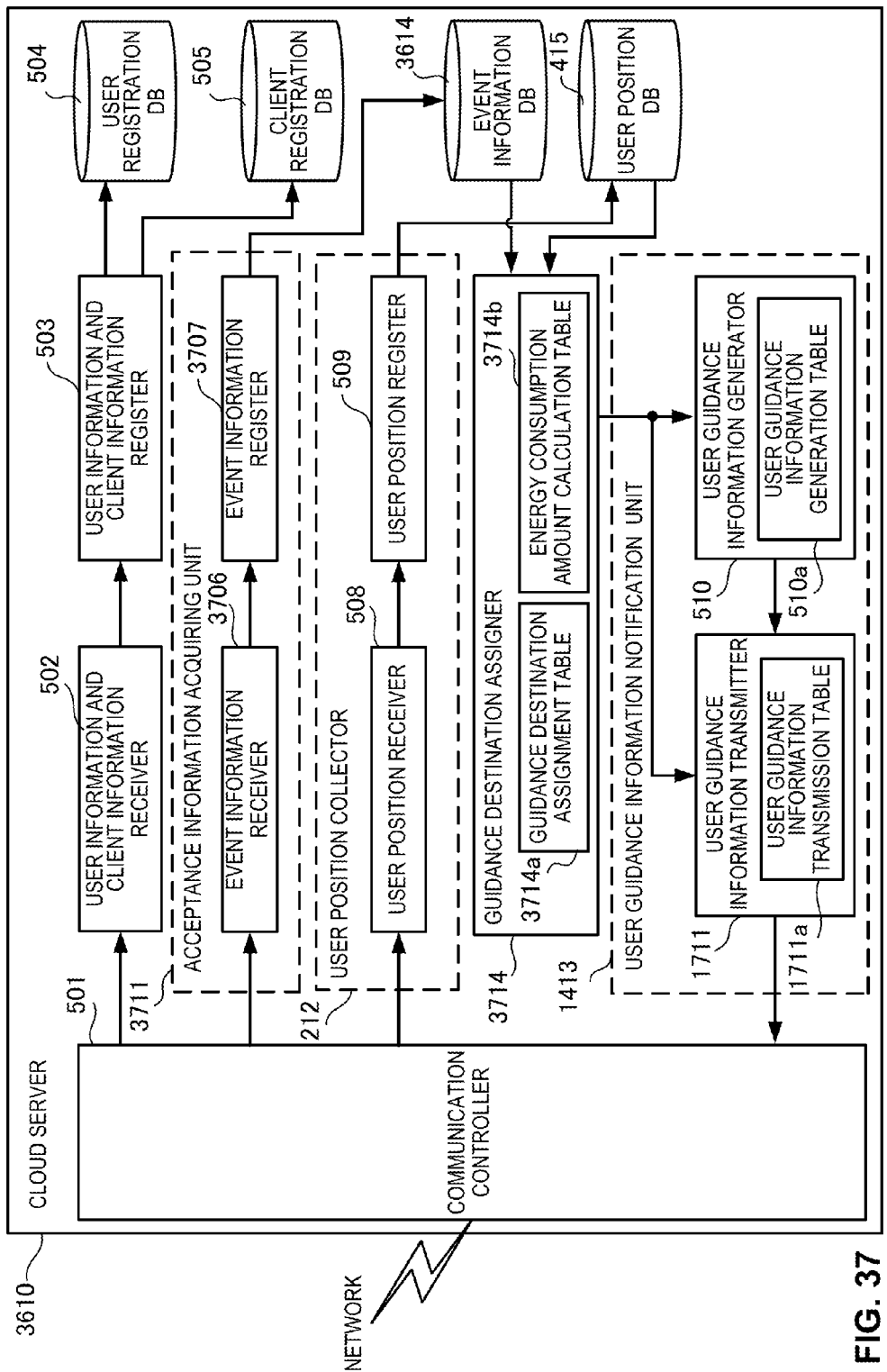
FIG. 37 is a block diagram showing the functional arrangement of a cloud server according to the sixth embodiment of the present invention.

FIG. 37 is a block diagram showing the functional arrangement of the cloud server 3610 according to this embodiment. In FIG. 37, the same reference numerals as those in FIG. 5, 17, or 37 denote the same functional components, and a description thereof will not be repeated.

An acceptance information acquiring unit 3711 includes an event information receiver 3706 and an event information register 3707. The event information receiver 3706 receives, from the client terminals 231 and 1432 of the clients (acceptance places), pieces of event information each including energy consumption information. The event information register 3707 registers, in the event information DB 3614 (see FIG. 38) in association with the clients (acceptance places), the received pieces of event information each including the energy consumption information.

A guidance destination assigner 3714 includes the guidance destination assignment table 3714a (see FIG. 40) and the energy consumption amount calculation table 3714b (see FIG. 39). The guidance destination assigner 3714 refers to energy consumption information stored in the event information DB 3614, and predicts the total energy consumption amount by using the energy consumption amount calculation table 3714b. The guidance destination assigner 3714 refers to the user position DB 415, and assigns guidance destinations to minimize the predicted total energy consumption amount.

(Event Information DB)

Figure 38:
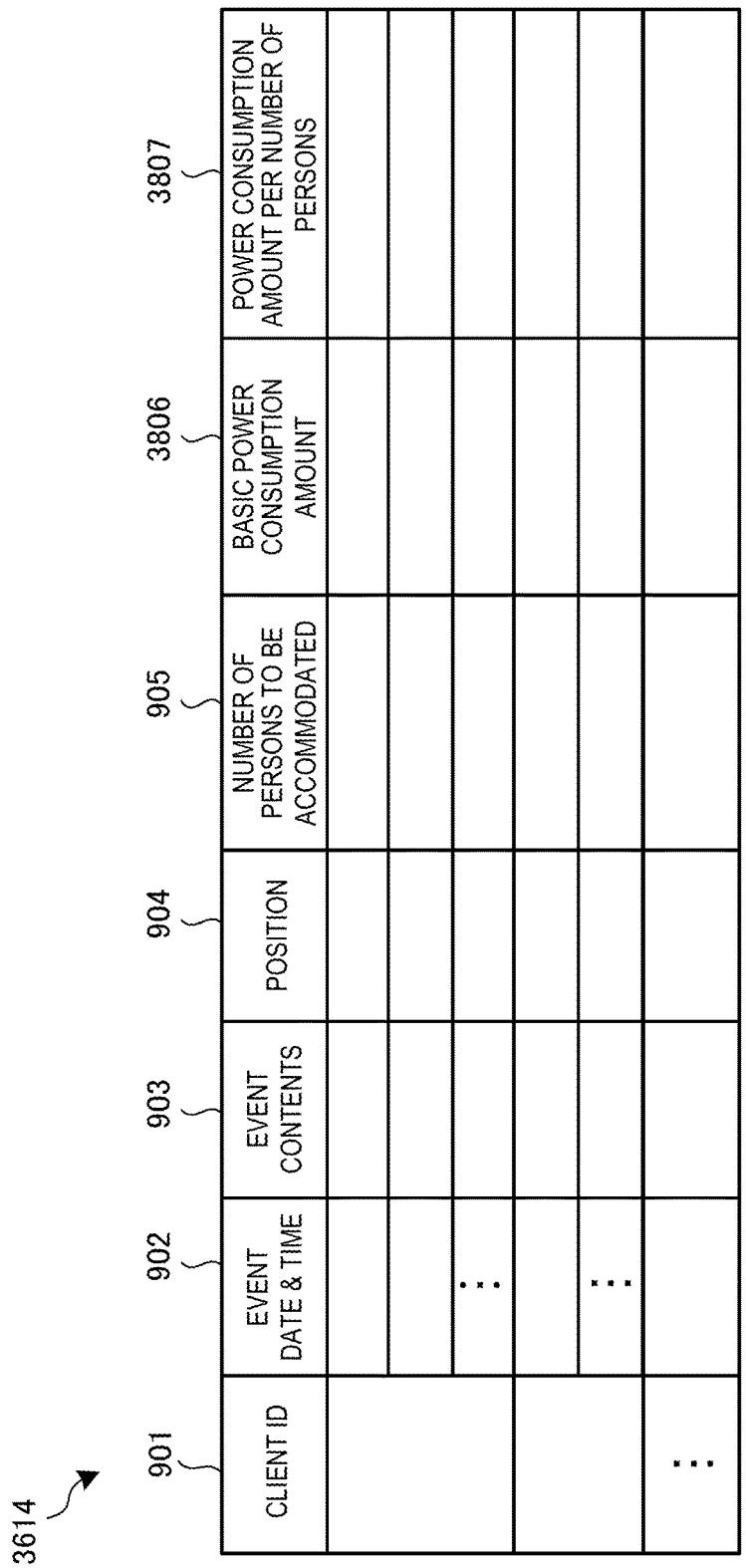
FIG. 38 is a table showing the structure of an event information DB according to the sixth embodiment of the present invention.

FIG. 38 is a table showing the structure of the event information DB 3614 according to this embodiment. The event information DB 3614 registers information about an event to be held in a client (acceptance place) to which users are guided to move, together with information about energy to be consumed by the event in the acceptance place, in order to reduce the energy consumption amount in this embodiment. In FIG. 38, the same reference numerals as those in FIG. 9 of the second embodiment denote the same components, and a description thereof will not be repeated. The structure of the event information DB 3614 is not limited to that in FIG. 38.

The event information DB 3614 stores, in association with a client ID 901, information about energy to be consumed in an acceptance place. The energy information includes a basic power consumption amount 3806 of the acceptance place, a power consumption amount 3807 per the number of persons, and the like.

(Energy Consumption Amount Calculation Table)

FIG. 39 is a table showing the structure of the energy consumption amount calculation table 3714b according to this embodiment. The energy consumption amount calculation table 3714b is used to calculate energy to be consumed in a user acceptance place.

The energy consumption amount calculation table 3714b stores an individual energy consumption sum 3901 in a case in which a user individual will not go to an acceptance place, an energy consumption 3902 in the first event, and an energy consumption 3903 in the nth event. The energy consumption amount calculation table 3714b also stores a total energy consumption prediction 3904 of the individual energy consumption sum 3901, the energy consumption 3902 in the first event, and the energy consumption 3903 in the nth event in a case in which the user will participate in an event in the acceptance place.

In this embodiment, users are assigned to guidance destinations to minimize the total energy consumption prediction 3904.

(Guidance Destination Assignment Table)

Figure 40:
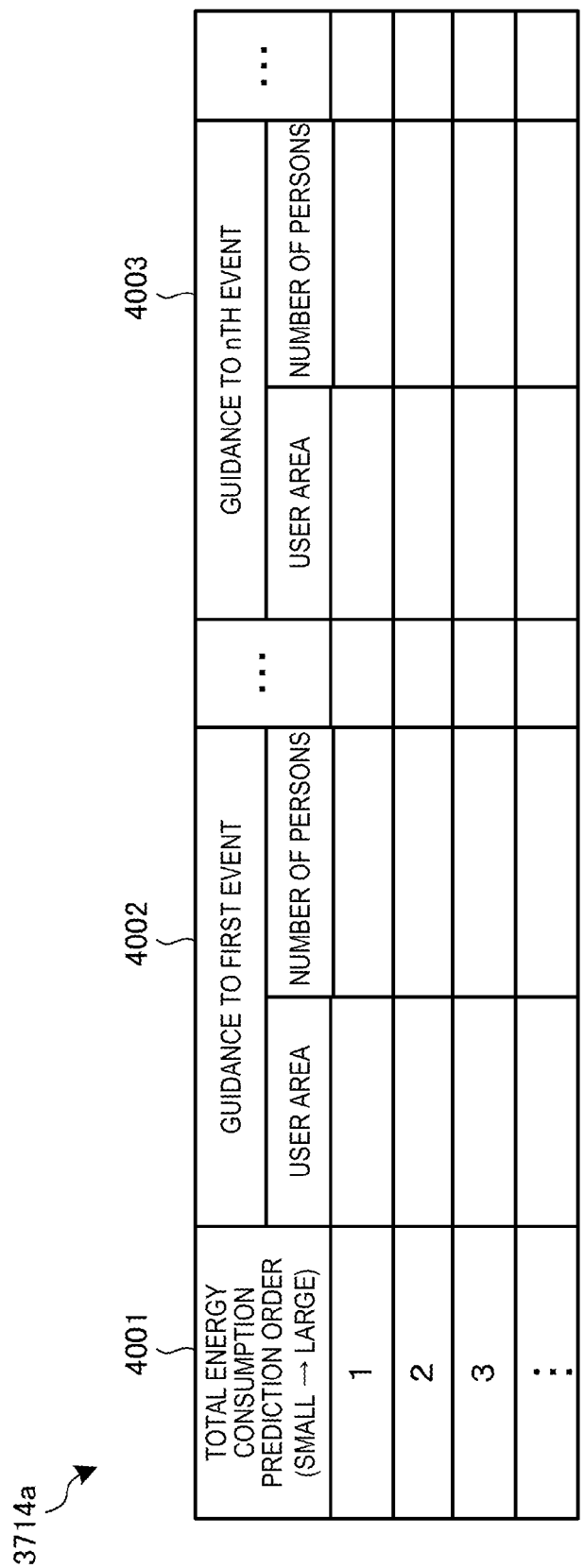
FIG. 40 is a table showing the structure of a guidance destination assignment table according to the sixth embodiment of the present invention.

FIG. 40 is a table showing the structure of the guidance destination assignment table 3714a according to this embodiment. The guidance destination assignment table 3714a is used to assign users to guidance destinations so as to minimize the total energy consumption prediction 3904.

The guidance destination assignment table 3714a stores guidance 4002 to the first event and guidance 4003 to the nth event that are arranged in accordance with a total energy consumption prediction order 4001. Each of the guidance 4002 to the first event and the guidance 4003 to the nth event includes a user area to which users are guided, and the number of users.

<<Processing Procedures of Cloud Server>>

Figure 41:
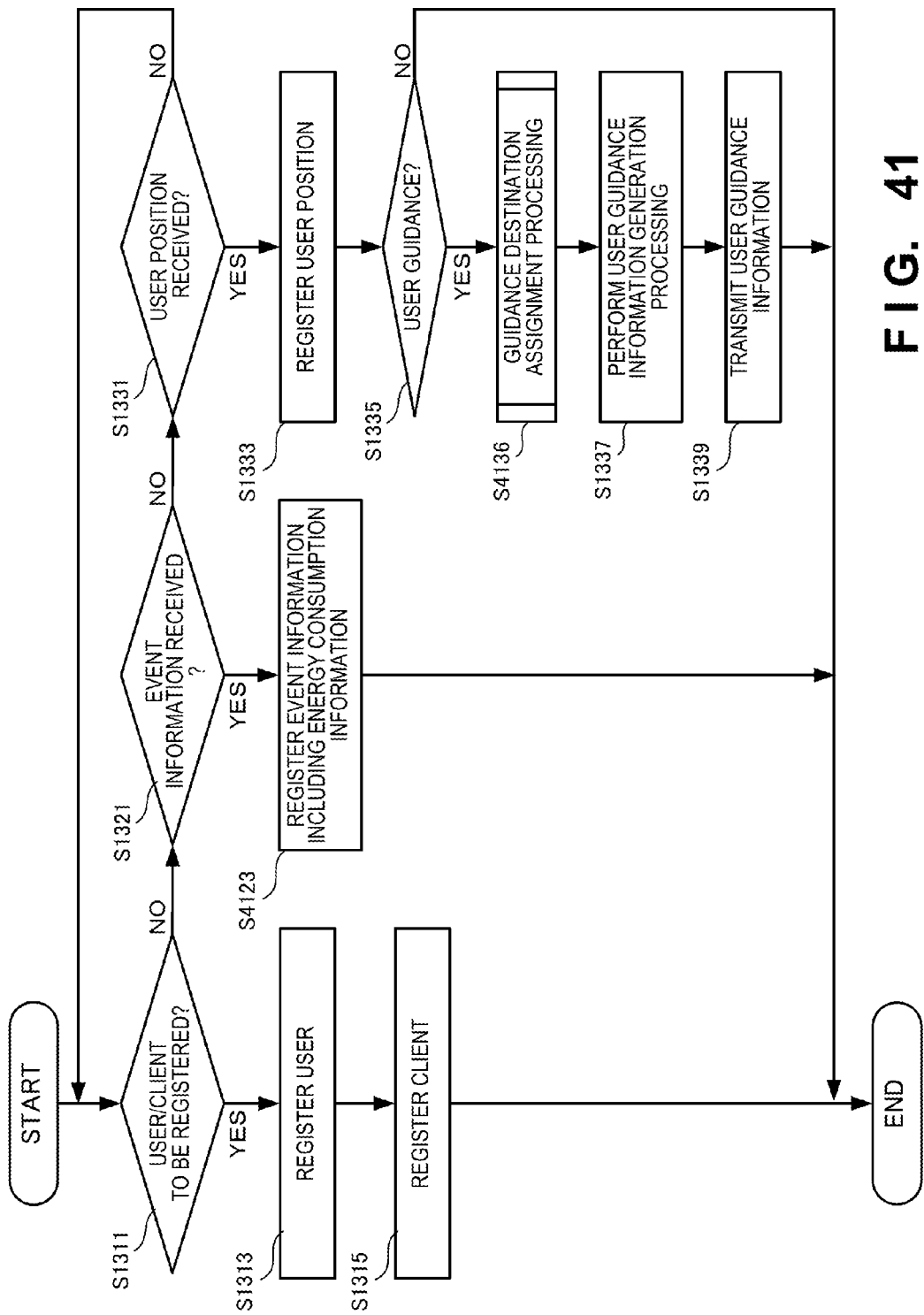
FIG. 41 is a flowchart showing the processing procedures of the cloud server according to the sixth embodiment of the present invention.

FIG. 41 is a flowchart showing the processing procedures of the cloud server 3610 according to this embodiment. In FIG. 41, the same step numbers as those in FIG. 13 denote the same steps, and a description thereof will not be repeated. This flowchart is executed by a CPU 1110 in FIG. 11 using a RAM 1140, thereby implementing the functional components in FIG. 37.

The difference between FIGS. 41 and 13 is that upon receiving event information from a client terminal, the cloud server 3610 registers the event information including energy consumption information in the event information DB 3614 in step S4123.

Another difference is that the cloud server 3610 performs processing of assigning a plurality of acceptance places (guidance destinations) in consideration of the total energy consumption prediction in guidance destination assignment processing (see FIG. 42) in step S4136. In step S1337, the cloud server 3610 generates user guidance information that guides a user to an assigned guidance destination. In step S1339, the cloud server 3610 transmits, to a user terminal, the user guidance information to the assigned guidance destination.

(Guidance Destination Assignment Processing)

FIG. 42 is a flowchart showing the procedures of the guidance destination assignment processing (S4136) according to this embodiment.

In step S4201, the cloud server 3610 calculates an individual energy consumption sum based on the current user position. In step S4203, the cloud server 3610 calculates an energy consumption amount in an event when the user is guided to each event. In step S4205, the cloud server 3610 determines whether the total energy consumption prediction decreases. If the total energy consumption prediction decreases, the cloud server 3610 advances to step S4207 and stores a user guidance to the event as a guidance candidate.

In step S4209, the cloud server 3610 determines whether there is another guidance method. If there is another guidance method, the cloud server 3610 repeats steps S4203 to S4209. As another guidance method, for example, users are guided to different events, the number of users to be guided is changed, or the attribute of users to be guided is changed.

If there is no other guidance method, the cloud server 3610 advances to step S4211, sorts guidance candidates stored in step S4207 in the ascending order of the energy consumption prediction, and determines guidance based on the smallest energy consumption prediction as a guidance destination assignment result.

According to this embodiment, users are assigned and guided to minimize the total energy consumption amount of an acceptance place. Hence, the energy consumption amount can be reduced more effectively.

Seventh Embodiment

An information processing system according to the seventh embodiment of the present invention will be described. The information processing system according to the seventh embodiment is different from the sixth embodiment in that the movement energy of a user is considered in addition to the energy consumption amounts of an acceptance place and user. The remaining arrangement and operation are the same as those in the second embodiment, the same reference numerals denote the same arrangement and operation, and a detailed description thereof will not be repeated.

According to this embodiment, the guidance of users is assigned to minimize the total energy consumption amount in consideration of even the movement energies of the users. Thus, the energy consumption amount can be reduced more effectively.

<<Operation Procedures of Information Processing System>>

Figure 43:
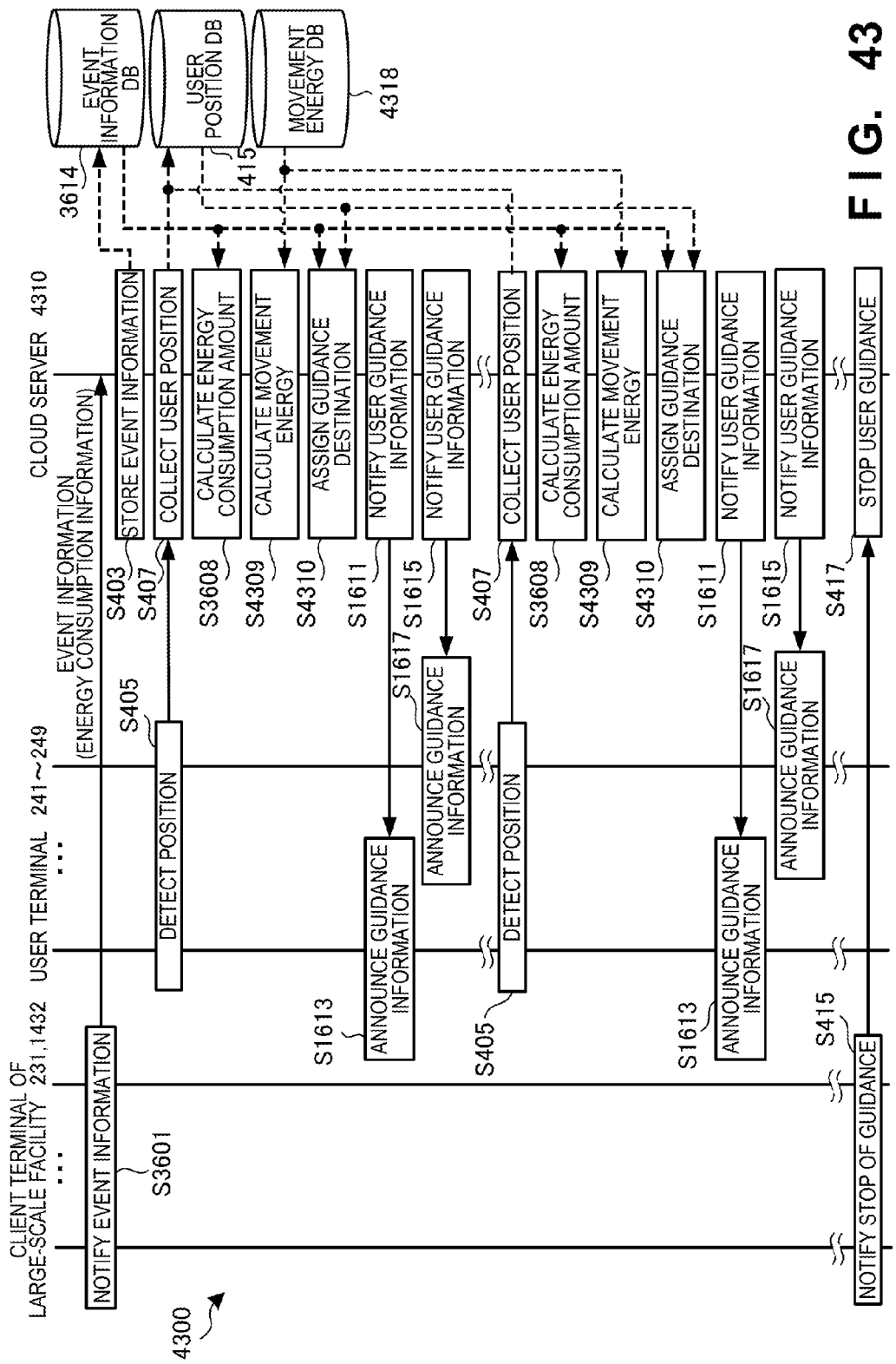
FIG. 43 is a sequence chart showing the operation procedures of an information processing system according to the seventh embodiment of the present invention.

FIG. 43 is a sequence chart showing the operation procedures of an information processing system 4300 according to this embodiment. In FIG. 43, the same step numbers as those in FIG. 4, 16, or 36 denote the same steps, and a description thereof will not be repeated.

In step S3608, a cloud server 4310 refers to an event information DB 3614, and calculates the predicted amounts of energy consumption amounts arising from guidance of users to a plurality of events by using an energy consumption amount calculation table 4414b (see FIG. 46). In step S4309, the cloud server 4310 refers to a movement energy DB 4318 (see FIG. 45), and calculates a movement energy consumed when a user moves in response to guidance. In step S4310, the cloud server 4310 refers to the event information DB 3614 and a user position DB 415, and assigns the guidance destinations of users by using a guidance destination assignment table 4414a (see FIG. 47) in consideration of the movement energies of users together with the total energy consumption amount accompanying the events. In steps S1611 to S1617, as in FIG. 16, the cloud server 4310 announces, in accordance with the guidance destination assignment, pieces of user guidance information to acceptance places respectively assigned to user terminals.

Thereafter, the cloud server 4310 repeats the processes in steps S405 to S1617 to collect user positions and announce pieces of guidance information to the user terminals of users absent in a ○○ mall 221 and a △△ shopping street 1422 in accordance with the total energy consumption amount. If the numbers of persons for events or the numbers of persons to be accommodated in event places are satisfied, client terminals 231 and 1432 notify the cloud server 4310 to stop the user guidance in step S415. In step S417, the cloud server 4310 stops the user guidance. When the cloud server 4310 assigns the guidance destinations of users, the assignment can also be limited not to exceed the numbers of persons to be accommodated in respective acceptance places.

<<Functional Arrangement of Cloud Server>>

Figure 44:
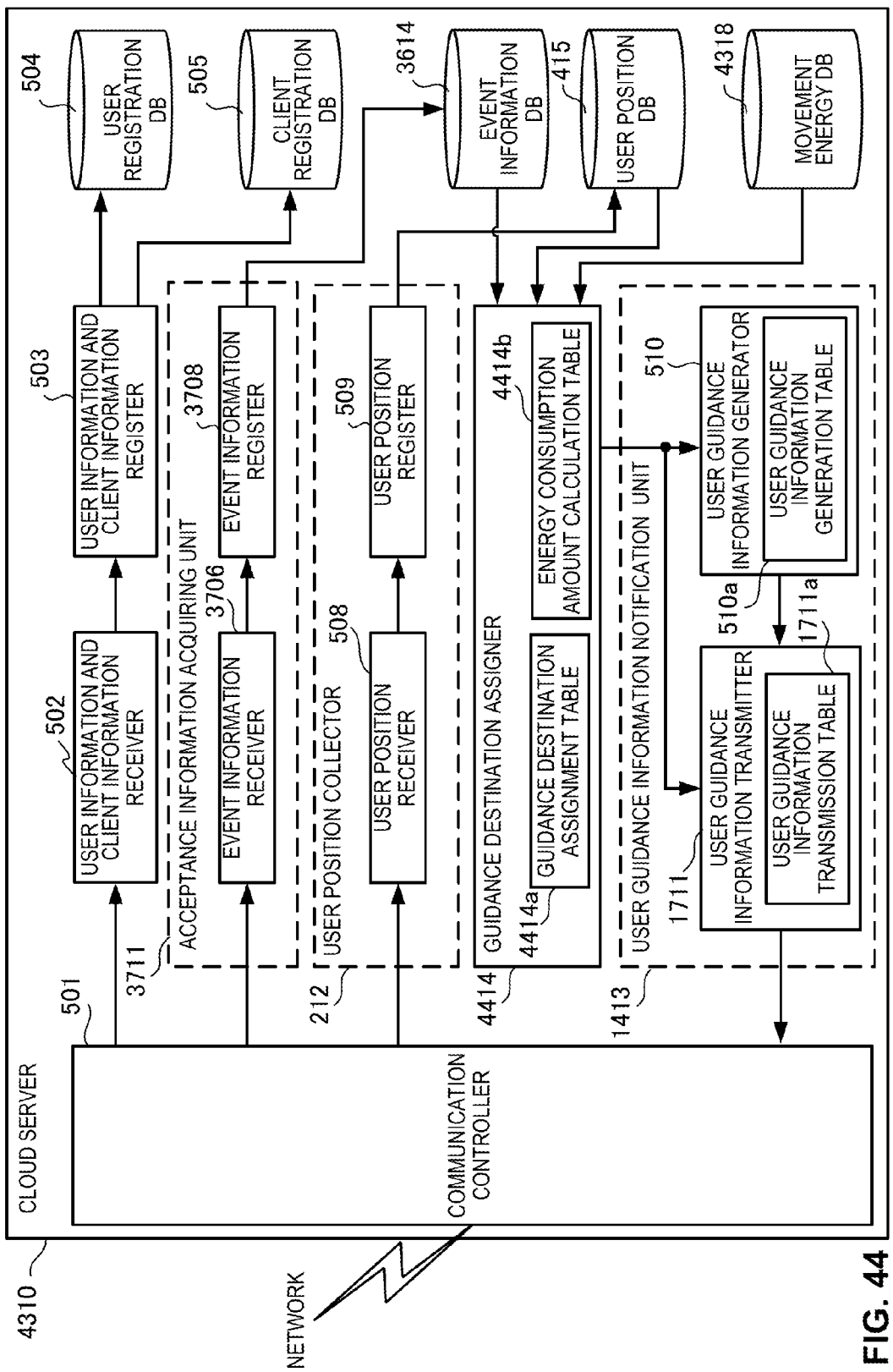
FIG. 44 is a block diagram showing the functional arrangement of a cloud server according to the seventh embodiment of the present invention.

FIG. 44 is a block diagram showing the functional arrangement of the cloud server 4310 according to this embodiment. In FIG. 44, the same reference numerals as those in FIG. 5, 17, or 37 denote the same functional components, and a description thereof will not be repeated.

A guidance destination assigner 4414 includes the guidance destination assignment table 4414a (see FIG. 47) and the energy consumption amount calculation table 4414b (see FIG. 46). The guidance destination assigner 4414 refers to energy consumption information stored in the event information DB 3614 and movement energy information stored in the movement energy DB 4318, and predicts the total energy consumption amount including the event energy consumption amount and the user movement energy consumption amount by using the energy consumption amount calculation table 4414b. The guidance destination assigner 4414 refers to the user position DB 415, and assigns guidance destinations to minimize the predicted total energy consumption amount including the event energy consumption amount and the user movement energy consumption amount.

(Movement Energy DB)

FIG. 45 is a table showing the structure of the movement energy DB 4318 according to this embodiment. The movement energy DB 4318 stores movement energy necessary for each user to move to a client (acceptance place). Note that the structure of the movement energy DB 4318 is not limited to that in FIG. 45.

The movement energy DB 4318 stores each guidance destination client ID 4502 in association with a user ID 4501. The movement energy DB 4318 also stores, in association with each guidance destination client ID 4502, a movement transport facility 4503 used by a user to move from the current position to a client (acceptance place). The movement energy DB 4318 stores necessary movement energy 4504 in association with each movement transport facility 4503.

(Energy Consumption Amount Calculation Table)

FIG. 46 is a table showing the structure of the energy consumption amount calculation table 4414b according to this embodiment. The energy consumption amount calculation table 4414b is used to calculate the sum of energy to be consumed in a user acceptance place and energy to be consumed by movement of a user.

The energy consumption amount calculation table 4414b stores an individual energy consumption sum 3901 in a case in which a user individual will not go to an acceptance place, an energy consumption 4602 in the first event, and an energy consumption 4603 in the nth event. Each of the energy consumption 4602 and the energy consumption 4603 is the sum of energy consumed by the event and energy consumed by user movement. The energy consumption amount calculation table 4414b also stores a total energy consumption prediction 4604 of the individual energy consumption sum 3901, the energy consumption 4602 in the first event, and the energy consumption 4603 in the nth event in a case in which the user will participate in an event in the acceptance place.

In this embodiment, users are assigned to guidance destinations to minimize the total energy consumption prediction 4604.

(Guidance Destination Assignment Table)

FIG. 47 is a table showing the structure of the guidance destination assignment table 4414a according to this embodiment. The guidance destination assignment table 4414a is used to assign users to guidance destinations so as to minimize the total energy consumption prediction 4604.

The guidance destination assignment table 4414a stores guidance 4702 to the first event and guidance 4703 to the nth event that are arranged in accordance with a total energy consumption prediction order 4701. Each of the guidance 4702 to the first event and the guidance 4703 to the nth event includes a user area to which users are guided, the number of users, and information about transport facilities to be used.

According to this embodiment, the guidance of users is assigned to minimize the total energy consumption amount in consideration of even the movement energies of the users. The energy consumption amount can therefore be reduced more effectively.

Eighth Embodiment

An information processing system according to the eighth embodiment of the present invention will be described next. The information processing system according to the eighth embodiment is different from the second to seventh embodiments in that movement of each user group between regions or between towns is guided, instead of guiding each user for each acceptance place. The remaining arrangement and operation are the same as those in the second embodiment, the same reference numerals denote the same arrangement and operation, and a detailed description thereof will not be repeated.

According to this embodiment, movement of each user group between regions or between towns is guided. Hence, the energy consumption amount can be reduced by dynamic population movement between regions or between towns.

Note that this embodiment will explain an example of guiding movement of grouped users. However, it is desirable to simultaneously perform energy price control so that, for example, the energy price in a region where users gather is set to be lower, in order to reduce the energy consumption amount of a wide range of a plurality of regions or a plurality of towns.

<<Information Processing System>>

An information processing system 4800 according to this embodiment will be described with reference to FIGS. 48A to 49. An example in which users are guided to the following three typical regions to reduce the energy consumption amount in the information processing system 4800 according to this embodiment. These regions are a business area where offices serving as workplaces are gathered and commuters gather during the daytime on weekdays, a restaurant area where people gather for amusement on holidays or an amusement area where amusement facilities are gathered, and a housing area as a residential area where people reside during the nighttime. Note that the region generation method is not limited to this embodiment.

(Operation Concept)

FIG. 48A is a view for explaining an operation concept of the information processing system 4800 during the daytime on weekdays according to this embodiment. Since FIG. 48A assumes the daytime on weekdays, many office workers gather in a business area 4833.

In this case, a cloud server 4810 accumulates the population movement history of this town in a population movement history DB 4819. By referring to the population movement history DB 4819, the cloud server 4810 determines that many office workers gather in the business area 4833 during the daytime on weekdays. Although users exist in even a housing area 4831 and an amusement area 4832, it is predicted in this embodiment that the energy consumption amount can be reduced by gathering as many users as possible to the business area 4833.

The cloud server 4810 groups users in the housing area 4831 and the amusement area 4832 by using a user grouping table 5014b, and guides them to the business area 4833. For example, the cloud server 4810 outputs, to a user terminal 4821 of a user in the housing area 4831, a message "Have lunch in the business area! A free bus is in service. We require your cooperation for energy saving." On the other hand, the cloud server 4810 outputs, to user terminal 4822 of a user in the amusement area 4832, a message "Have lunch in the business area! We offer_ discount. We require your cooperation for energy saving."

FIG. 48B is a view for explaining an operation concept of the information processing system 4800 during the nighttime on weekdays according to this embodiment. Since FIG. 48B assumes the nighttime on weekdays, many people gather in the housing area 4831.

In this case, by referring to the population movement history DB 4819, the cloud server 4810 determines that many people gather in the housing area 4831 during the nighttime on weekdays. Although users exist in even the amusement area 4832 and the business area 4833, it is predicted in this embodiment that the energy consumption amount can be reduced by gathering as many users as possible to the housing area 4831.

The cloud server 4810 groups users in the amusement area 4832 and the business area 4833 by using the user grouping table 5014b, and guides them to the housing area 4831. For example, the cloud server 4810 outputs, to the user terminal 4822 of a user in the amusement area 4832, a message "It's past 22:00. Lights-out will be 22:30. Please hurry home. We require your cooperation for energy saving." In contrast, the cloud server 4810 outputs, to a user terminal 4823 of a user in the business area 4833, a message "It's past 22:00. Shops will be closed. Please hurry home. We require your cooperation for energy saving."

Figure 48C:
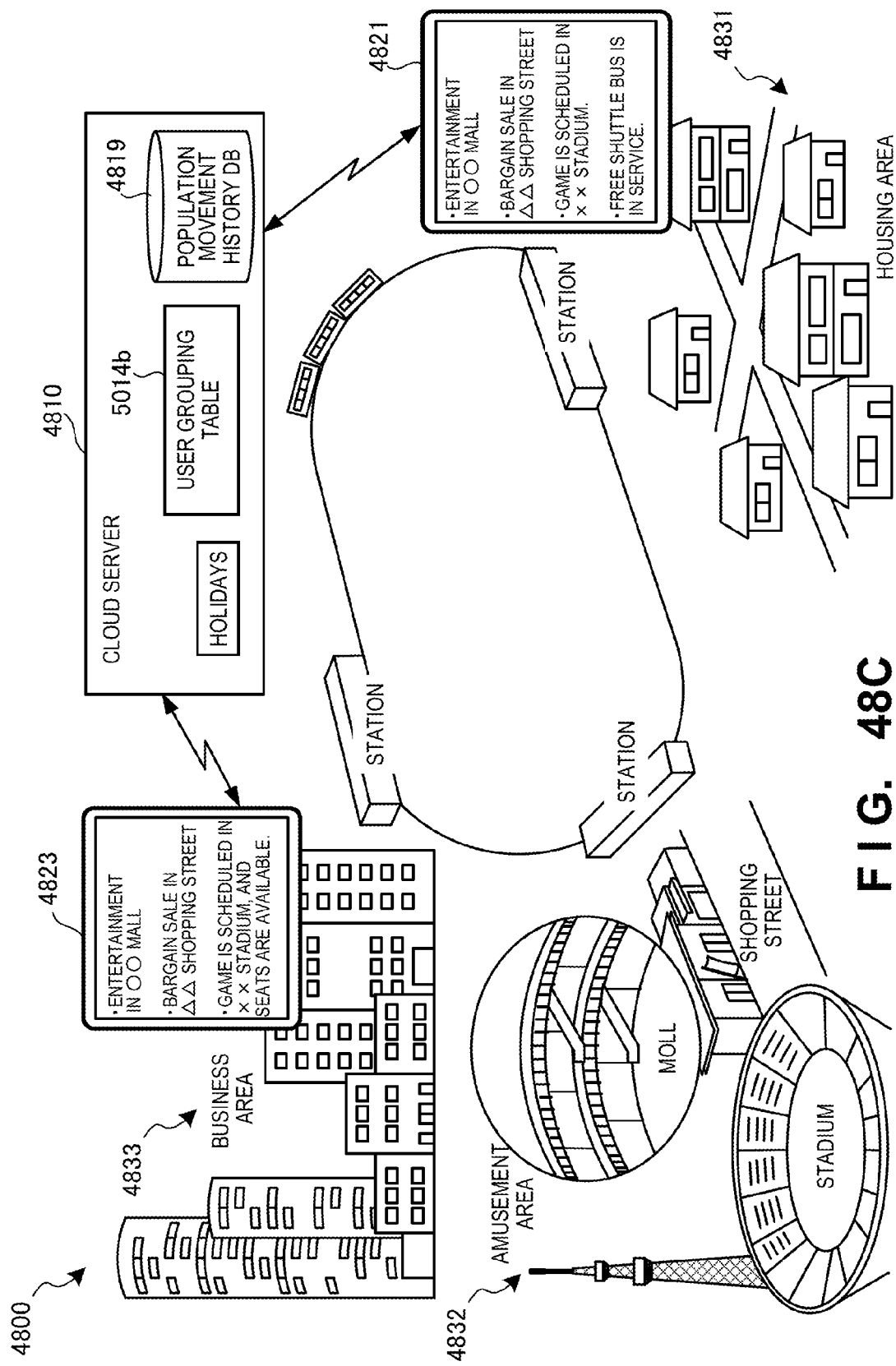
FIG. 48C is a view for explaining an operation concept of the information processing system on holidays according to the eighth embodiment of the present invention.

FIG. 48C is a view for explaining an operation concept of the information processing system 4800 on holidays according to this embodiment. Since FIG. 48C assumes holidays, many people gather in the amusement area 4832.

In this case, by referring to the population movement history DB 4819, the cloud server 4810 determines that many people gather in the amusement area 4832 on holidays. Although users exist in even the housing area 4831 and the business area 4833, it is predicted in this embodiment that the energy consumption amount can be reduced by gathering as many users as possible to the amusement area 4832.

The cloud server 4810 groups users in the housing area 4831 and the business area 4833 by using the user grouping table 5014b, and guides them to the amusement area 4832. For example, the cloud server 4810 outputs, to the user terminal 4821 of a user in the housing area 4831, a message "An entertainment in ○○ mall. A bargain sale in ΔΔ shopping street. A game is scheduled in xx stadium. A free shuttle bus is in service." To the contrary, the cloud server 4810 outputs, to the user terminal 4823 of a user in the business area 4833, a message "An entertainment in ○○ mall. A bargain sale in ΔΔ shopping street. A game is scheduled in xx stadium, and seats are available."

In FIGS. 48A to 48C, guidance information to users is generated and transmitted based on the past population movement history and the current positions of users. However, a user can move from the current position in accordance with the guidance or cannot move despite the guidance. For example, a sick person in bed cannot be guided to the business area even during the daytime on weekdays (FIG. 48A). Even during the nighttime on weekdays (FIG. 48B), night-shift workers in the business area and the amusement area cannot be guided to the housing area. Even on holidays (FIG. 48C), a person who makes a stop in the business area can be guided to the amusement area, but a person who is in the business area for business cannot be guided to the amusement area. In this case, the following processing is also possible. That is, the cloud server 4810 refers to a user profile accumulated in a user registration DB 504 or the like, and determines whether the user can be guided to another area. If the user can be guided, the cloud server 4810 transmits user guidance information, and if he cannot be guided, does not transmit user guidance information. For example, the current position, the purpose of the user staying at a current position, a movement possible/impossible flag, or the like is stored in the user profile in association with a user ID (not shown). Alternatively, the user terminal may be configured to be able to set whether to receive user guidance information.

(Operation Procedures)

FIG. 49 is a sequence chart showing the operation procedures of the information processing system 4800 according to this embodiment. In FIG. 49, a client terminal 4830 of a user accommodation facility and a user terminal 4820 are typified.

In step S4901, the user terminal 4820 transmits user action information to the cloud server 4810. In step S4903, the cloud server 4810 accumulates the received user action information as a population movement history in the population movement history DB 4819. In step S4905, the cloud server 4810 performs user grouping processing based on the day of the week, the time period, or the like by referring to the population movement history DB 4819. As a result, the cloud server 4810 generates the user grouping table 5014b (see FIG. 52).

In step S4907, the client terminal 4830 of the user accommodation facility notifies the cloud server 4810 of event information. In step S4909, the cloud server 4810 stores the received event information in an event information DB 414.

In step S4911, the cloud server 4810 generates group-compliant user guidance information by looking up the user grouping table 5014b. In step S4913, the cloud server 4810 transmits the user guidance information to a group-compliant user terminal. When guiding a movable user based on the user profile, the cloud server 4810 selects, in step S4911 or S4913, a user terminal to which the user guidance information is transmitted based on the user profile. In step S4915, the user terminal 4820 announces the user guidance information received for each group. If the number of persons for an event or the number of persons to be accommodated in an event place is satisfied, the client terminal 4830 notifies the cloud server 4810 to stop the user guidance in step S415. In step S417, the cloud server 4810 stops the user guidance. When the cloud server 4810 assigns the guidance destinations of users, the assignment can also be limited not to exceed the numbers of persons to be accommodated in respective acceptance places.

<<Functional Arrangement of Cloud Server>>

Figure 50:
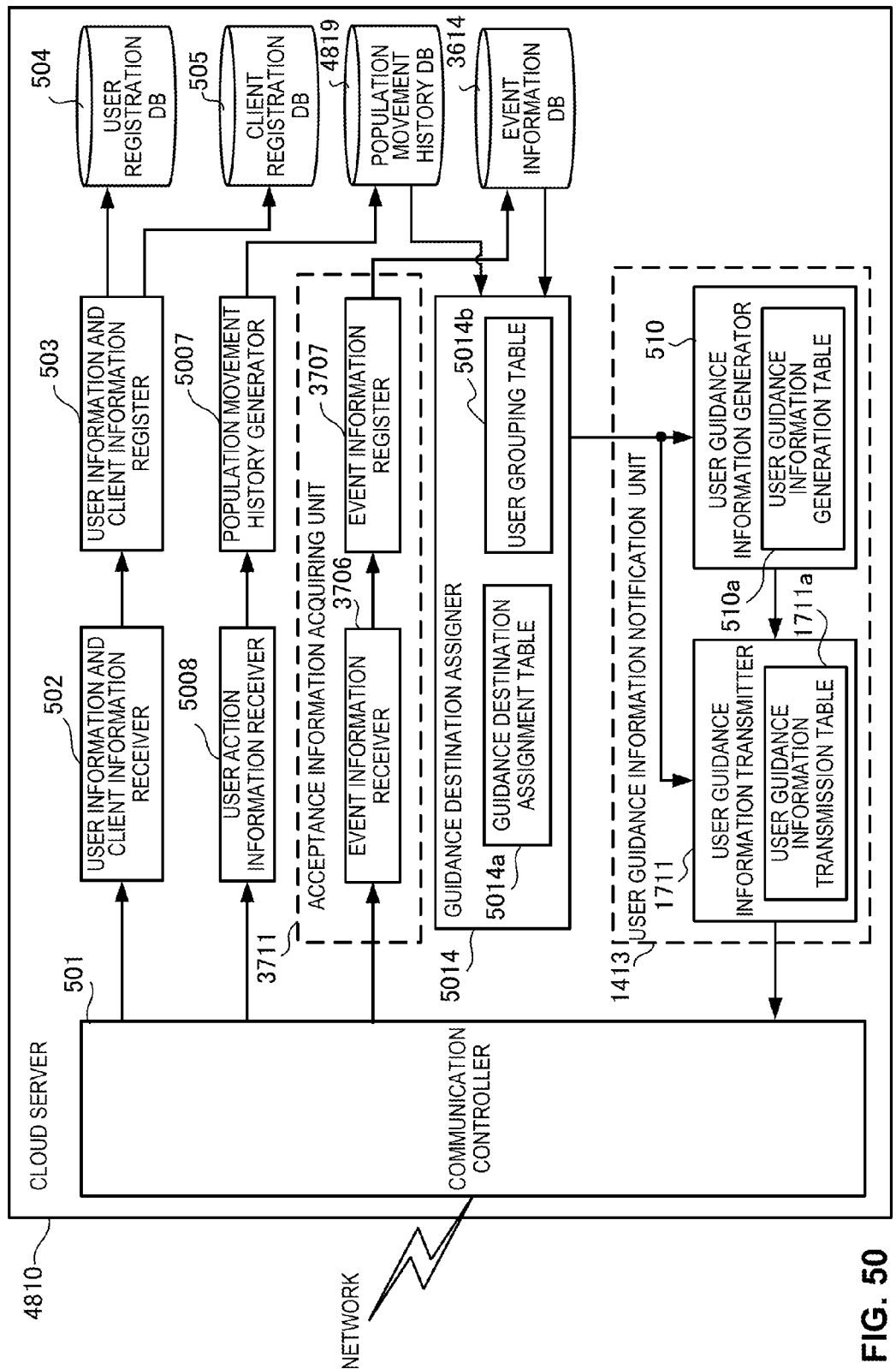
FIG. 50 is a block diagram showing the functional arrangement of a cloud server according to the eighth embodiment of the present invention.

FIG. 50 is a block diagram showing the functional arrangement of the cloud server 4810 according to this embodiment. In FIG. 50, the same reference numerals as those in FIG. 5, 16, or 37 denote the same functional components, and a description thereof will not be repeated.

A user action information receiver 5008 receives, from a user terminal, user action information serving as the basis of the population movement history. A population movement history generator 5007 generates a population movement history from the received user action information, and accumulates it in the population movement history DB 4819 (see FIG. 51).

Figure 52:
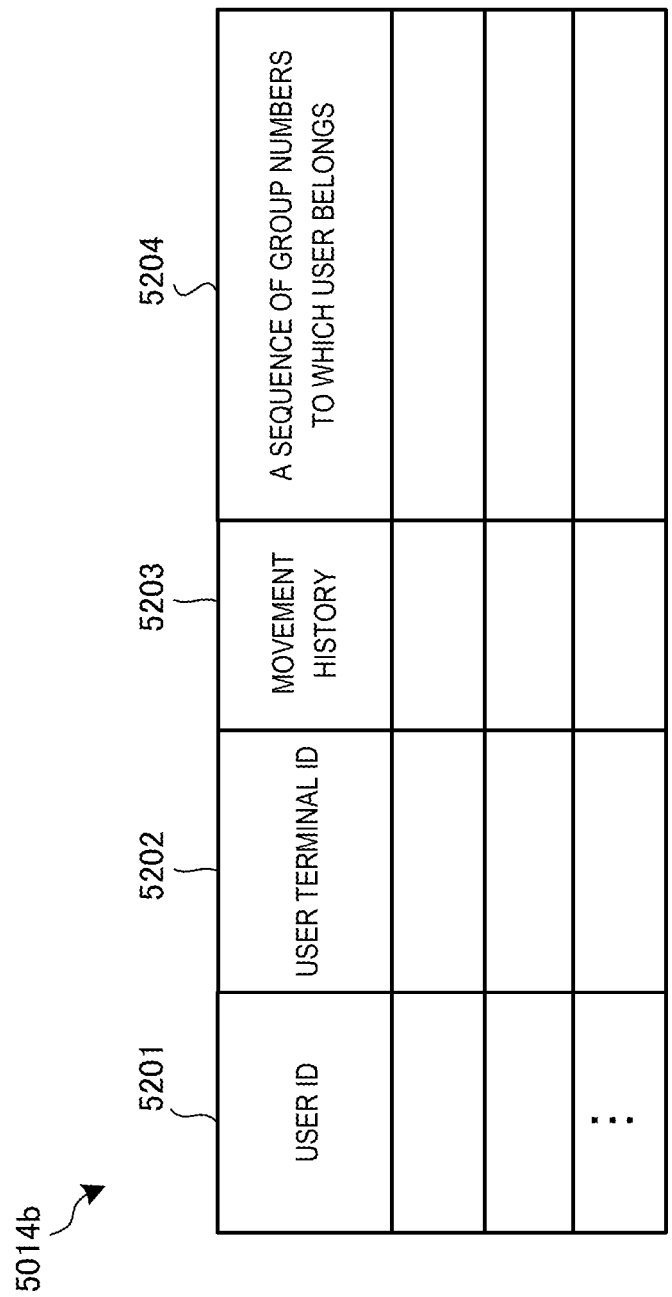
FIG. 52 is a table showing the structure of a user grouping table according to the eighth embodiment of the present invention.

A guidance destination assigner 5014 includes a guidance destination assignment table 5014a (see FIG. 53) and the user grouping table 5014b (see FIG. 52). The guidance destination assigner 5014 refers to the population movement history stored in the population movement history DB 4819 and groups, by using the user grouping table 5014b, users into a group that is guided to move for each region. By referring to an event information DB 3614, the guidance destination assigner 5014 assigns the guidance destination of a user group in each region so as to gather users to a region in accordance with the population movement history.

Note that the user profile used to guide movable users based on the user profile may be stored not in the user registration DB 504 but in the population movement history DB 4819 or the user grouping table 5014b, and may be used to select and guide movable users.

(Population Movement History DB)

FIG. 51 is a table showing the structure of the population movement history DB 4819 according to this embodiment. The population movement history DB 4819 collects a user action information history and accumulates it as a population movement history. The population movement history DB 4819 is used to group users so as to guide movement of users between regions.

The population movement history DB 4819 includes population distribution data 5110 simply representing a population distribution in the time period of a user, and group data 5120 for generating a group that is guided to move based on the population distribution data 5110.

The population distribution data 5110 stores a population 5112 in the first region, a population 5113 in the nth region, and an aggregate total population 5114 in association with a time period 5111 including year, month, day, day of the week (holiday), and time.

The group data 5120 stores an average population 5122 in the first region and an average population 5123 in the nth region in association with a time period 5121 including a weekday or holiday, or morning, afternoon, or night. The group data 5120 also stores movement guidance 5124 from a region to a region based on population distributions in the first to nth regions, and a group number 5125 of a user group subjected to the movement guidance 5124. In this embodiment, movement guidance to a user is given based on the group number 5125.

(User Grouping Table)

FIG. 52 is a table showing the structure of the user grouping table 5014b according to this embodiment. The user grouping table 5014b is used to group users based on the population movement history and decide guidance to the users.

In association with a user ID 5201, a user terminal ID 5202, and a user movement history 5203, the user grouping table 5014b stores a sequence of group numbers 5204 to which a user belongs in the group data 5120 of the population movement history DB 4819. The guidance destination assigner 5014 decides a guidance destination in accordance with the group number column 5204 to which the user belongs.

(Guidance Destination Assignment Table)

FIG. 53 is a table showing the structure of the guidance destination assignment table 5014a according to this embodiment. The guidance destination assignment table 5014a is used to generate user guidance information in accordance with grouping of users.

The guidance destination assignment table 5014a stores user guidance information 5302 in association with a group number 5301 with which users are grouped.

<<Processing Procedures of Cloud Server>>

Figure 54:
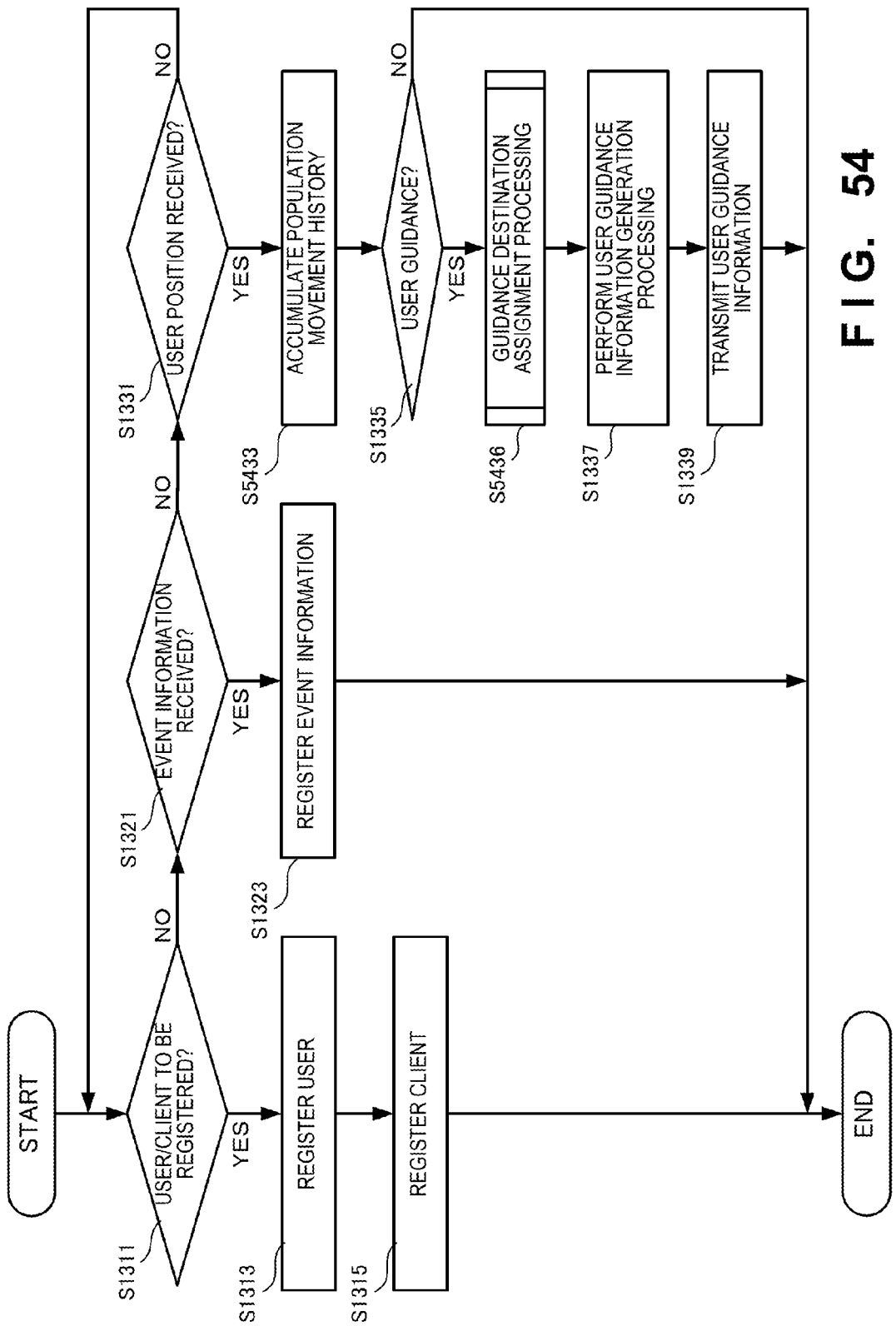
FIG. 54 is a flowchart showing the processing procedures of the cloud server according to the eighth embodiment of the present invention.

FIG. 54 is a flowchart showing the processing procedures of the cloud server 4810 according to this embodiment. In FIG. 54, the same step numbers as those in FIG. 13 denote the same steps, and a description thereof will not be repeated. This flowchart is executed by a CPU 1110 in FIG. 11 using a RAM 1140, thereby implementing the functional components in FIG. 50.

The difference between FIGS. 54 and 13 is that upon receiving a user position in step S1331, the cloud server 4810 accumulates it as a population movement history in the population movement history DB 4819 in step S5433.

Another difference is that the cloud server 4810 performs, in guidance destination assignment processing (see FIG. 55) in step S5436, processing of grouping users in a region and assigning a guidance destination is performed based on the population movement history. In step S1337, the cloud server 4810 generates user guidance information that guides a user to an assigned guidance destination. In step S1339, the cloud server 4810 transmits, to a user terminal, the user guidance information to the assigned guidance destination.

When guiding a movable user based on a user profile, the cloud server 4810 selects, based on the user profile in step S5436 or step S1337 or S1339, a user terminal to which user guidance information is transmitted.

(Guidance Destination Assignment Processing)

Figure 55:
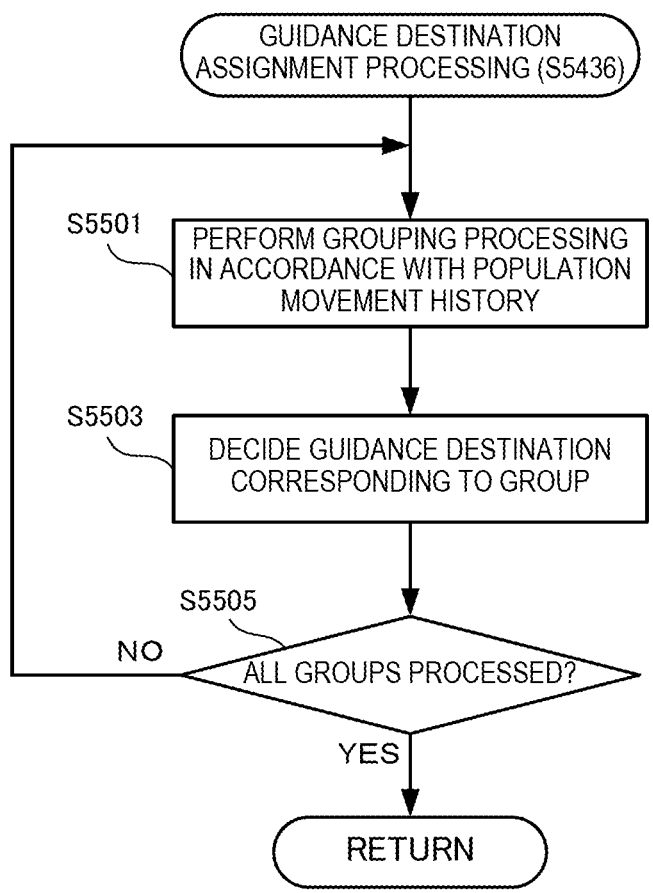
FIG. 55 is a flowchart showing the procedures of guidance destination assignment processing according to the eighth embodiment of the present invention.

FIG. 55 is a flowchart showing the procedures of the guidance destination assignment processing (S5436) according to this embodiment.

In step S5501, the cloud server 4810 groups users based on a population movement history. In step S5503, the cloud server 4810 generates a guidance destination and user guidance information corresponding to the group.

In step S5505, the cloud server 4810 determines whether the processing has been performed for all groups. If a group remains, the cloud server 4810 returns to step S5501 and repeats the process.

According to this embodiment, movement of each user group between regions or between towns is guided. The energy consumption amount can therefore be reduced by dynamic population movement between regions or between towns.

OTHER EMBODIMENTS

The present invention has been described above with reference to the embodiments. However, the present invention is not limited to those embodiments. Various changes and modifications understandable by those skilled in the art within the scope of the present invention can be made for the arrangements and details of the present invention. The present invention also incorporates a system or apparatus that somehow combines different features included in the respective embodiments.

The present invention is applicable to a system including a plurality of devices or a single apparatus. The present invention is also applicable even when a control program for implementing the functions of the embodiments is supplied to the system or apparatus directly or from a remote site. Hence, the present invention also incorporates the control program installed in a computer to implement the functions of the present invention on the computer, a medium storing the control program, and a WWW (World Wide Web) server that causes a user to download the control program.

This application claims the benefit of Japanese Patent Application No. 2012-198774 filed on Sep. 10, 2012, which is hereby incorporated by reference herein in its entirety.

The invention claimed is:

1. An information processing apparatus comprising:
a memory storing instructions; and
a processor configured to execute the instructions to:
acquire a proposal of an acceptance place accepting a plurality of users;
collect current positions of the plurality of users from communication terminals of the plurality of users;
determine the acceptance place as a place for gathering the plurality of users, and notify communication terminals of users absent in the determined place, of guidance information to guide the absent users to the determined place,
wherein the determining and notifying step comprises:
generating a plurality of regions where energy consumptions become different in different time periods respectively; and
notifying communication terminals of second users present in a second region, of guidance information to move the second users to a first region, the second region being in a time period in which energy consumption can be reduced and the first region being in a time period in which energy consumption increases.

2. The information processing apparatus according to claim 1, wherein the processor is further configured to execute the instructions to:
receive the guidance information from a communication terminal associated with the acceptance place.

3. The information processing apparatus according to claim 1, wherein the acceptance place comprises a plurality of acceptance places, and wherein the processor is further configured to execute the instructions to:
assign the plurality of users to the plurality of acceptance places, respectively, and notifies the plurality of users of guidance information to the respective assigned acceptance places.

4. The information processing apparatus according to claim 3, further comprising a history accumulator that accumulates action histories and purchase histories of the plurality of users,
wherein the processor is further configured to execute the instructions to:
assign the plurality of users to the plurality of acceptance places, respectively, in accordance with user preferences based on one of the action histories and purchase histories of the plurality of users.

5. The information processing apparatus according to claim 3, wherein the processor is further configured to execute the instructions to:
predict energy consumption amounts corresponding to the numbers of persons to be accommodated in the respective acceptance places; and
assign the plurality of users to the plurality of acceptance places, respectively, to minimize a sum of the predicted energy consumption amounts for the respective acceptance places.

6. The information processing apparatus according to claim 3, wherein the processor is further configured to execute the instructions to:
predict energy consumption amounts to be consumed by the respective users to move from the current positions to the respectively assigned acceptance places; and
assign the plurality of users to the plurality of acceptance places, respectively, to minimize a sum of the predicted energy consumption amounts.

7. The information processing apparatus according to claim 1, wherein the guidance information includes a reduction amount of the energy consumption amount, ongoing event information, bargain sale information, and reward point information.

8. The information processing apparatus according to claim 1, wherein the processor is further configured to execute the instructions to:

set an energy price in the first region to be lower than an energy price in the second region in the time period.

9. The information processing apparatus according to claim 1, wherein the plurality of regions include a housing area where people reside, a business area where offices serving as workplaces are gathered, and an amusement area where restaurants and amusement facilities are gathered.

10. A control method of an information processing apparatus, comprising:
acquiring a proposal of an acceptance place accepting a plurality of users;
collecting current positions of the plurality of users from communication terminals of the plurality of users; and
determining the acceptance place as a place for gathering the plurality of users, and notifying communication terminals of users absent in the determined place, of guidance information to guide the absent users to the determined place,
wherein the determining and notifying step comprises:
generating a plurality of regions where energy consumptions become different in different time periods respectively; and
notifying communication terminals of second users present in a second region, of guidance information to move the second users to a first region, the second region being in a time period in which energy consumption can be reduced and the first region being in a time period in which energy consumption increases.

11. A non-transitory computer-readable storage medium storing a control program of an information processing apparatus for causing a computer to execute a method, comprising:
acquiring a proposal of an acceptance place accepting a plurality of users;
collecting current positions of the plurality of users from communication terminals of the plurality of users; and
determining the acceptance place as a place for gathering the plurality of users, and notifying communication terminals of users absent in the determined place, of guidance information to guide the absent users to the determined place,
wherein the determining and notifying step comprises:
generating a plurality of regions where energy consumptions become different in different time periods respectively; and
notifying communication terminals of second users present in a second region, of guidance information to move the second users to a first region, the second region being in a time period in which energy consumption can be reduced and the first region being in a time period in which energy consumption increases.

12. An information processing system comprising a plurality of communication terminals of a plurality of users, and an information processing apparatus that controls the plurality of communication terminals,
wherein the information processing apparatus comprises:
a first memory storing a first set of instructions; and
a first processor configured to execute the first set of instructions to:
acquire a proposal of an acceptance place accepting a plurality of users;
collect current positions of the plurality of users from communication terminals of the plurality of users; and
determine the acceptance place as a place for gathering the plurality of users, and notify communication terminals of users absent in the determined place, of guidance information to guide the absent users to the determined place,
wherein the determining and notifying step comprises:
generating a plurality of regions where energy consumptions become different in different time periods respectively; and
notifying communication terminals of second users present in a second region, of guidance information to move the second users to a first region, the second region being in a time period in which energy consumption can be reduced and the first region being in a time period in which energy consumption increases, and
wherein each of the plurality of communication terminals comprises:
a second memory storing a second set of instructions; and
a second memory configured to execute the second set of instructions to:
detect a current position of a respective communication terminal;
transmit information of the current position to the information processing apparatus; and
receive, from the information processing apparatus, the guidance information to the determined place.

13. An information processing method using an information processing system including a plurality of communication terminals of a plurality of users, and an information processing apparatus that controls the plurality of communication terminals, comprising:
detecting current positions at the respective communication terminals and transmitting the current positions from the respective communication terminals to the information processing apparatus;
collecting, at the information processing apparatus, the current positions of the plurality of users by receiving the current positions from the plurality of communication terminals;
acquiring, at the information processing apparatus, a proposal of an acceptance place accepting the plurality of users;
determining, at the information processing apparatus, the acceptance place as a place for gathering the plurality of users, and notifying from the information processing apparatus to communication terminals of users absent in the determined place, of guidance information to guide the absent users to the determined place; and
receiving, at the communication terminals of users absent in the determined place, the guidance information to guide the absent users to the determined place from the information processing apparatus,
wherein the determining and notifying step comprises:
generating a plurality of regions where energy consumptions become different in different time periods respectively; and
notifying communication terminals of second users present in a second region, of guidance information to move the second users to a first region, the second region being in a time period in which energy consumption can be reduced and the first region being in a time period in which energy consumption increases.

* * * * *